US012388656B2

(12) United States Patent
Jose et al.

(10) Patent No.: US 12,388,656 B2
(45) Date of Patent: Aug. 12, 2025

(54) SYSTEMS METHODS AND DEVICES FOR DYNAMIC AUTHENTICATION AND IDENTIFICATION

(71) Applicant: Scramble ID, Inc., Alpharetta, GA (US)

(72) Inventors: Jubin Jose, Atlanta, GA (US); Jamil Damien Farshchi, Atlanta, GA (US)

(73) Assignee: Scramble ID, Inc., Alpharetta, GA (US)

( * ) Notice: Subject to any disclaimer, the term of this patent is extended or adjusted under 35 U.S.C. 154(b) by 80 days.

(21) Appl. No.: 18/366,644

(22) Filed: Aug. 7, 2023

(65) Prior Publication Data
US 2024/0283657 A1 Aug. 22, 2024

Related U.S. Application Data

(60) Provisional application No. 63/510,628, filed on Jun. 27, 2023, provisional application No. 63/478,791, filed on Jan. 6, 2023, provisional application No. 63/378,413, filed on Oct. 5, 2022, provisional application No. 63/370,626, filed on Aug. 5, 2022.

(51) Int. Cl.
H04L 29/06 (2006.01)
H04L 9/08 (2006.01)
H04L 9/32 (2006.01)

(52) U.S. Cl.
CPC .......... H04L 9/3247 (2013.01); H04L 9/0825 (2013.01)

(58) Field of Classification Search
CPC ..... H04L 9/3247; H04L 9/0825; H04L 63/12; H04L 9/3228; H04L 63/0428; G06F 21/64; G06F 21/44
See application file for complete search history.

(56) References Cited

U.S. PATENT DOCUMENTS

| | | | | |
|---|---|---|---|---|
| 2005/0160042 A1* | 7/2005 | Russell | ............ | H04N 21/25875 705/50 |
| 2009/0287837 A1* | 11/2009 | Felsher | ............... | G06F 21/6245 709/229 |
| 2013/0159021 A1* | 6/2013 | Felsher | .................. | G16H 10/60 705/3 |
| 2013/0198801 A1* | 8/2013 | Nishizawa | .......... | H04L 63/0815 726/1 |
| 2014/0281539 A1* | 9/2014 | Faltyn | .................... | H04L 9/0863 713/168 |

(Continued)

Primary Examiner — Shawnchoy Rahman
(74) Attorney, Agent, or Firm — Perkins Coie LLP

(57) ABSTRACT

Systems and methods involving various registration and authentication workflows are disclosed herein. A user may be authenticated without the use of static usernames or passwords. In some embodiments, an authentication identifier may be generated that is associated with an authentication request for a user to access a protected resource (e.g., a web app). An authentication code may be generated based on the authentication identifier. The authentication code may be sent to a computing device to be provided to the user, who may provide the authentication code to an application on their mobile device. The mobile device may send a payload containing the authentication identifier, credentials saved on the user device from a previous registration step, and a digital signature. The digital signature may be authenticated using contents of the payload before validating the authentication identifier.

20 Claims, 51 Drawing Sheets

(56) References Cited

U.S. PATENT DOCUMENTS

2015/0334108 A1* 11/2015 Khalil ................. H04L 63/0884
　　　　　　　　　　　　　　　　　　　　　　　726/8
2019/0139044 A1* 5/2019 Piel .................... H04L 63/0861
2020/0162255 A1* 5/2020 Hunt ................... H04L 63/083

* cited by examiner

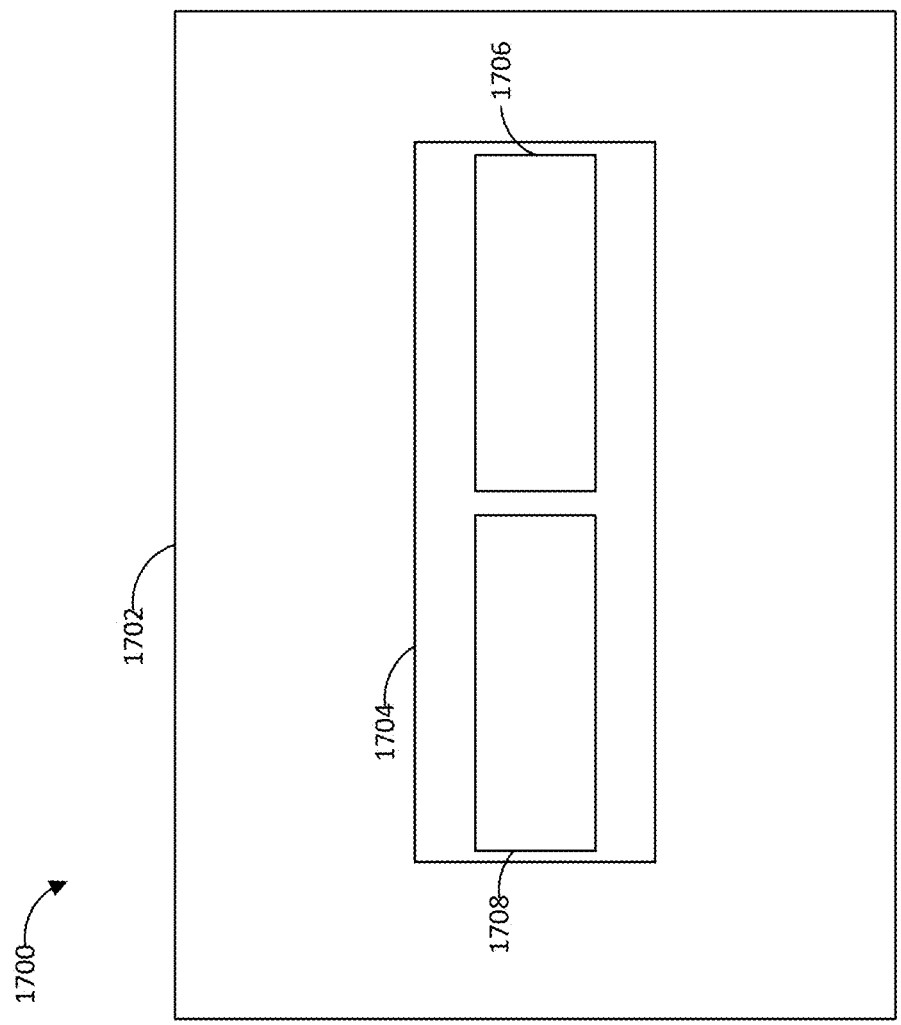

SYSTEMS METHODS AND DEVICES FOR DYNAMIC AUTHENTICATION AND IDENTIFICATION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Patent Application No. 63/370,626, entitled "SYSTEMS METHODS AND DEVICES FOR DYNAMIC AUTHENTICATION AND IDENTIFICATION," filed Aug. 5, 2022, the contents of which are incorporated by reference herein in their entirety.

This application also claims the benefit of U.S. Provisional Patent Application No. 63/378,413, entitled "SYSTEMS METHODS AND DEVICES FOR DYNAMIC AUTHENTICATION AND IDENTIFICATION," filed Oct. 5, 2022, the contents of which are incorporated by reference herein in their entirety.

This application also claims the benefit of U.S. Provisional Patent Application No. 63/478,791, entitled "SYSTEMS METHODS AND DEVICES FOR DYNAMIC AUTHENTICATION AND IDENTIFICATION," filed Jan. 6, 2023, the contents of which are incorporated by reference herein in their entirety.

This application also claims the benefit of U.S. Provisional Patent Application No. 63/510,628, entitled "SYSTEMS METHODS AND DEVICES FOR DYNAMIC AUTHENTICATION AND IDENTIFICATION," filed Jun. 27, 2023, the contents of which are incorporated by reference herein in their entirety.

TECHNICAL FIELD

The embodiments of the disclosure generally relate to systems, methods, and devices for dynamic authentication and identification. More particularly, some embodiments relate to systems, methods, and devices for secure identification and authentication without static identifiers that are known to a user or a machine attempting authentication.

BACKGROUND

Various methods have been proposed to securely identify and authenticate human user and non-human accounts. However, most methods use a static username and/or a password. Static usernames and/or passwords include many points of attack including lost or stolen credentials due to poor credential hygiene, social engineering, phishing, brute-force, and targeted attacks. Static username and/or password authentication methods can be vulnerable to replay, man-in-the-middle and denial-of-service style attacks. Authentication methods such as multiple authentication factors (MFA), Security Assertion Markup Language (SAML), OpenID Connect (OIDC), Fast Identity Online (FIDO), Web Authentication, and/or eliminating usage of passwords do not eliminate points of attack and can be vulnerable to MFA Prompt Spamming/MFA Fatigue style attacks.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

Embodiments of the inventions described herein can comprise several novel features and no single feature is solely responsible for the desirable attributes or is essential to practicing the inventions described.

In some cases, systems, methods, and devices are resistant to known social engineering style attacks, credential attacks, replay attacks, man-in-the-middle attacks, denial-of-service style attacks, and/or brute-force style attacks. The systems methods and device can eliminate the possibility of MFA Prompt Spamming/MFA Fatigue style attacks.

In some cases, the systems, methods, and devices can include risk reduction mechanisms to eliminate a possibility of collisions due to human error while entering a unique identifier into an authentication client.

In some cases, the systems, methods, and devices can include risk-reduction mechanisms to eliminate identifier guessing or brute-force style attacks.

In some cases, the systems, methods, and devices can be used when the authentication client and the authentication server cannot communicate, and two or more unique identifiers can eliminate collisions.

In some cases, the systems, methods, and devices can be used with one or more computer systems or machines when no user is involved.

In some cases, the systems, methods, and devices can be used when the system cannot store unique identifiers locally.

In some cases, the systems, methods, and devices can allow computer systems or machines to mutually authenticate and does not require one machine to have any prior knowledge of the other.

In some cases, the systems, methods, and devices can authenticate a user to act for a second user.

In some cases, the systems, methods, and devices can prevent identity fraud.

In some cases, the systems, methods, and devices can verbally authenticate a user.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 17 is a schematic of a login page of embodiments of the present application.

DETAILED DESCRIPTION

Figure 1:
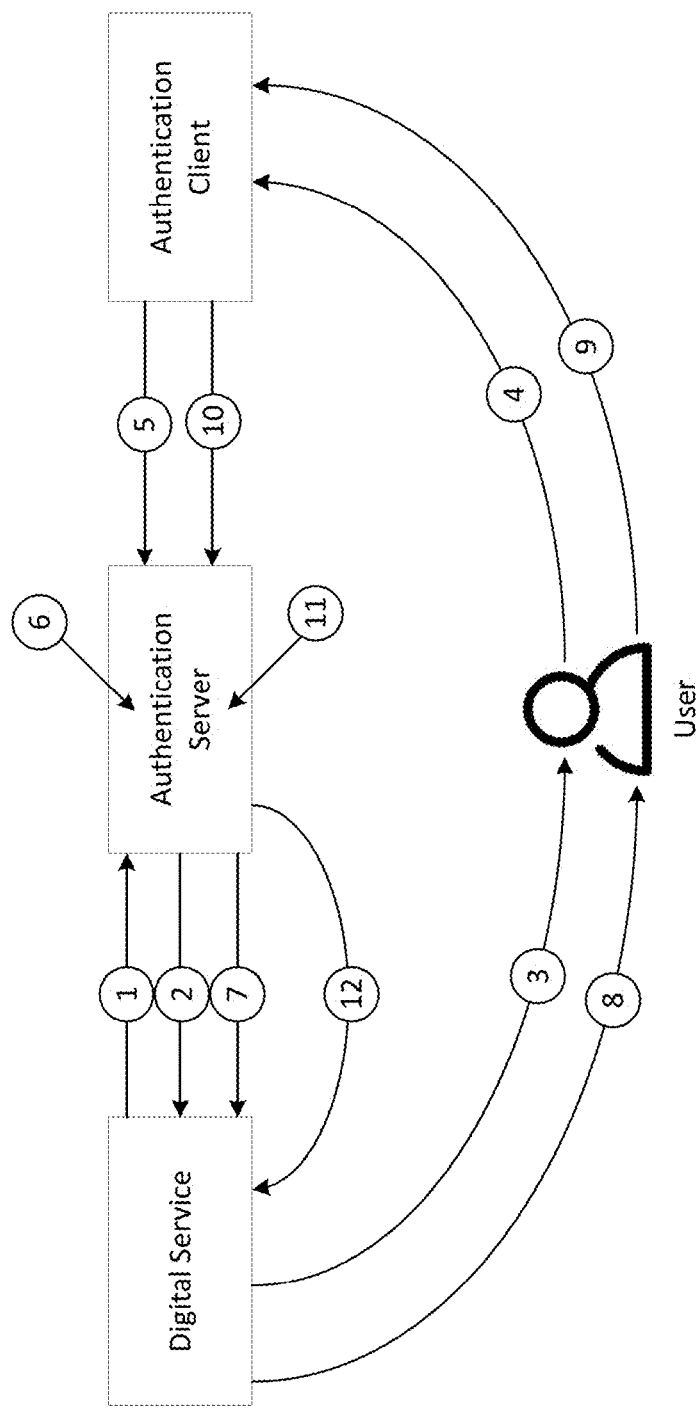
FIG. 1 shows a method of user identification and authentication using service-initiated, unique dynamic identifiers, in accordance with embodiments of the present application.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Although several embodiments, examples and illustrations are disclosed below, it will be understood by those of ordinary skill in the art that inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to the like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Introduction to the Figures

In some cases, an authentication server can generate a unique identifier upon request from a digital service, such as a mobile application or a website. The authentication server can generate the unique identifier just-in-time and transmit the unique identifier to the digital service for display to the user. Alternatively, the authentication server can transmit the unique identifier to an interface provided by the authentication server. The user can enter the unique identifier into an authentication client for authentication from the authentication server.

In some embodiments, the user can access a login page for the digital service and submit a login request. The digital service can display the unique identifier to the user, and the user can enter the unique identifier into the authentication client. In some embodiments, the authentication server can display the unique identifier and the digital service can redirect the user to the authentication server. Alternatively, the authentication server can display the unique identifier via a user interface provided by the authentication server, as described in various embodiments disclosed herein. The pre-registered authentication client can be a mobile application that can require a gesture to access, such as a biometric authentication. A new unique identifier can be generated by the authentication server at each login request or after a predetermined period of time. The unique identifier can replace a traditional username and password login, and two-factor authentication.

In another embodiments, the authentication server can transmit the unique identifier to the authentication client to display the unique identifier to the user. The user can access the pre-registered authentication client to retrieve unique identifier and enter the unique identifier into the digital service during a login sequence. Alternatively, the user can enter the unique identifier into an interface provided by the authentication server during a login sequence In some embodiments, the pre-registered authentication client and the authentication server may not have direct communication. In these embodiments, the authentication server can generate two or more unique identifiers over the predetermined period of time. The authentication client can generate two or more unique identifiers that match the two or more unique identifiers generated by the authentication server. Alternatively, the two or more unique identifiers generated by the authentication server and the authentication client can be two or more identifiers generated using a time-based random number generator. The time-based random generator can reduce or minimize a risk of collisions.

In some embodiments, the system can generate one or more unique identifiers for machine-to-machine authentication. In some embodiments, a centralized authentication server can perform the machine-to-machine authentication.

In some embodiments, the system can authenticate the user via verbal confirmation of the unique identifier. In some embodiments, the system can generate unique dynamic identifier for mutually identifying and authenticating multiple users.

In some embodiments, the unique identifier and/or authentication methods of the authentication server are obfuscated or hidden from the digital service thereby increasing system security while decreasing complexity and latency. In these embodiments, the unique identifier is not transmitted to the digital service.

In some embodiments, a user can access a digital service. In some embodiments, the digital service can be a mobile application, a website, a web application, a desktop application, an intranet service, and/or any other digital service. In some embodiments, the user can access the digital service on a first device. In some embodiments, the first device can be a personal computer, a mobile phone, a smartphone, a tablet, a laptop, a desktop, and/or any other computing device. In some embodiments, the user can access a login page of the digital service. In some embodiments, the user can select to login with an authentication and identification service.

In some embodiments, the authentication and identification service can include a backend server system. In some embodiments, the digital service could be offered by a third-party separate from the party operating and offering the backend server system. In some embodiments, the backend server system can dynamically generate a unique session code. In some embodiments, the backend server system can store the dynamically generated session code in an electronic memory store. In some embodiments, the session code can correspond or be used by the user to access the digital service via the login page. In some embodiments, the backend server system can dynamically and/or automatically generate an identifier. In some embodiments, the backend server system can store the electronic identifier in an electronic memory store. In some embodiments, the backend server system can generate an electronic identifier in response to a request from the digital service. In some embodiments, the backend server system can be configured to generate a web application or a service login page or other programming code that can be included or incorporated into a digital service or a third-party website. In some embodiments, the web application or the service login page or other programming code can be implemented using various programming languages. In some embodiments, the various programming languages can include but is not limited to Extensible Markup Language (XML), HyperText Markup Language (HTML), Extensible HyperText Markup Language (XHTML), Javascript Object Notation (JSON), Cascading Style Sheets (CSS), and/or any other markup language. In some embodiments, the various programming languages can include Python, Go, Javascript, Node.js, Java, PHP, Swift, CSS, Kotlin, C++, Visual C++, C #, Dart, and/or any other programming language. In some embodiments, the backend server system can electronically transmit the electronic identifier and/or the web application or service login page or other programming code to the digital service.

In some embodiments, the digital service generates a code in response to a request originating from a web login, an IVR, or a badge reader. In some embodiments, the digital service receives details of the authentication (e.g., an authentication response) or the authenticated user. In some embodiments, the digital service can display the identifier and/or the web application or service login page or other programming code. In some embodiments, the digital service can display the identifier and/or the web application or service login page or other programming code as part of the login page of the digital service. In some embodiments, the digital service cannot have access to the identifier.

In some embodiments, the user can access user software. In some embodiments, the user can access the user software on a second device. In some embodiments, the second device can comprise a mobile phone, tablet, laptop, or other computing system. In some embodiments, the user can input the identifier into the user software operating, for example, on the second device. In some embodiments, the user software can display the identifier. In some embodiments, the user can input the identifier obtained from the user software into the web application or service login page. In some embodiments, the identifier can include a string of characters. In some embodiments, the identifier can include a barcode, a QR code, and/or any other machine-readable optical label. In some embodiments, the user can input the identifier by inputting the string of characters into the web application or service login page. In some embodiments, the user can input the identifier by inputting the string of characters into the user software. In some embodiments, the user can input the identifier into the user software, operating, for example, on the second device, by capturing an image of the barcode, the QR code and/or any other machine-readable optical label using a camera on the second device.

In some embodiments, if the user inputs the identifier into the user software, operating, for example, on a second device, the user software can electronically transmit the identifier from the second device to the backend server system. In some embodiments, the user software can electronically transmit a second device identification of the second device, a user identification, an organization identification, a time stamp, and/or any other data to the backend server system. In some embodiments, if the user inputs the identifier into the web application or service login page, the web application or service login page can electronically transmit the identifier to the backend server system. In some embodiments, the web application or service login page can transmit first device information of the first device, the session code, a time stamp and/or any other information to the backend server system.

In some embodiments, the backend server system can compare the identifier inputted by the user to the stored identifier stored in the electronic memory store of the backend server system. In some embodiments, the backend server system can compare any information transmitted to the backend server system from the user software and/or the web application or service login page to information stored by the backend server system. In some embodiments, if the identifier input by the user is not the same as the stored identifier, the backend server system can electronically transmit electronic instructions to deny the user access to the digital service. In some embodiments, if the transmitted electronic information is not the same as the information stored by the backend server system, the backend server system can electronically transmit instructions to deny the user access to the digital service. In some embodiments, if the identifier input by the user is the same as the stored identifier, the backend server system can electronically transmit electronic instructions to allow the user access to the digital service. In some embodiments, if the transmitted information is the same as the information stored by the backend server system, the backend server system can electronically transmit instructions to allow the user access to the digital service. In some embodiments, the backend server system can transmit instructions to the user software, the web application or service login page, and/or the login page of the digital service.

In some embodiments, the digital service can allow the user to access the digital service or deny the user access to the digital service. In some embodiments, the digital service can allow the user to access the digital service or deny the user access to the digital service based on the electronic instructions or electronic indications electronically transmitted by the backend server system to the digital service.

In some embodiments, the first device, the second device, the digital service, the web application or service login page, the user software, and/or the backend server system can electronically transmit information or otherwise electronically communicate via a federated protocol such as Security Assertion Markup Language (SAML) or OpenID Connect (OIDC). In some embodiments, the federated protocol can be any protocol or standard for exchanging and/or transmitting data between parties. In some embodiments, the federated protocol can be any protocol or standard for exchanging and/or transmitting data between an authentication service and a service provider, such as the digital service. In some embodiments, the federated protocol can be any protocol or standard that can verify an identity of a user. In some embodiments, the federated protocol can include data encryption. In some embodiments, the federated protocol can use JavaScript Object Notation (JSON) and/or any other file format or data interchange format. In some embodiments, the federated protocol can store and/or transmit data or data objects. In some embodiments, the data or data objects can include attribute-value pairs and/or arrays. In some embodiments, the first device, the second device, the digital service, the web application or service login page, the user software, and/or the backend can electronically transmit information or otherwise electronically communicate via a WebSocket connection. In some embodiments, the first device, the second device, the digital service, the web application or service login page, the user software, and/or the backend can electronically transmit information or otherwise electronically communicate via requests using the federated protocol such as SAML or OIDC. In some embodiments, the first device, the second device, the digital service, the web application or service login page, the user software, and/or the backend can electronically transmit information or otherwise electronically communicate via server calls.

In some embodiments, the first device and the second device can be the same device. In some embodiments, the user software, the web application or service login page, and/or the digital service can automatically determine that the first device and the second device are the same device. In some embodiments, the user software can automatically transmit the identifier to the web application or service login page, and/or the digital service. In some embodiments, the web application or service login page, and/or the digital service can automatically transmit the identifier to the user software. In some embodiments, the identifier can include an indication, a confirmation, and/or a determination that the first device and the second device are the same device. In some embodiments, if the first device and the second device are the same device, the user software, the web application or service login page, the digital service, and/or the backend can automatically allow the user access to the digital service. In some embodiments, if the first device and the second device are the same device, the user software, the web application or service login page, the digital service, and/or the backend can automatically allow the user access to the digital service without transmitting the identifier.

In some embodiments, the backend can store information. In some embodiments, the backend can store information in a database. In some embodiments, the backend can store information in a metadata database and/or an identifier database.

In some embodiments, a digital service can request a unique identifier when a user attempts to login to the digital service and/or a second user attempts to perform an action for the user. In response to the request, an authentication server can dynamically generate the unique identifier. In some embodiments, the digital service can redirect the user to the authentication server when the user attempts to login to the digital service. In some embodiments, the unique identifier can include a numeric and/or alpha-numeric string. In some embodiments, the authentication server can generate the unique identifier just-in-time.

In some embodiments, the authentication server can transmit the unique identifier to the digital service. The digital service can display the unique identifier to user when the user attempts to log into a user account. In some embodiments, the digital service can display the unique identifier during an authentication sequence via a user interface provided by the digital service. In some embodiments, the authentication server can display the unique identifier to the user via a user interface provided by the authentication server. It will be appreciated that in any of the embodiments disclosed herein, the authentication server can display the unique identifier to the user via the user interface provided by the authentication server. In these embodiments, the authentication server does not transmit the unique identifier to the digital service. In some embodiments, the user can enter the unique identifier into an authentication client. The authentication client can transmit the entered unique identifier to the authentication server.

In some embodiments, the authentication server can send the unique identifier to the authentication client and the authentication client can display the unique identifier to the user via a graphical user interface. In some embodiments, the authentication client can display the unique identifier when the user attempts to log in to the user account and/or the digital service. In some embodiments, the user can enter the unique identifier into the digital service and the digital service can transmit the unique identifier to the authentication server. In some embodiments, the user can enter the unique identifier to the user interface when the user attempts to login to the digital service.

In some embodiments the authentication server can determine if the entered unique identifier is valid. In some embodiments, the authentication server can compare the entered unique identifier to the unique identifier displayed by the digital service or the user interface to determine if the entered unique identifier is valid. In some embodiments, the authentication server can use information from the authentication client to identify and/or authenticate the human user.

In some embodiments the authentication client can display one or more user selectable identifiers. In these embodiments, the user can select one of the one or more user selectable identifiers to enter the unique identifier into the authentication client. In some embodiments, the digital service can display one or more user selectable identifiers. In these embodiments, the user can select one of the one or more user selectable identifiers to enter the unique identifier into the digital service. In some embodiments, the authentication client and/or the user interface can display the one or more user selectable identifiers. In these embodiments, the user can select or match the one or more user selectable identifiers to enter the unique identifier into the authentication client and/or the authentication server.

In some embodiments, the user can enter the unique identifier by verbally communicating the unique identifier to a second user. The second user can transmit the verbally communicated unique identifier to the authentication client. In some embodiments, the second user can transmit the verbally communicated identifier to the digital service and/or the user interface.

In some embodiments, the user can receive the unique identifier via an interactive voice response (IVR) system. In some embodiments, the user can enter the unique identifier via an interactive voice response (IVR) system using touch-tones and/or voice responses. In some embodiments, the user can enter the unique identifier via an authentication client or authentication application (e.g., installed on the user's mobile device).

In some embodiments, the digital service can request a unique validator. In response to the request, the authentication server can dynamically generate the unique validator. In some embodiments, the digital service can redirect the user to the authentication server and the authentication server can display the unique validator to the user. In some embodiments the unique validator can include a numeric and/or alphanumeric string. In some embodiments, the authentication server can generate the unique validator just in time. In some embodiments, the unique validator can be not unique.

In some embodiments, the authentication server can transmit the unique validator to the digital service. The digital service can display the unique validator to the user when the user attempts to log into the user account and/or the digital service. In some embodiments, the digital service can display the unique validator during the authentication sequence. In some embodiments, the authentication server can display the unique validator to the user via the user interface when the user attempts to login to the user account and/or the digital service. In some embodiments the user can enter the unique validator into the authentication client. The authentication client can transmit and entered unique validator to the authentication server In some embodiments, the authentication server can transmit the unique validator to the authentication client. The authentication client can display the unique validator to the user when the user attempts to log into the user account and/or the digital service. In some embodiments, the authentication client can display the unique validator during the authentication sequence. In some embodiments, the user can enter the unique validator into the digital service. The digital service can transmit the entered unique validator to the authentication server. In some embodiments, the user can enter the unique validator into the user interface.

In some embodiments, the authentication server can determine if the entered unique validator is valid. In some embodiments, the authentication server can compare the entered unique validator to the unique validator displayed by the digital service or the user interface to determine if the entered unique validator is valid. In some embodiments, the authentication server can use information from the authentication client to identify and/or authenticate the human user.

In some embodiments, the authentication client can display one or more user selectable validators. In these embodiments, the user can select the one or more user selectable validators to enter the unique validator and to the authentication client. In some embodiments, the digital service can display one or more user selectable validators. In these embodiments, the user can select one of the one or more user selectable validators to enter the unique validator into the digital service. In some embodiments, the authentication client and/or the user interface can display the one or more user selectable validators. In these embodiments, the user can select or match the one or more user selectable validators to enter the unique validator into the authentication client and/or the authentication server.

In some embodiments, a second user can enter the unique validator by verbally communicating the unique identifier to the user. The user can transmit the verbally communicated unique validator to the authentication client. In some embodiments, the second user can transmit the verbally communicated validator to the digital service or the user interface.

In some embodiments, the user can receive the unique validator via an interactive voice response (IVR) system. In some embodiments, the user can enter the unique validator via an IVR system using touch-tones and/or voice responses. In some embodiments, the user can enter the unique validator via an authentication client or authentication application (e.g., installed on the user's mobile device).

In some embodiments, the authentication server can transmit an authentication response and user information to the authentication client. In some embodiments, the authentication server can transmit the authentication response and the user information to the digital service.

In some embodiments, the authentication server can generate two or more unique identifiers. The authentication server can generate the two or more unique identifiers at a predetermined time interval. In some embodiments, the authentication server can store the two or more unique identifiers for a period of time greater than the predetermined time interval.

In some embodiments, the authentication client can generate two or more unique identifiers. In some embodiments, the two or more unique identifiers can be the same two or more unique identifiers generated by the authentication server.

In some embodiments the authentication client can display the two or more unique identifiers to the user. The user can enter the two or more unique identifiers into the digital service. In some embodiments the digital service can transmit the entered two or more unique identifiers to the authentication server. In some embodiments, the user can enter the two or more unique identifiers into the user interface.

In some embodiments, the authentication server can validate the entered two or more unique identifiers. In some embodiments, if the entered two or more unique identifiers are valid, the authentication server can identify and authenticate a user associated with the entered two or more unique identifiers. The authentication server can transmit an authentication response and user information to the digital service.

In some embodiments, a server agent can generate one or more unique identifiers at the predetermined time interval. The server agent can store the one or more unique identifiers for a period of time greater than the predetermined time interval. In some embodiments, a client agent can generate one or more unique identifiers. In these embodiments, the one or more unique identifiers generated by the client agent can match the one or more unique identifiers generated by the server agent.

In some embodiments, a first software can request one or more unique identifiers from the client agent and the client agent can transmit the one or more unique identifiers to the first software. In some embodiments the first software can transmit the one or more unique identifiers to a second software. To identify and authenticate a computer system or the first software, the second software can transmit the one or more unique identifiers to the server agent.

In some embodiments, the server agent can compare the one or more unique identifiers to the one or more unique identifiers generated by the server agent to validate the one or more unique identifiers. In some embodiments, if the one or more unique identifiers are valid, the server agent can transmit an authentication response and first software information to the second software. In some embodiments, based on the authentication response, the second software can grant access to the first software.

In some embodiments, the first software can request one or more unique identifiers from a first client agent. In response to the request, the authentication server can generate one or more unique identifiers. The authentication server can transmit the one or more unique identifiers to the first client agent. In some embodiments, the first software can transmit the one or more or more unique identifiers to a second software.

In some embodiments, the second software can transmit the one or more unique identifiers to a second client agent, and the second client agent can transmit the one or more unique identifiers to the authentication server.

In some embodiments, the authentication server can validate the one or more unique identifiers. Based on the validation the authentication server can transmit an authentication response and first software information to the second client agent. In some embodiments, based on the authentication response, the second software can grant access to the first software.

In some embodiments, the authentication server can mutually identify and authenticate the user and the second user. The user can request a unique identifier from a first authentication client and in response to the request the authentication server can generate a unique identifier. In some embodiments, the authentication server can transmit the unique identifier to the first authentication client and the first authentication client can transmit the unique identifier to the user.

In some embodiments the user can communicate or transmit the unique identifier to the second user. The second user can transmit the unique identifier to a second authentication client. The second authentication client can transmit the unique identifier to the authentication server. In some embodiments, the authentication server can validate the unique identifier transmitted from the second authentication client. If the unique identifier is valid, the authentication server can authenticate and identify both the user and the second user.

In some embodiments, the user can request a unique validator from the first authentication client and in response to the request the authentication server can generate a unique validator. In some embodiments, the authentication server can transmit the unique validator to the first authentication client and the first authentication client can transmit the unique validator to the user.

In some embodiments the user can communicate or transmit the unique validator to the second user. The second user can transmit the unique validator to a second authentication client. The second authentication client can transmit the unique validator to the authentication server. In some embodiments, the authentication server can validate the unique validator transmitted from the second authentication client. If the unique validator is valid, the authentication server can authenticate and identify both the user and the second user.

In some embodiments, the authentication server can transmit user information to the second authentication client, and the second authentication client can display the user information to the second user. In some embodiments, the authentication server can transmit second user information to the first authentication client, and the first authentication client can display the second user information to the user.

FIGS. 1-8

Turning now to the figures, FIGS. 1-8 show methods for dynamic authentication and identification. It should be understood that the various steps described in these methods may be performed in different orders than the ones presented, and that certain steps may be optionally performed.

More specifically, FIG. 1 shows a method of user identification and authentication using service-initiated, unique dynamic identifiers. A dynamic identifier can be presented to a user via a digital service, and that dynamic identifier can be used to identify and authenticate the user.

At circle 1, a digital service may request an authentication server generate a unique dynamic identifier. In some embodiments, the dynamic identifier may be generated just-in-time. In some embodiments, the dynamic identifier may be numeric or alpha-numeric string of suitable length. At circle 2, the authentication server may send the dynamic identifier to the requesting digital service. At circle 3, the digital service may display the dynamic identifier to the user attempting to login during the authentication sequence. At circle 4, the user may enter the displayed dynamic identifier into a pre-registered authentication client (e.g., an authentication application installed on a mobile device). At circle 5, the authentication client may send the dynamic identifier to the authentication server. At circle 6, the authentication server may validate the dynamic identifier (e.g., determine that it was recently generated by the authentication server). If the identifier is valid, the authentication server may use information associated with the authentication client (e.g., provided by the authentication client) to identify and authenticate the user.

In some embodiments, at circle 7, the authentication server may generate and send a dynamic validator to the digital service. In some embodiments, the dynamic validator may be generated just-in-time. In some embodiments, the dynamic validator may be a numeric or alpha-numeric string of suitable length. At circle 8, the digital service may display the dynamic validator to the user. At circle 9, the user may enter or choose (e.g., select it from among options) the displayed dynamic validator in the authentication client. At circle 10, the authentication client may send the entered dynamic validator to the authentication server. At circle 11, the authentication server may validate the dynamic validator. If valid, the user may be considered authenticated. At circle 12, the authentication server may send an authentication response to the requesting digital service along with the authenticated user's information.

This identification and authentication method may be resistant to known credential attacks, replay attacks, man-in-the-middle attacks, and brute-force style attacks. This method also completely eliminates the possibility of MFA Prompt Spamming/MFA Fatigue style attacks. Circles 7-11 may additionally provide risk reduction mechanisms to eliminate all possibilities of collisions due to human error while the user enters the dynamic identifier in the authentication client.

Figure 2:
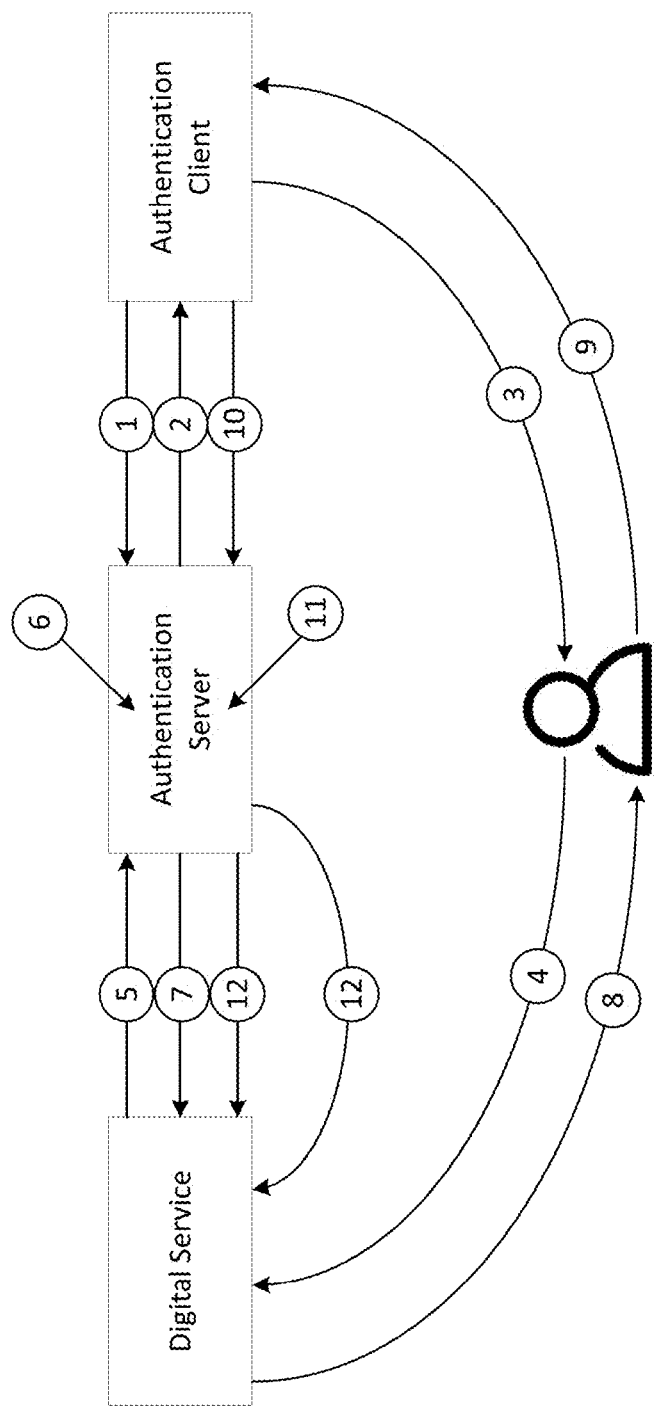
FIG. 2 shows a method of user identification and authentication using client-initiated, unique dynamic identifiers, in accordance with embodiments of the present application.

FIG. 2 shows a method of user identification and authentication using client-initiated, unique dynamic identifiers. A dynamic identifier can be generated for a specific human user via their authentication client, and that dynamic identifier can be used to identify and authenticate the user to digital services.

At circle 1, an authentication server may generate a unique dynamic identifier upon request from a pre-registered authentication client. In some embodiments, the authentication server may generate the dynamic identifier just-in-time. In some embodiments, the dynamic identifier may be a numeric or alpha-numeric string of suitable length. At circle 2, the authentication server may send the dynamic identifier to the requesting authentication client. At circle 3, the authentication client may display the dynamic identifier to the user that is attempting to login during the authentication sequence. At circle 4, the user may enter the displayed dynamic identifier into a supported digital service during the login sequence. At circle 5, the digital service may send the dynamic identifier to the authentication server. At circle 6, the authentication server may validate the dynamic identifier. If valid, the authentication server may identify the user registered to the authentication client that the dynamic identifier was issued to.

In some embodiments, at circle 7, the authentication server may generate and send a dynamic validator to the digital service. In some embodiments, the dynamic validator may be generated just-in-time. In some embodiments, the dynamic validator may be a numeric or alpha-numeric string of suitable length. At circle 8, the digital service may display the dynamic validator to the user. At circle 9, the user may enter or choose (e.g., select from among presented options) the displayed dynamic validator in the authentication client. At circle 10, the authentication client may send the entered dynamic validator to the authentication server. At circle 11, the authentication server may validate the dynamic validator (e.g., that it matches the one that was generated). If valid, then the user may be considered authenticated. At circle 12, the authentication server may send an authentication response to the requesting digital service along with the authenticated user's information.

This identification and authentication method may be resistant to known credential attacks, replay attacks, man-in-the-middle attacks and denial-of-service style attacks. It also eliminates the possibility of MFA Prompt Spamming/MFA Fatigue style attacks. Circles 6-10 may additionally provide risk reduction mechanisms to eliminate identifier guessing or brute-force style attacks.

Figure 3:
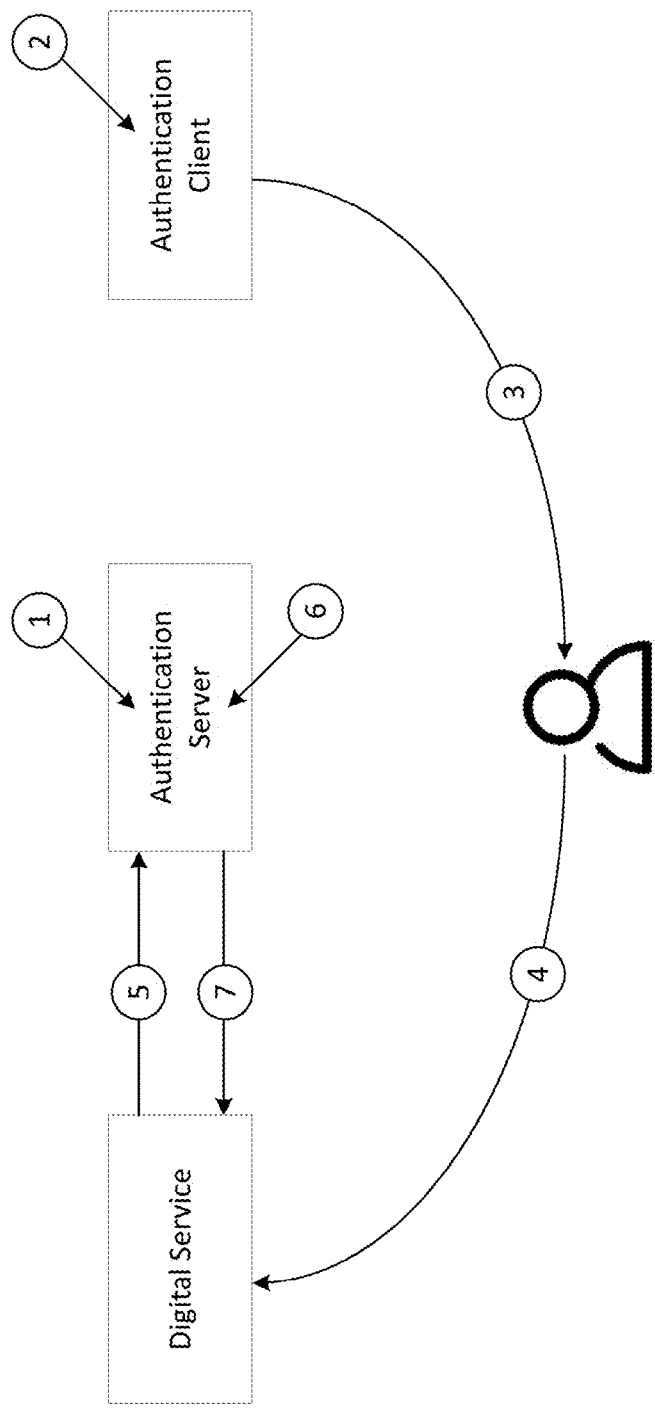
FIG. 3 shows a method of user identification and authentication using non-unique dynamic identifiers, in accordance with embodiments of the present application.

FIG. 3 shows a method of user identification and authentication using non-unique dynamic identifiers. Two or more dynamic identifiers can be independently generated by an authentication client and an authentication server, and the dynamic identifiers can be matched to identify and authenticate a user to digital services.

At circle 1, an authentication server may generate two or more dynamic identifiers at regular time-intervals for each of the users registered with the authentication system. The dynamic identifiers may be stored for a period of time that is greater than the time-interval. In some embodiments, the dynamic identifiers may be numeric or alpha-numeric strings of suitable length. In some embodiments, the dynamic identifiers may be generated based on a time-based random number algorithm. At circle 2, an authentication client may generate two or more dynamic identifiers that match those generated by the authentication server during the same time-interval. In some embodiments, the dynamic identifiers may be generated based on the same time-based random number algorithm as the algorithm used by the authentication server. In some embodiments, the dynamic identifiers may be numeric or alpha-numeric strings of suitable length. At circle 3, the authentication client may display the dynamic identifiers to the user attempting to login during the authentication sequence. At circle 4, the user may enter the displayed dynamic identifiers into a supported digital service during the login sequence. At circle 5, the digital service may send the dynamic identifiers to the authentication server. At circle 6, the authentication server may validate the dynamic identifiers. If valid, the authentication server may identify and authenticate the registered user that has the matching set of identifiers during that same time-interval. At circle 7, the authentication server may send an authentication response to the requesting digital service along with the authenticated user's information.

This identification and authentication method may be used when there is no connectivity between the authentication client and the authentication server to facilitate the transmission of dynamic identifiers. Two or more dynamic identifiers are necessary to eliminate collisions, uniquely identify the human user and prevent brute-force style attacks. It is resistant to known credential attacks, replay attacks, man-in-the-middle attacks. It also completely eliminates the possibility of MFA Prompt Spamming/MFA Fatigue style attacks.

Figure 4:
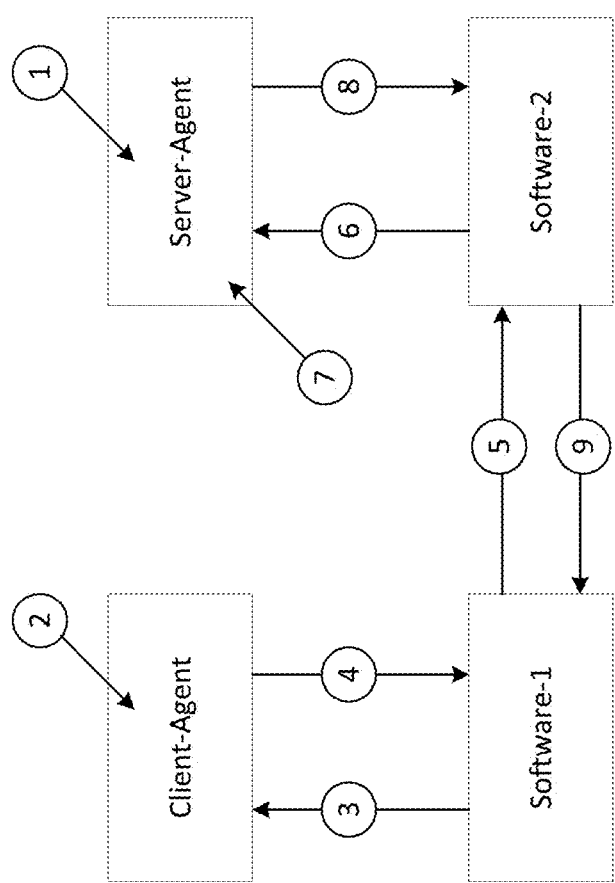
FIG. 4 shows a method of using dynamic identifiers for machine to machine identification & authentication via agents, in accordance with embodiments of the present application.

FIG. 4 shows a method of using dynamic identifiers for machine to machine identification & authentication via agents. One or more dynamic identifiers may be independently generated in server and client-agents, and the dynamic identifiers can be matched to identify and authenticate machines to other machines.

At circle 1, a server-agent may generate one or more dynamic identifiers at regular time-intervals. The dynamic identifiers may be stored for a period of time greater than the time-interval. In some embodiments, the dynamic identifiers may be generated based on a time-based random number algorithm, for each client registered with the server-agent. In some embodiments, the dynamic identifiers may be numeric or alpha-numeric strings of suitable length. At circle 2, a client-agent may generate one or more dynamic identifiers that match those generated by the server-agent during the same time-interval. In some embodiments, the dynamic identifiers may be generated based on the same time-based random number algorithm used by the server-agent. In some embodiments, the dynamic identifiers may be numeric or alpha-numeric strings of suitable length. At circle 3, an allowed software-1 may request dynamic identifiers from the client-agent. At circle 4, the client-agent may send the dynamic identifiers to the requesting software-1. At circle 5, the software-1 may send the dynamic identifiers to a software-2 that it can be identified and authenticated for. At circle 6, software-2 may send the dynamic identifiers to the server-agent. At circle 7, the server-agent may validate the dynamic identifiers. If valid, the server-agent may identify and authenticate software-1. At circle 8, the server-agent may send an authentication response to the requesting software-2 along with the authenticated software-1's information. At circle 9, software-2 may respond to software-1.

This identification and authentication method may be used when there is no human user involved. It is resistant to known credential attacks, replay attacks, man-in-the-middle attacks and brute-force style attacks.

Figure 5:
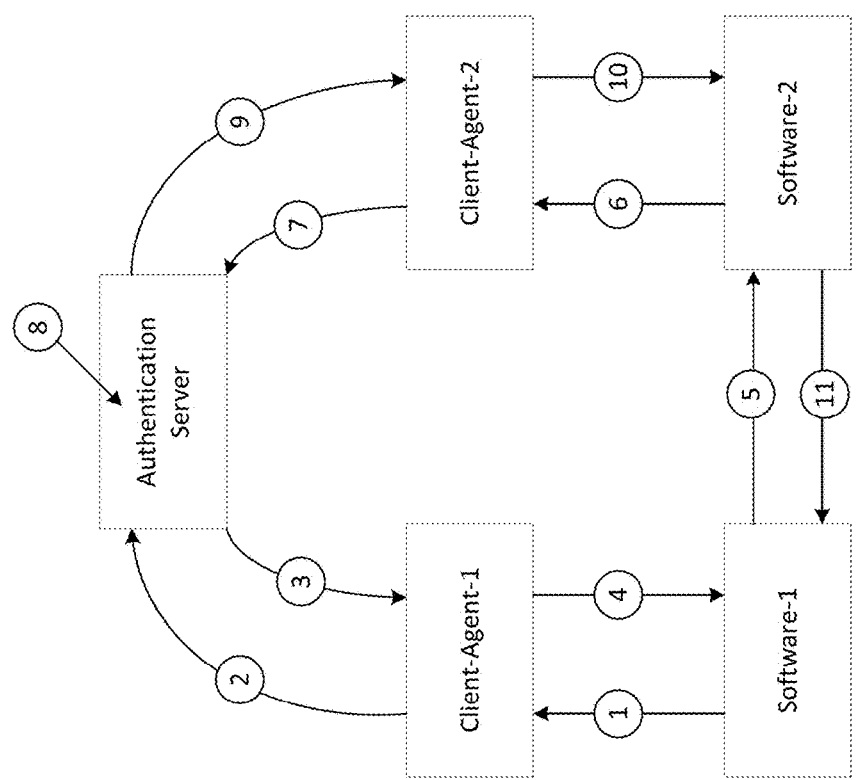
FIG. 5 shows a method of using dynamic identifiers for machine to machine identification & authentication via agents and a centralized authentication server, in accordance with embodiments of the present application.

FIG. 5 shows a method of using dynamic identifiers for machine to machine identification & authentication via agents and a centralized authentication server. One or more dynamic identifiers may be generated by an authentication server for a specific client-agent. and the dynamic identifiers can be used to identify and authenticate one machine or software to another machine or software.

At circle 1, an allowed software-1 may request dynamic identifiers from client-agent-1. At circle 2, an authentication server may generate one or more unique dynamic identifiers upon request from a pre-registered client-agent-1. In some embodiments, the dynamic identifiers may be generated just-in-time. In some embodiments, the dynamic identifiers may be numeric or alpha-numeric strings of suitable length. At circle 3, the authentication server may send the dynamic identifiers to the requesting client-agent-1. At circle 4, the client-agent-1 may send the dynamic identifiers to software-1. At circle 5, the software-1 may send the dynamic identifiers to a software-2 that it would like to identify and authenticate to. At circle 6, software-2 may send the dynamic identifiers to client-agent-2. At circle 7, the client-agent-2 may send the dynamic identifiers to the authentication server. At circle 8, the authentication server may validate the dynamic identifiers. If valid, the authentication server may identify and authenticate the client-agent-1 that the dynamic identifiers were issued to. At circle 9, the authentication server may send an authentication response to client-agent-2 along with the authenticated software-1's information. At circle 10, the client-agent-2 may respond to the software-2 with the authenticated software-1's information. At circle 11, software-1 may respond to the authenticated software-1.

This identification and authentication method may be used when there is no human user involved and when the generation and storage of dynamic identifiers cannot be done locally via agents. This method allows for machines to mutually authenticate and does not require one machine to have any prior knowledge of the other. It also prevents the need to distribute and store static identifiers external to a digital system. It is resistant to known credential attacks, replay attacks, man-in-the-middle attacks.

Figure 6:
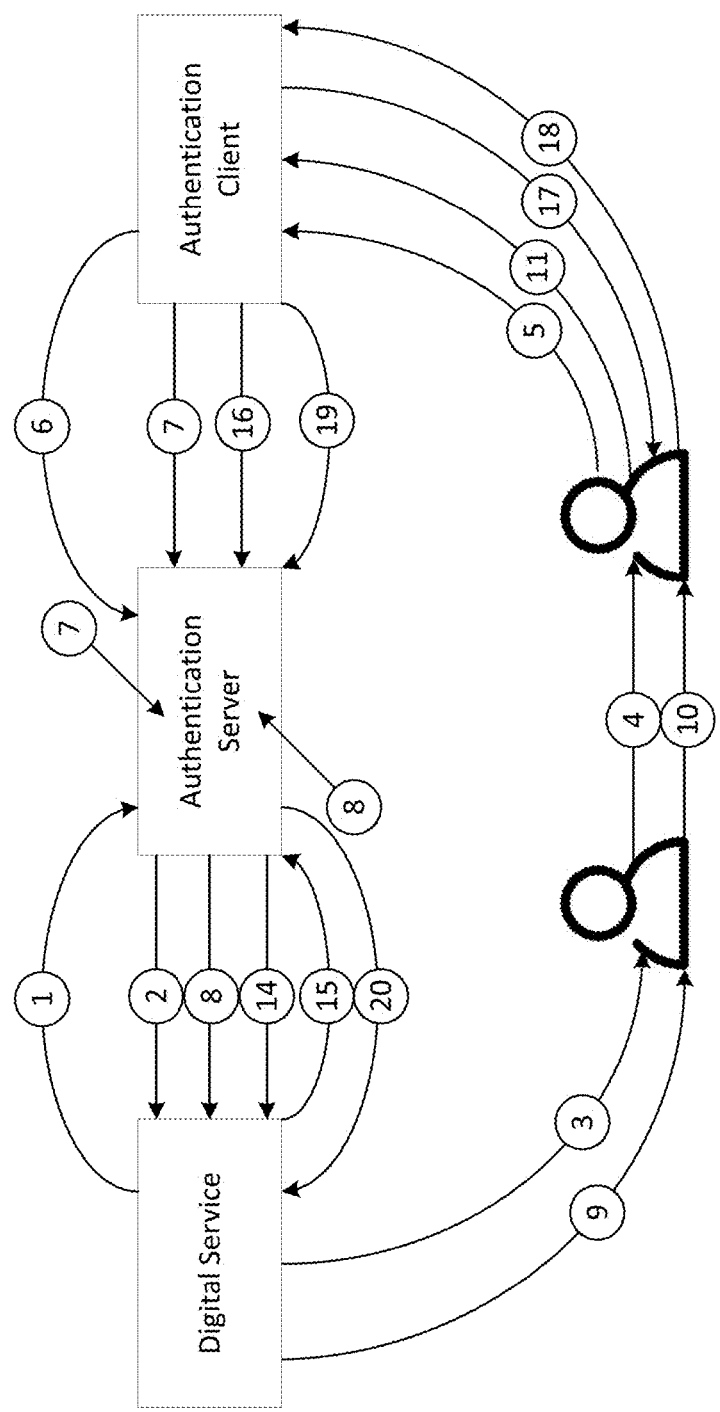
FIG. 6 shows a method of using service-initiated, dynamic identifiers for user identification & authentication via a verbal or digital medium, in accordance with embodiments of the present application.

FIG. 6 shows a method of using service-initiated, dynamic identifiers for user identification & authentication via a verbal or digital medium. A unique dynamic identifier may be presented to human user for identifying and authenticating another human user via a verbal or digital medium, and the authenticated user may be optionally authorized to take action on behalf of themselves.

At circle 1, an authentication server may generate a dynamic identifier upon request from a digital service. In some embodiments, the dynamic identifier may be generated just-in-time. In some embodiments, the dynamic identifier may be a numeric or alpha-numeric string of suitable length. At circle 2, the authentication server may send the dynamic identifier to the requesting digital service. At circle 3, the requesting digital service may display the dynamic identifier to human-user-1. At circle 4, human-user-1 may communicate the dynamic identifier to human-user-2 via a verbal or digital medium (human-user-2 may be the user wanting to be identified and authenticated). At circle 5, human-user-2 may enter the displayed dynamic identifier into a pre-registered authentication client. At circle 6, the authentication client may send the dynamic identifier to the authentication server. At circle 7, the authentication server may validate the dynamic identifier. If valid, the authentication server may use information provided by the sending authentication client to identify and authenticate the human-user-2.

In some embodiments, at circle 8, the authentication server may send a dynamic validator to the digital service. In some embodiments, the dynamic validator may be generated just-in-time. In some embodiments, the dynamic validator may be a numeric or alpha-numeric string of suitable length. At circle 9, the requesting digital service may display the dynamic validator to the human-user-1. At circle 10, the human-user-1 may communicate the dynamic validator to human-user-2 via verbal or digital medium (human-user-2 is the user who is wanting to be identified and authenticated). At circle 11, human-user-2 may enter the dynamic validator into the authentication client. At circle 12, the authentication client may send the dynamic validator to the authentication server. At circle 13, the authentication server may validate the dynamic validator. At circle 14, the authentication server may send an authentication response to the requesting digital service along with the authenticated user's information. At circle 15, the requesting digital service may optionally send an authorization request to the authentication server when any action is required to be taken by human-user-1 on behalf of the authenticated user, human-user-2. At circle 16, the authentication server may send an authorization request to human-user-2's registered authentication client. At circle 17, the authentication client may display the authorization request to human-user-2. At circle 18, human-user-2 may acknowledge the authorization request. At circle 19, the authentication client may send an authorization response to the authentication server. At circle 20, the authentication server may validate the authorization response and respond to the requesting digital service to authorize the requested action.

This identification and authentication method may be resistant to known credential attacks, immune to social engineering style attacks, replay attacks, man-in-the-middle attacks and brute-force style attacks. It also completely eliminates the possibility of MFA Prompt Spamming/MFA Fatigue style attacks. Circles 8-13 may additionally serve to eliminate all possibilities of collisions due to human error while entering the dynamic identifier in the authentication client. Circles 15-19 may be used to allow the authenticated human user to authorize another human user to act on their behalf.

Figure 7:
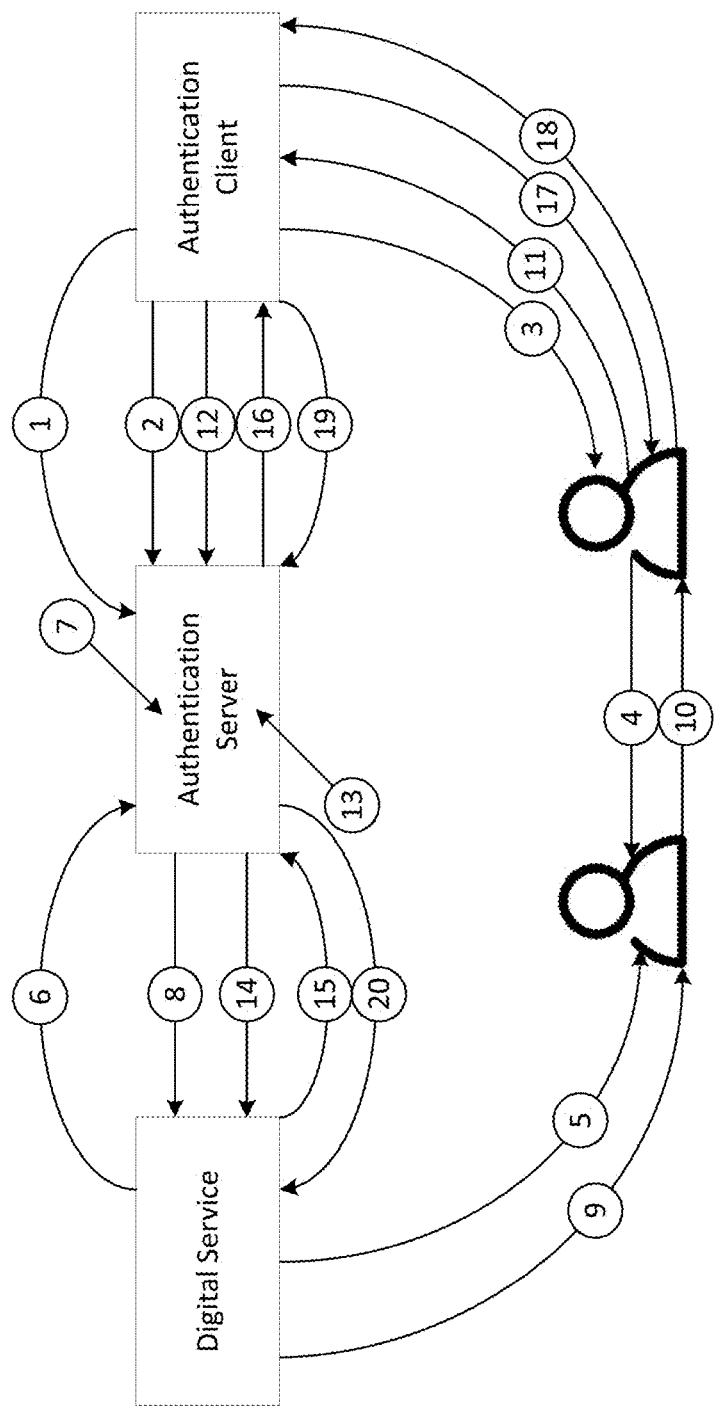
FIG. 7 shows a method of using client-initiated, dynamic identifiers for user identification & authentication via a verbal or digital medium, in accordance with embodiments of the present application.

FIG. 7 shows a method of using client-initiated, dynamic identifiers for user identification & authentication via a verbal or digital medium. A unique dynamic identifier may be generated for a specific human user for identifying and authenticating themselves via a verbal or digital medium, and the user may be able to optionally authorize another user to take action on behalf of themselves.

At circle 1, an authentication server may generate a unique dynamic identifier upon request from a pre-registered authentication client. In some embodiments, the dynamic identifier may be generated just-in-time. In some embodiments, the dynamic identifier may be a numeric or alpha-numeric string of suitable length. At circle 2, the authentication server may send the dynamic identifier to the requesting authentication client. At circle 3, the authentication client may display the dynamic identifier to human-user-1. At circle 4, the human-user-1 that is wanting to identify and authenticate themselves, may communicate, via a verbal or digital medium, the dynamic identifier to human-user-2. At circle 5, the human-user-2 may enter the displayed dynamic identifier into a supported digital service during the identification sequence. At circle 6, the digital service may send the dynamic identifier to the authentication server. At circle 7, the authentication server may validate the dynamic identifier. If valid, the authentication server may identify and authenticate human-user-1, who is registered to the authentication client that the dynamic identifier was issued to.

In some embodiments, at circle 8, the authentication server sending a dynamic validator to the requesting digital service. In some embodiments, the dynamic validator may be generated just-in-time. In some embodiments, the dynamic validator may be a numeric or alpha-numeric string of suitable length. At circle 9, the requesting digital service may display the dynamic validator to the human-user-2. At circle 10, the human-user-2 may communicate, via a verbal or digital medium, the dynamic validator to human-user-1 who was identified and authenticated in the previous step. At circle 11, the human-user-1 may enter the dynamic validator into the authentication client. At circle 12, the authentication client may send the dynamic validator to the authentication server. At circle 13, the authentication server may validate the dynamic validator. At circle 14, the authentication server may send an authentication response to the requesting digital service along with authenticated human-user-1's information. At circle 15, the requesting digital service may optionally send an authorization request to the authentication server when any action is required to be taken by human-user-2 on behalf of the authenticated user, human-user-1. At circle 16, the authentication server may send an authorization request to human-user-1's registered authentication client. At circle 17, the authentication client may display the authorization request to human-user-1. At circle 18, human-user-1 may acknowledge the authorization request. At circle 19, the authentication client may send an authorization response to the authentication server. At circle 20, the authentication server may validate the authorization response and respond to the requesting digital service to authorize the requested action.

This identification and authentication method may be resistant to known credential attacks, immune to social engineering style attacks, replay attacks, man-in-the-middle attacks and brute-force style attacks. It also completely eliminates the possibility of MFA Prompt Spamming/MFA Fatigue style attacks. Circles 7-12 in particular may be used to prevent identity fraud. This method also allows the human user wanting to authenticate and validate the legitimacy of a digital service even in a verbal medium. Circles 14-18 may be used to allow the authenticated human user to authorize another human user to act on their behalf.

Figure 8:
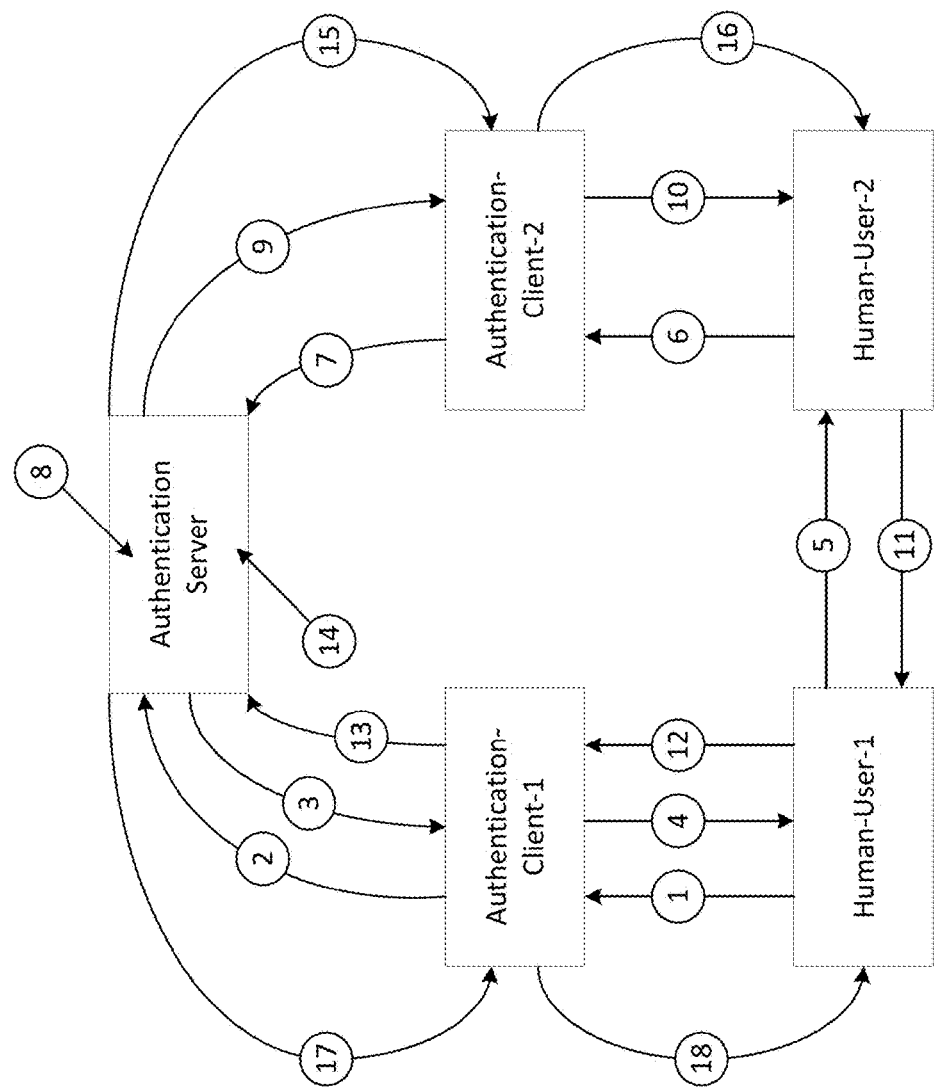
FIG. 8 shows a method of using unique dynamic identifiers for mutual identification & authentication of users via a verbal or digital medium, in accordance with embodiments of the present application.

FIG. 8 shows a method of using unique dynamic identifiers for mutual identification & authentication of users via a verbal or digital medium.

At circle 1, a human-user-1 may request a dynamic identifier from authentication-client-1. At circle 2, an authentication server may generate a unique dynamic identifier upon request from a pre-registered authentication-client-1. In some embodiments, the dynamic identifier may be generated just-in-time. In some embodiments, the dynamic identifier may be a numeric or alpha-numeric string of suitable length. At circle 3, authentication server may send the dynamic identifier to the requesting authentication-client-1. At circle 4, the authentication-client-1 may display the dynamic identifier to human-user-1. At circle 5, the human-user-1 who is registered with authentication-client-1, may communicate, via a verbal or digital medium, the dynamic identifier to human-user-2. At circle 6, the human-user-2 may enter the dynamic identifier into their registered authentication-client-2. At circle 7, the authentication-client-2 may send the dynamic identifier to the authentication server. At circle 8, the authentication server may validate the dynamic identifier. If valid, the authentication server may identify and authenticate human-user-1, who is registered to the authentication-client-1 that the dynamic identifier was issued to. The authentication server may also identify and authenticate human-user-2, using information provided by the authentication-client-2.

In some embodiments, at circle 9, the authentication server may send a dynamic validator to authentication-client-2. In some embodiments, the dynamic validator may be generated just-in-time. In some embodiments, the dynamic validator may be a numeric or alpha-numeric string of suitable length. At circle 10, the authentication-client-2 may display the dynamic validator to human-user-2. At circle 11, the human-user-2 who is registered with authentication-client-2, may communicate, via a verbal or digital medium, the dynamic validator to human-user-1. At circle 12, a human-user-1 may enter the dynamic validator into their registered authentication-client-1. At circle 13, the authentication-client-1 may send the dynamic validator to the authentication server. At circle 14, the authentication server may validate the dynamic validator. At circle 15, the authentication server may send human-user-1's information to authentication-client-2. At circle 16, the authentication-client-2 may display human-user-1's information to human-user-2. At circle 17, the authentication server may send human-user-2's information to authentication-client-1. At circle 18, the authentication-client-1 may display human-user-2's information to human-user-1.

This identification and authentication method may allow human users, with no prior knowledge of each other, to mutually identify and authenticate each other via a verbal or digital medium. This method may be resistant to known credential attacks, immune to social engineering style attacks, replay attacks, man-in-the-middle attacks and brute-force style attacks. It also completely eliminates the possibility of MFA Prompt Spamming/MFA Fatigue style attacks. Additionally, circles 7-11 may be used as risk-reduction mechanisms to prevent identity fraud.

FIGS. 9A-9F

Figure 9A:
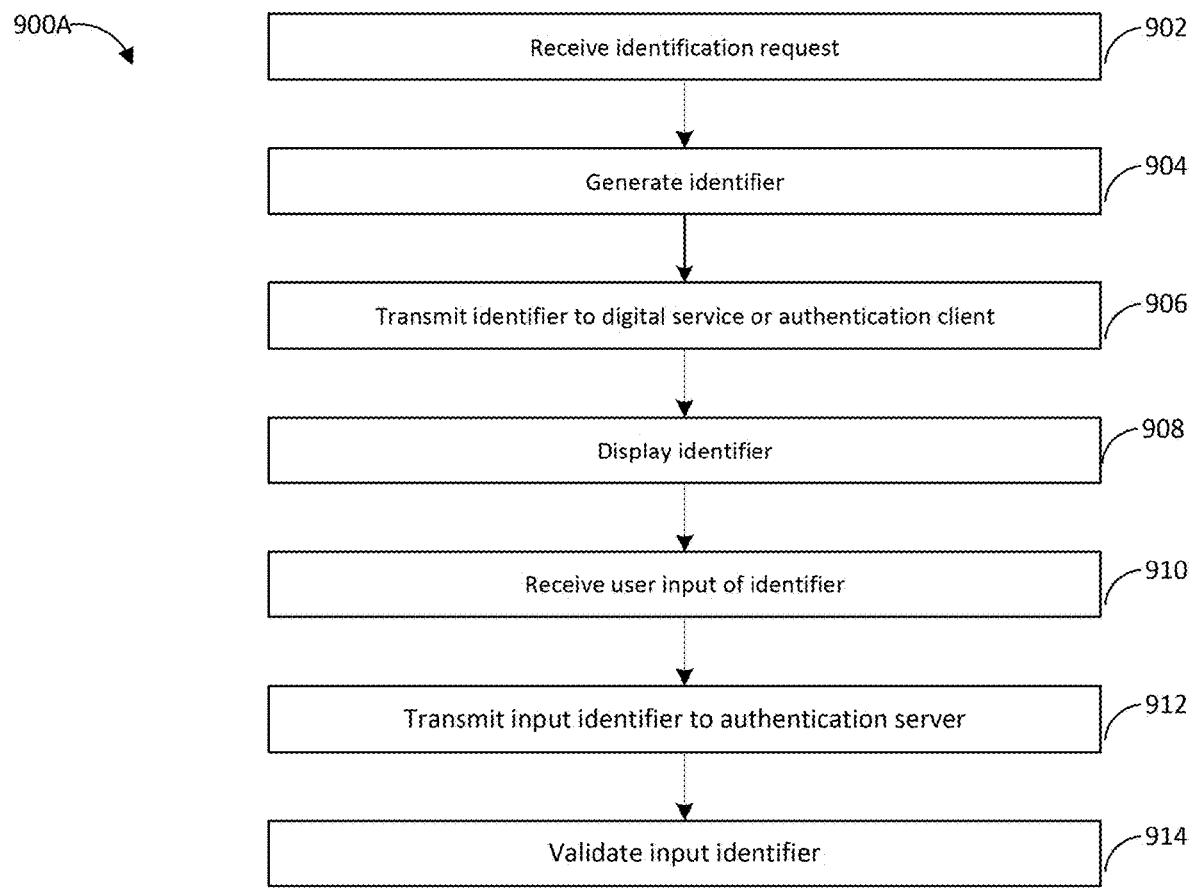
FIGS. 9A-9F are schematics of various methods for dynamic authentication and identification, in accordance with embodiments of the present application.

FIGS. 9A-9F show methods 900A-900F for dynamic authentication and identification. The first step 902 of method 900A, as shown in FIG. 9A, can include receiving an identification request. The identification request can be an identification request or an authentication request. In some embodiments, the identification request can be received by an authentication server. The authentication server can include any hosted software capable of generating, transmitting, receiving, and validating dynamic identifiers and/or validators, and/or responding to requests. The authentication server can receive the identification request from a digital service or an authentication client. In some embodiments, the digital service can include a web-based-application, a mobile application, a software thick client, a virtual appliance, a virtual environment, and/or any other internet or intranet based interface. In some embodiments, the authentication client can include a mobile application, a software thick client, a web client, a web plugin, a script, an internet-of-things (IoT) device and/or any other digital interface.

In response to receiving the identification request, the authentication server can generate an identifier at step 904. The identifier can include one or more identifiers. In some embodiments, the identifier can be generated by the authentication server just-in-time. In some embodiments, the identifier can include a unique dynamic identifier. The unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters.

At step 906, the authentication server can transmit the identifier. In embodiments where the authentication server receives the identification request, at step 902, from the digital service, the authentication server can transmit the identifier to the digital service and/or a user interface provided by the authentication server. In embodiments where the authentication server receives the identification request, at step 902, from the authentication client, the authentication server can transmit the identifier to the authentication client.

At step 908, the digital service, the user interface or the authentication client can display the transmitted identifier to the user via a graphical user interface (GUI) of a user device. The user device can include a personal computer, a cellular phone, a smartphone, a laptop, a tablet computer, an e-reader device, an audio player, or another device capable of running the digital service, the user interface and/or the authentication client. In some embodiments, the digital service, the user interface, and/or the authentication client can display the transmitted identifier via a push notification displayed on the user device.

At step 910, the digital service, the user interface, or the authentication client can receive a user input of the transmitted identifier via the user device. In the embodiments where the digital service or the user interface displayed the transmitted identifier to the user, the authentication client can receive the user input. In the embodiments where the authentication client displayed the transmitted identifier to the user, the digital service or the user interface can receive the user input.

At step 912, the digital service or the authentication client can transmit the user input of the transmitted identifier to the authentication server.

In response to receiving the user input of the transmitted identifier, the authentication server can validate the user input of the transmitted identifier at step 914. In some embodiments, the authentication server can validate the user input of the transmitted identifier by comparing the user input of the transmitted identifier to the identifier. In some embodiments, if the user input of the transmitted identifier is a same string of characters as the identifier, the authentication server can automatically and dynamically identify and authenticate the user and generate an authentication response. In some embodiments, the authentication server can receive identification information from the authentication client and the authentication server can use the identification information to identify the user associated with the authentication client. In some embodiments, the authentication response can include instructions indicating that user is authenticated and should be allowed to access the digital service.

Figure 9B:
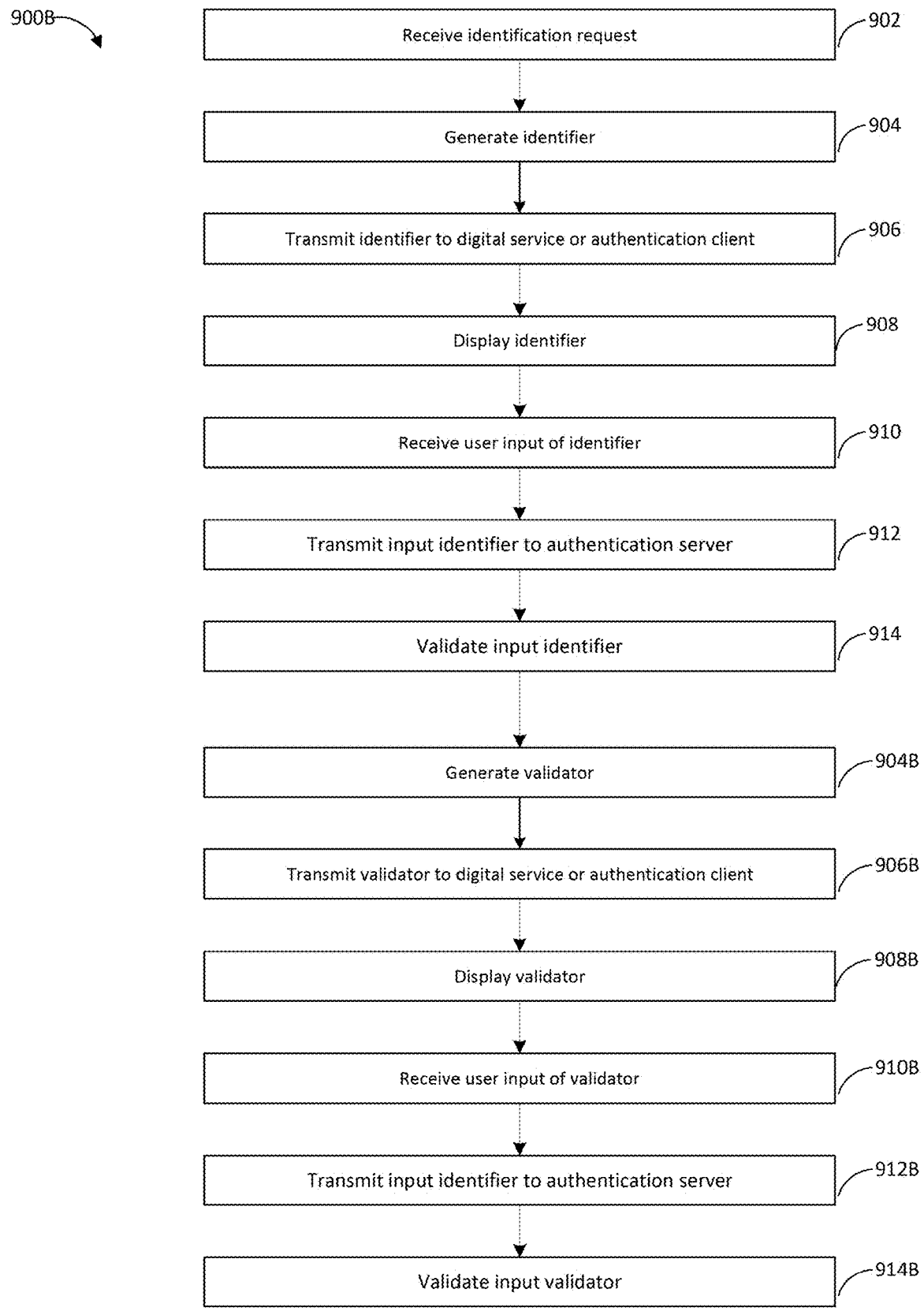

In some embodiments, as shown in FIG. 9B, method 900A can include steps 904B-914B. Steps 904B-914B can be performed in response to the automatic and dynamic identification and authentication of the user. Steps 904B-914B can be the same as steps 904-914 as described above, however, steps 904B-914B can include a validator instead of an identifier. In some embodiments, the validator can be generated by the authentication server just-in-time. In some embodiments, the validator can include a unique dynamic validator. The unique dynamic validator can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters. In some embodiments, the validator can be a different string of characters than the identifier.

In some embodiments, the authentication server can transmit the authentication response and user information to the digital service. In some embodiments, the user information can include a user's account information. In response to receiving the authentication response, the digital service can allow the user access to the digital service.

Figure 9C:
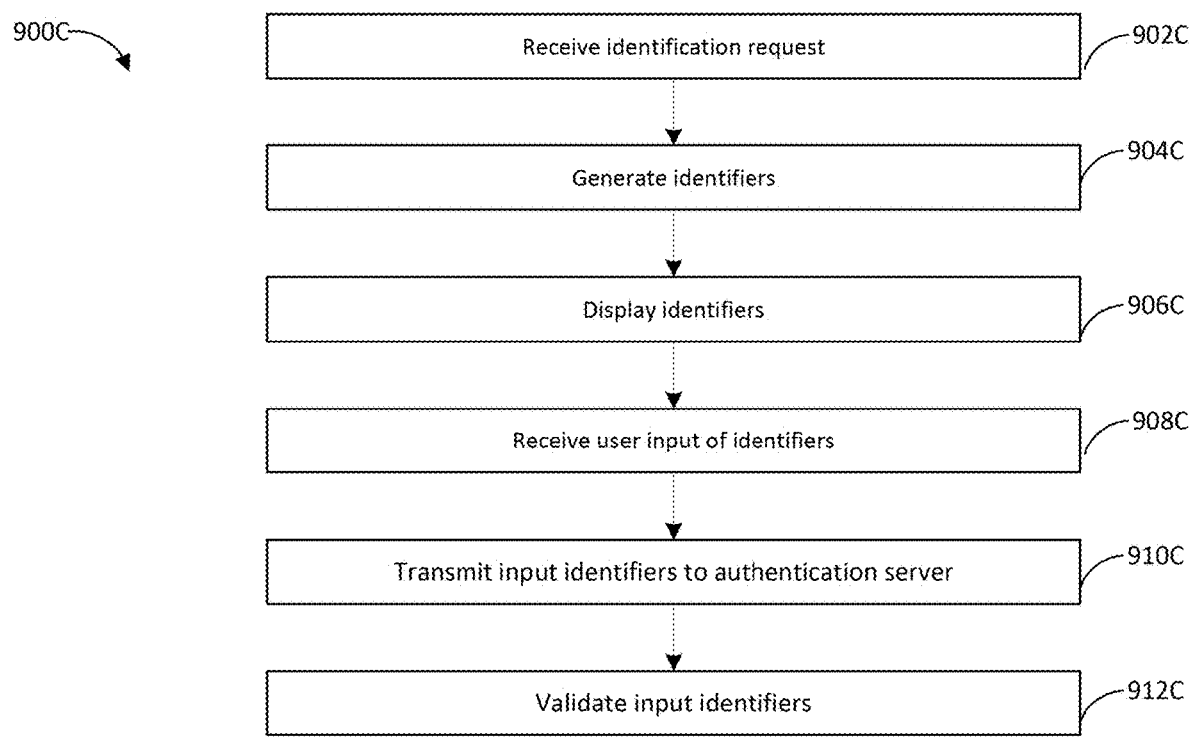

In some embodiments, as shown in FIG. 9C, if the authentication client is unable to communicate with the authentication server, method 900C can be used for dynamic authentication and identification. The first step of method 900C, step 902C, can include receiving an identification request from the digital service. In some embodiments, the identification request can be an identification request or an authentication request. In some embodiments, the identification request can be received by the authentication server.

At step 904C, the authentication server can generate an identifier at a predetermined time interval. The identifier can include one or more identifiers. In some embodiments, the identifier can be generated by the authentication server just-in-time. In some embodiments, the identifier can include a unique dynamic identifier. The unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters. In some embodiments, the identifier can be generated by a time-based random number algorithm. In some embodiments, the authentication server can store the identifier for the predetermined time interval.

In some embodiments, at step 904C, the authentication client can generate a second identifier at the predetermined time interval. In some embodiments, the second identifier can include one or more identifiers. In some embodiments, the second identifier can be generated by the authentication client just-in-time. In some embodiments, the second identifier can include a unique dynamic identifier. The unique dynamic identifier can be a numerical, alphabetical, or alpha-numeric string of characters of the predetermined length. The second identifier can be the same string of characters as the identifier. In some embodiments, the second identifier can be generated by the time-based random number algorithm. In some embodiments, the authentication client can store the second identifier for the predetermined time interval.

At step 906C, the authentication client can display the second identifier to the user via the graphical user interface (GUI) of the user device. In some embodiments, the authentication client can display the second identifier via a push notification displayed on the user device.

At step 908C, the digital service or the user interface can receive a user input of the second identifier via the user device, and at step 910C, the digital service or the user interface can transmit the user input of the second identifier to the authentication server.

In response to receiving the user input of the second identifier, the authentication server can validate the user input of the second identifier at step 912C. In some embodiments, the authentication server can validate the user input of the second identifier by comparing the user input of the second identifier to the identifier. In some embodiments, if the user input of the second identifier is the same string of characters as the identifier, the authentication server can automatically and dynamically identify and authenticate the user and generate an authentication response. In some embodiments, the authentication server can receive identification information from the authentication client and the authentication server can use the identification information to identify the user associated with the authentication client. In some embodiments, the authentication response can include instructions indicating that user is authenticated and should be allowed to access the digital service.

Figure 9D:
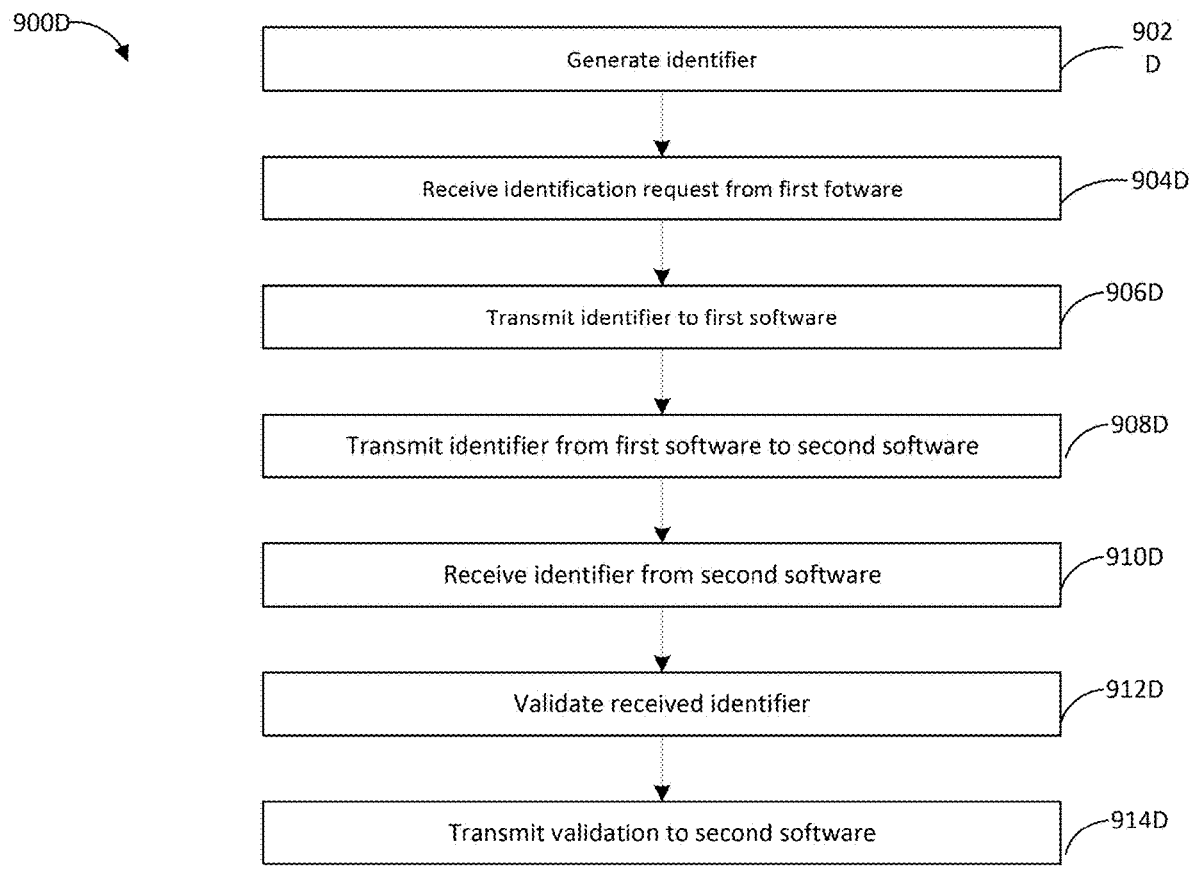

In some embodiments, as shown in FIG. 9D, method 900D can be used for machine-to-machine dynamic authentication and identification. The first step of method 900D, step 902D, can include a client agent generating an identifier at step 902D at a predetermined time interval. The client agent can include a software package, a plugin, a script, and/or any other software. The client agent can be in communication with a first software of a first machine. The identifier can include one or more identifiers. In some embodiments, the identifier can be generated by the client agent just-in-time. In some embodiments, the identifier can include a unique dynamic identifier. The unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters. In some embodiments, the identifier can be generated by a time-based random number algorithm. In some embodiments, the client agent can store the identifier for the predetermined time interval.

In some embodiments, at step 902D, a server agent can generate a second identifier at the predetermined time interval. The server agent can include a software package, a plugin, a script, and/or any other software. The server agent can be in communication with a second software on a second machine. The second identifier can include one or more identifiers. In some embodiments, the second identifier can be generated by the client agent just-in-time. In some embodiments, the second identifier can include a unique dynamic identifier. The unique dynamic identifier can be a numerical, alphabetical, or alpha-numeric string of characters of the predetermined length. The second identifier can be the same string of characters as the identifier. In some embodiments, the second identifier can be generated by the time-based random number algorithm. In some embodiments, the server agent can store the second identifier for the predetermined time interval.

In some embodiments, at step 904D, the first machine, via the first software, can request the identifier from the client agent. In response to the request, the client agent can transmit the identifier to the first software at step 906D. The first machine can transmit the identifier to the second machine at step 908D, and the server agent can receive the identifier from the second machine at step 910D.

In some embodiments, at step 912D the server agent can validate the identifier. In some embodiments, the server agent can validate the identifier by comparing the identifier to the second identifier. In some embodiments, if the identifier is the same string of characters as the second identifier, the server agent can automatically and dynamically identify and authenticate the first and generate an authentication response. In some embodiments, the server agent can receive first machine identification information from the second machine and the server agent can use the identification information to identify the first machine. In some embodiments, the authentication response can include instructions indicating that the first machine is authenticated and should be allowed to access the second machine.

In some embodiments, an authentication server can be in communication with the client agent and the server agent, and the authentication server can generate and/or validate the first and second identifiers at steps 902D and 912D of method 900D.

Figure 9E:
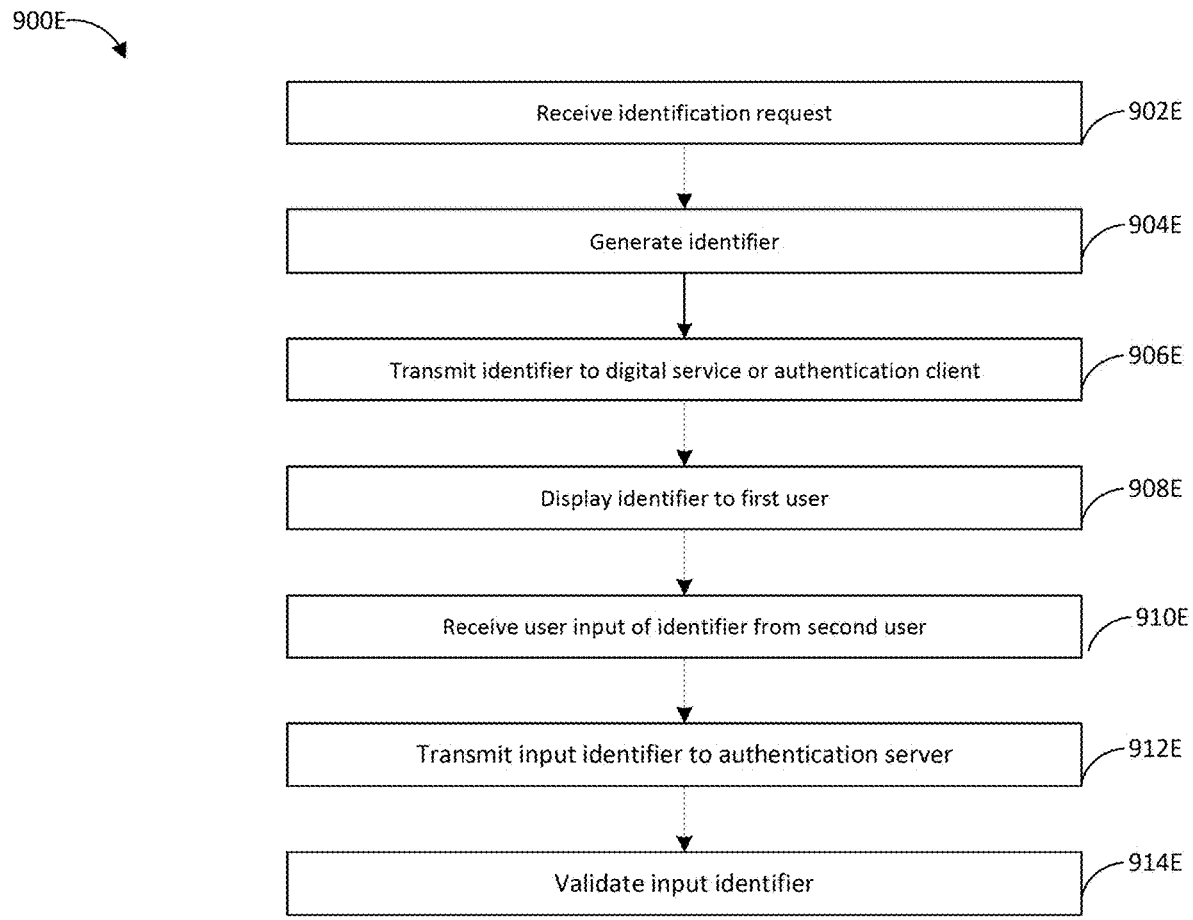

In some embodiments, as shown in FIG. 9E, method 900E can be used for user-to-user dynamic authentication and identification. The first step 902E of method 900E, as shown in FIG. 9E, can include receiving an identification request. In some embodiments, the identification request can be received by an authentication server. The authentication server can include any hosted software capable of generating, transmitting, receiving, and/or validating dynamic identifiers and/or validators, and/or responding to requests. The authentication server can receive the identification request from a digital service or an authentication client. In some embodiments, the digital service can include a web-based-application, a mobile application, a software thick client, a virtual appliance, a virtual environment, and/or any other internet or intranet based interface. In some embodiments, the authentication client can include a mobile application, a software thick client, a web client, a web plugin, an internet-of-things (IoT) device and/or any other digital interface.

In response to receiving the identification request, the authentication server can generate an identifier at step 904E. The identifier can include one or more identifiers. In some embodiments, the identifier can be generated by the authentication server just-in-time. In some embodiments, the identifier can include a unique dynamic identifier. The unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters.

In some embodiments, at step 906E, the authentication server can transmit the identifier. In embodiments where the authentication server receives the identification request, at step 902E, from the digital service, the authentication server can transmit the identifier to the digital service. In embodiments where the authentication server receives the identification request, at step 902E, from the authentication client, the authentication server can transmit the identifier to the authentication client.

At step 908E, the digital service, the user interface, or the authentication client can display the transmitted identifier to a first user via a web interface or a graphical user interface (GUI) of a first user device. The first user device can include a personal computer, a cellular phone, a smartphone, a laptop, a tablet computer, an e-reader device, an audio player, or another device capable of running the digital service, the user interface and/or the authentication client. In some embodiments, the digital service, the user interface, and/or the authentication client can display the transmitted identifier via a push notification displayed on the first user device.

In some embodiments, the first user can communicate the transmitted identifier to a second user. The first user can communicate the transmitted identifier to the second user verbally or via any digital input such as an SMS or an email.

At step 910E, the digital service, the user interface, or the authentication client can receive input of the transmitted identifier from the second user via a second user device. The second user device can include a personal computer, a cellular phone, a smartphone, a laptop, a tablet computer, an e-reader device, an audio player, or another device capable of running the digital service, the user interface, and/or the authentication client. In the embodiments where the digital service or the user interface displayed the transmitted identifier to the first user, the authentication client can receive the input of the transmitted identifier from the second user. In the embodiments where the authentication client displayed the transmitted identifier to the first user, the digital service or the user interface can receive the input of the transmitted identifier from the second user.

At step 912E, the digital service, the user interface, or the authentication client can transmit the input of the transmitted identifier from the second user to the authentication server.

In response to receiving the input of the transmitted identifier from the second user, the authentication server can validate the input of the transmitted identifier from the second user at step 914E. In some embodiments, the authentication server can validate the input of the transmitted identifier from the second user by comparing the input of the transmitted identifier from the second user to the identifier. In some embodiments, if the input of the transmitted identifier from the second user is a same string of characters as the identifier, the authentication server can automatically and dynamically identify and authenticate the second user and generate an authentication response. In some embodiments, the authentication server can receive identification information from the authentication client and the authentication server can use the identification information to identify the second user associated with the authentication client. In some embodiments, the authentication response can include instructions indicating that user is authenticated and should be allowed to access the digital service.

Figure 9F:
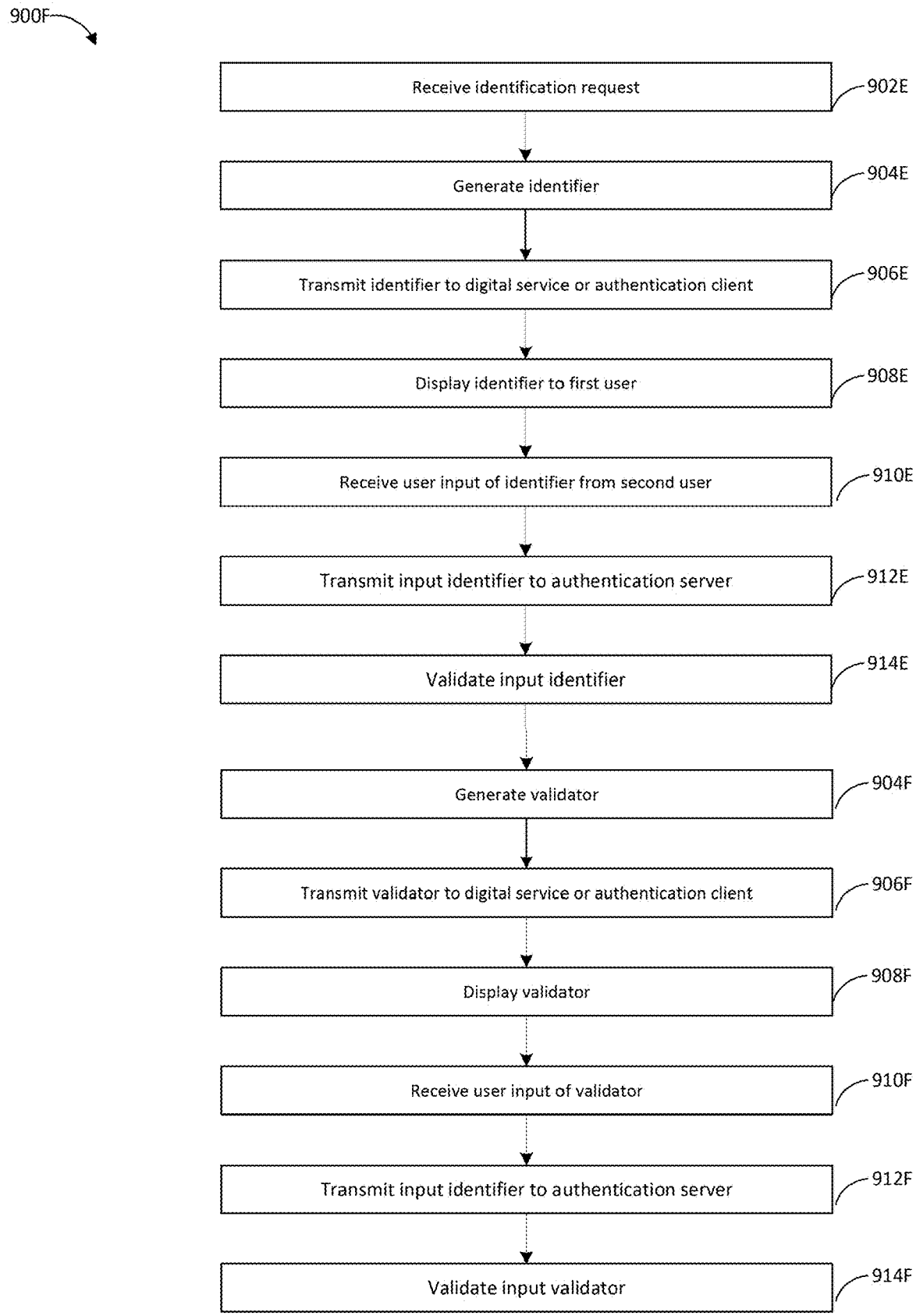

In some embodiments, as shown in FIG. 9F, method 900F can include steps 904F-914F. Steps 904F-914F can be performed in response to the automatic and dynamic identification and authentication of the second user. Steps 904F-914F can be the same as steps 904E-914E as described above, however, steps 904F-914F can include a validator instead of an identifier. In some embodiments, the validator can be generated by the authentication server just-in-time. In some embodiments, the validator can include a unique dynamic validator. The unique dynamic validator can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters. In some embodiments, the validator can be a different string of characters than the identifier.

In some embodiments, the authentication server can transmit the authentication response and second user information to the digital service. In some embodiments, the second user information can include a user's account information. In response to receiving the authentication response, the digital service can allow the second user access to the digital service.

In some embodiments, in methods 900E and 900F the digital service can be a second authentication client associated with the first user or the second user.

In some embodiments, the identifier, the second identifier and/or the validator can include a machine-readable optical label, such as a QR code, a barcode, etc.

FIGS. 10A-10D

Figure 10A:
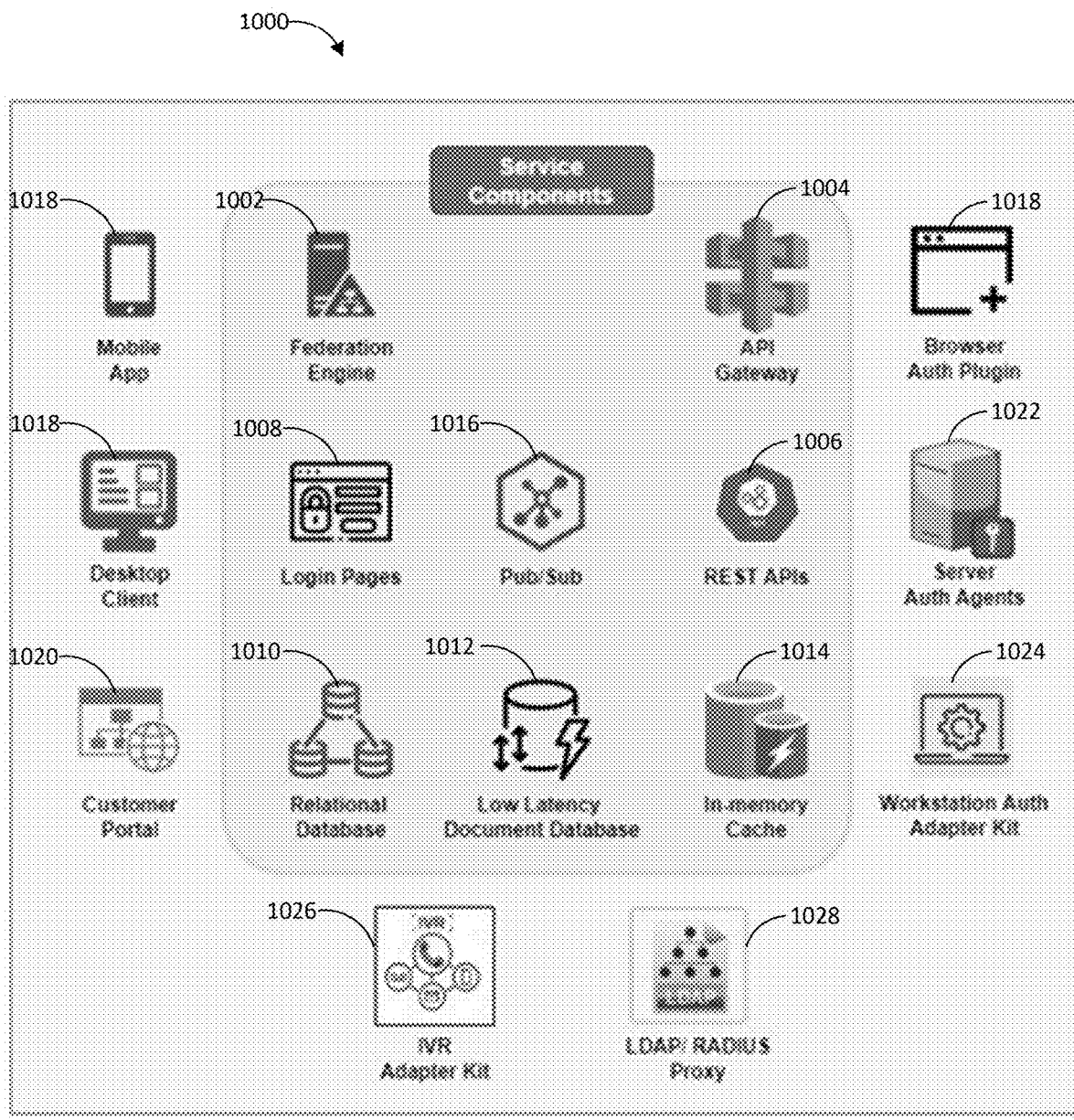
FIG. 10A is a schematic of an authentication system, in accordance with embodiments of the present application.

FIG. 10A shows an authentication system 1000 for implementing methods 900A-900F.

The authentication system 1000 can include a federation engine 1002, an application programming interface (API) gateway 1004, representational state transfer (REST) APIs 1006, user interfaces 1008 (e.g., login pages), a first database

1010, a second database 1012, a cache 1014, and/or a publish-subscribe messaging pattern (Pub/Sub) 1016.

In some embodiments, the federation engine 1002 can be a federated protocol (Security Assertion Markup Language, OpenID Connect, etc.) to integrate web application and/or identity providers into the authentication system 1000. In some embodiments, the API gateway 1004 can provide two-way communication between the authentication system 1000 and a user. In some embodiments, the API gateway can be WebSocket. The REST API 1006 can provide service-side functionality for management of the API gateway 1004, an authenticator, and/or the user during one or more authentication and validation workflows described below with reference to FIGS. 10B-10D. In some embodiments, the user interfaces 1008 can include a login page or any other suitable user interfaces for use with registration and authentication workflows.

The first database 1010 can be a database of user identity information of a plurality of users. In some embodiments, the first database 1010 can be a relational database and can map the plurality of users to each user's organization and/or protected web application accounts. The second database 1012 can be a low latency document database. In some embodiments, the second database 1012 can facilitate low latency querying of the first database 1010. The second database 1012 can provide real-time or substantially real-time storage and retrieval of the user identity information.

The cache 1014 can be stored on a memory of a computer system configured to run the authentication system 1000. In some embodiments, the cache 1014 may be an in-memory cache. The cache 1014 can provide real-time or substantially real-time cache and retrieval of one or more identifiers or codes.

The Pub/Sub 1016 can track one or more open socket connections and automatically and dynamically close the socket connections after a predetermined time. In some embodiments, the Pub/Sub 1016 can provide audit trail logging for events and or reporting based on one or more authentication metrics.

In some embodiments, the authentication system 1000 can include one or more end user components. The end user components can include a user software 1018 and a user portal 1020 (e.g., an authentication portal). The user software 1018 can include a mobile application (e.g., an authentication application run on a mobile device), a browser plugin, a desktop client, and/or any other software. The user software 1018 can run on a user device such as a personal computer, a cellular phone, a smartphone, a laptop, a tablet computer, an e-reader device, an audio player, or any other computing device. The user software 1018 can include a graphical user interface (GUI) to display an identifier and/or retrieve a user input of an identifier. The user software 1018 can require a user provide authentication to access the user software 1018. The authentication can include one or more local authentication protocols of the user device such as Fast IDentity Online (FIDO), biometrics and/or any other authentication protocol. In some embodiments, the user software 1018 can enforce one or more user device security policies and/or retrieve or monitor user device information to automatically and dynamically determine security posture and/or risk assessment. In some embodiments, a user can add, remove and/or disable one or more authenticators, identifiers, and/or validators.

In some embodiments, the user portal 1020 can include a graphical user interface (GUI) to display an administrative interface. In some embodiments, the user portal 1020 can include one or more settings. The one or more settings can include user onboarding, user offboarding, disablement, authenticator management, and/or any other administrative settings. In some embodiments, the user portal 1020 can allow a user to edit or update user device security policies, application authentication policies, organization authentication policies, and/or authentication management.

In some embodiments, the authentication system 1000 can include one or more server or workstation components. The one or more server or workstation components can include a server authorization agent 1022 and/or a user device authorization adapter 1024. In some embodiments, the server authorization agent 1022 can allow user authentication to Windows and/or Unix servers. The server authorization agent 1022 can include machine-to-machine authentication. In some embodiments, the user device authorization adapter 1024 can include software or an adapter kit that can authenticate a user to a Windows, MAC, and/or Linux user device.

In some embodiments, the authentication system 1000 can include one or more adaptors. The one or more adaptors can include an interactive voice response (IVR) adaptor 1026 and/or a proxy 1028. In some embodiments, the IVR adaptor 1026 can allow the authentication system 1000 to authenticate a user via voice and/or touch-tone response. In some embodiments, the IVR adaptor 1026 can transmit identifier via text and/or audio. The proxy 1028 can include a Lightweight Directory Access Protocol (LDAP) proxy and/or a RADIUS proxy. In some embodiments, the proxy 1028 can automatically convert data or information from systems that use LDAP or RADIUS identification, and/or authentication requests to REST API based requests and/or responses. In some embodiments, the proxy 1028 can automatically convert data or information from systems that use REST API based requests and/or responses to data or information for systems that use LDAP or RADIUS responses.

Figure 10B:
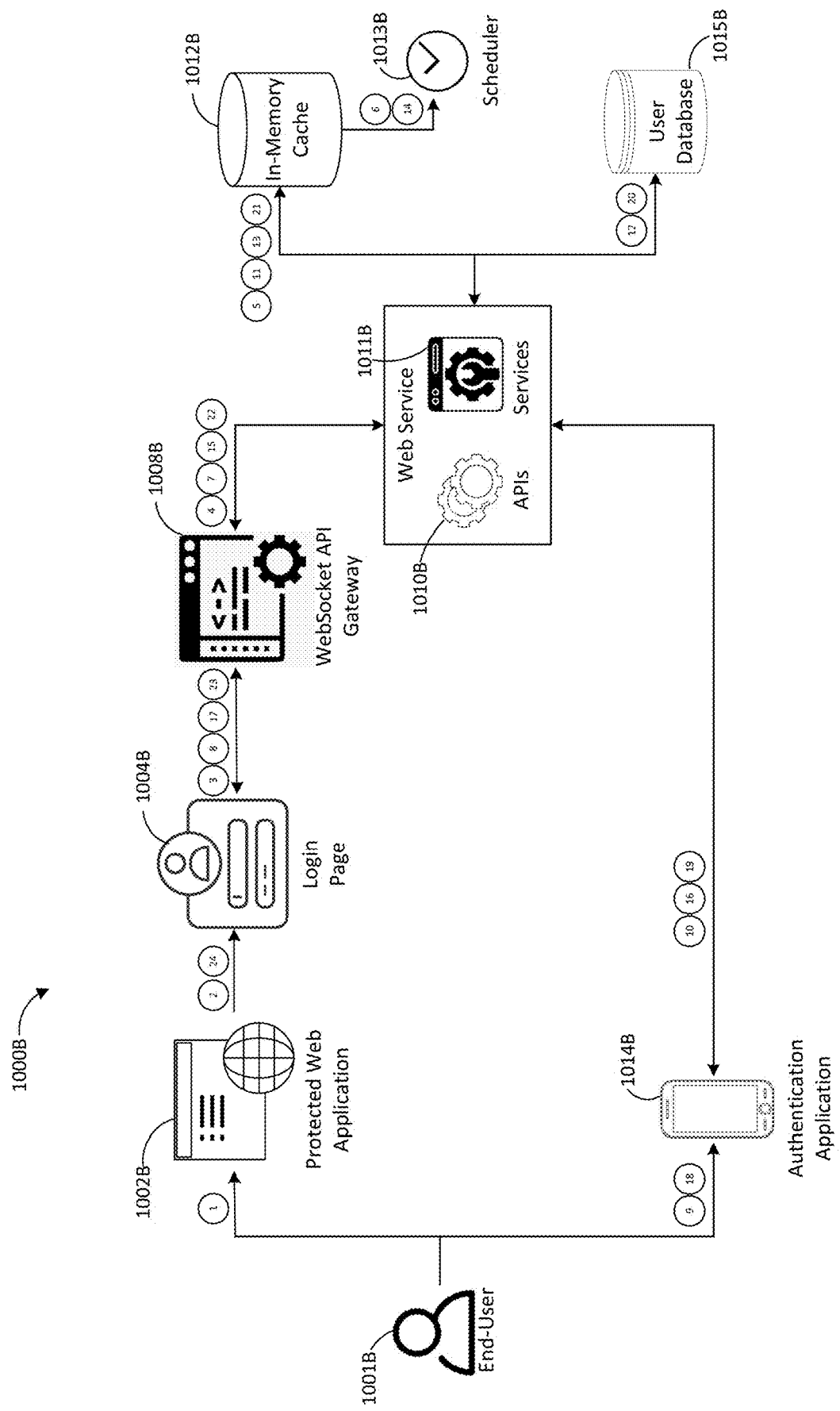
FIG. 10B is a schematic of a method of dynamic authentication implemented using an API gateway, in accordance with embodiments of the present application.
Figure 10C:
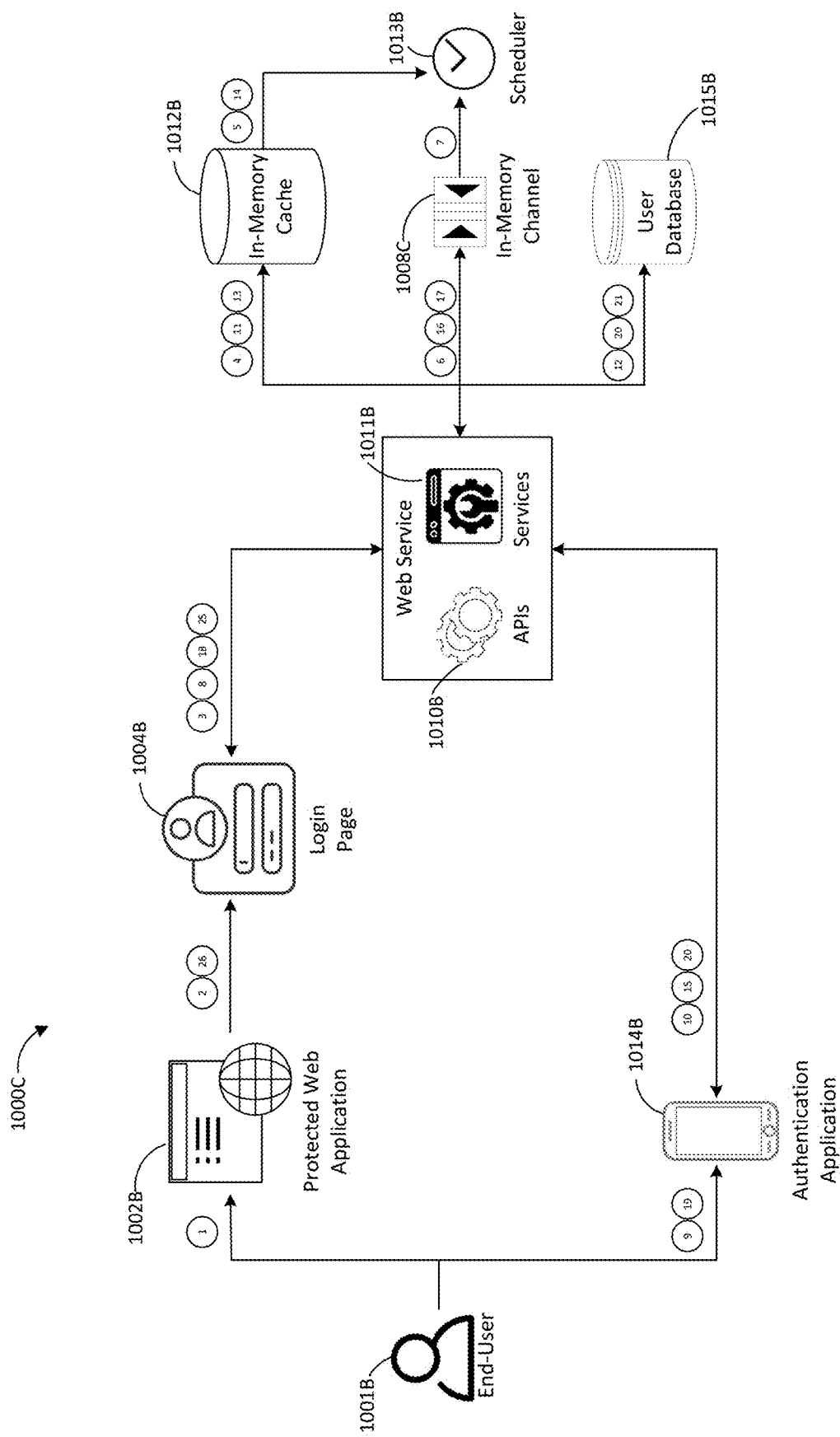
FIG. 10C is a schematic of a method of dynamic authentication implemented using ephemeral queues, in accordance with embodiments of the present application.
Figure 10D:
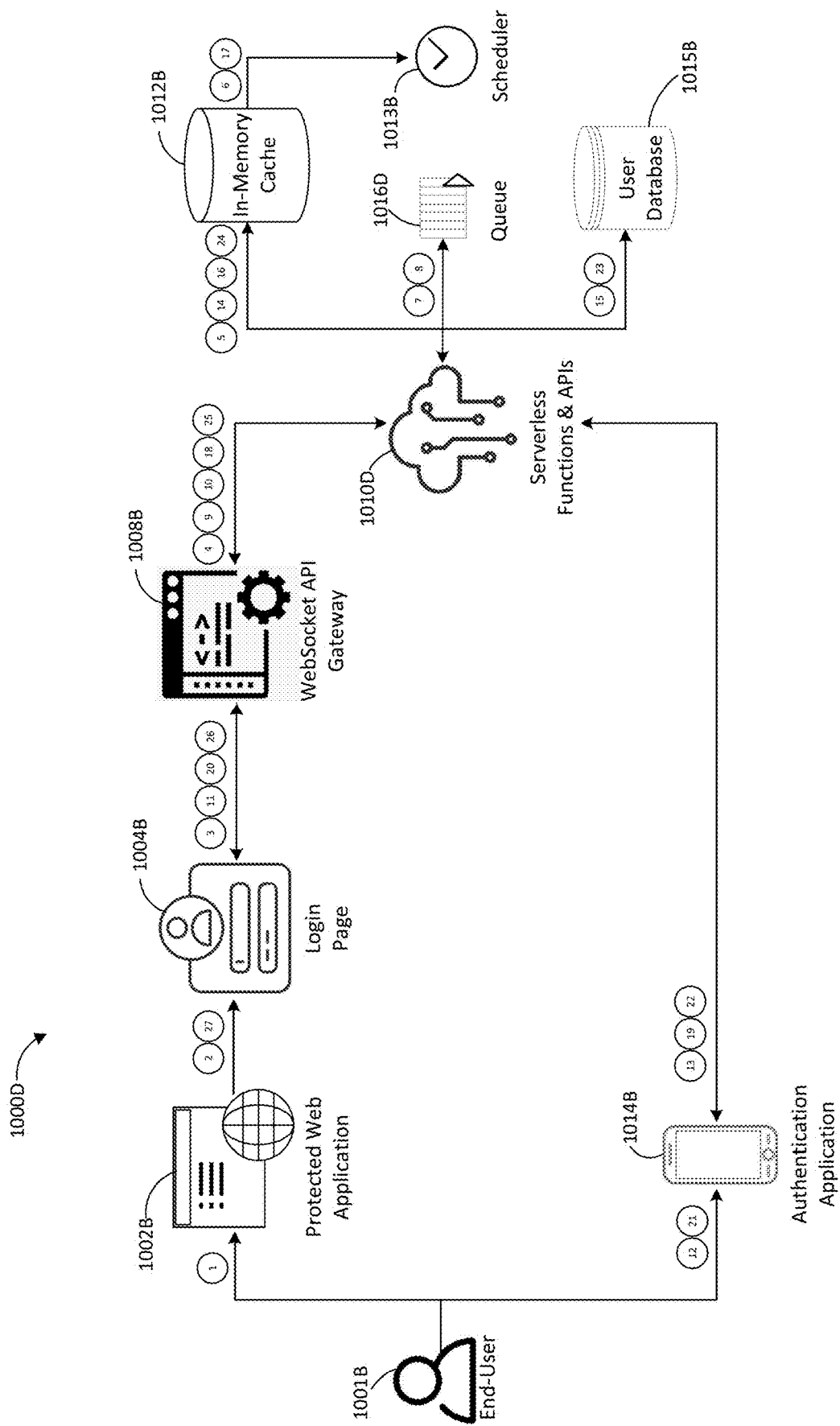
FIG. 10D is a schematic of a method of dynamic authentication implemented using serverless computing and an API gateway, in accordance with embodiments of the present application.

FIGS. 10B-10D show various methods 1000B-1000D for implementation of the authentication system 1000. As shown in FIG. 10B, the authentication system 1000 can be used with an API gateway via method 1000B. A user 1001B can access a protected application 1002B. The protected application 1002B can be any application that uses the authentication system 1000 for user authentication. When the user 1001B accesses the protected application 1002B, the user 1001B can be automatically directed to a login page 1004B. In some embodiments, the user 1001B can be automatically directed to the login page 1004B with a federation engine. When the user 1001B is directed to the login page 1004B, an API gateway 1008B can transmit a connection request to a REST API 1010B. The REST API 1010B can direct an authentication service 1011B to generate one or more identifiers and save the identifiers in a cache 1012B. In some embodiments, the authentication service 1011B can transmit an API gateway connection identifier to the cache 1012B. In some embodiments, the cache 1012B can store the identifiers and the API connection identifier for a predetermined time. The predetermined time can be stored on a scheduler 1013B, and the scheduler 1013B can automatically remove the identifiers and the API connection identifier after the predetermined time passes.

In some embodiments, the authentication service 1011B can transmit a first identifier of the one or more identifiers, a token that includes a second identifier of the one or more identifiers, a domain name or identification of the protected application 1002B, and/or the API gateway connection identifier to a callback URL. The API gateway 1008B can transmit the first identifier and the token to the login page 1004B. In some embodiments, the first identifier can be displayed on a user device to the user 1001B as text on a GUI and the token can be displayed on the user device to the user 1001B as a machine-readable optical label.

In some embodiments, the user 1001B can input the first identifier into a user software 1014B. The user software 1014B can be an authenticator application installed on the user device and/or a second user device. In some embodiments, the user 1001B can scan the machine-readable optical label with a camera of the user device and/or the second user device. In some embodiments, the user software 1014B can access the camera such that when the user 1001B scans the machine-readable optical label, the user software 1014B can automatically validate the token and instruct the user 1001B to validate the protected application 1002B.

In some embodiments, the REST API 1010B can transmit an input first identifier or the second identifier associated with the token and a user device identifier to the authentication service 1011B. The authentication service 1011B can automatically and dynamically search the cache 1012B for an identifier that is identical to the input first identifier or the second identifier. In some embodiments, the authentication service 1011B can retrieve the API connection identifier associated with the identifier. If the authentication service 1011B finds an identifier, the authentication service 1011B can search for a user identifier associated with the user device identifier.

If the user 1001B input the first identifier into the user software 1014B, the authentication service 1011B can generate a validator and transmit the identifier to the cache 1012B. In some embodiments, the cache 1012B can store the validator for the predetermined time. The scheduler 1013B can automatically remove the validator after the predetermined time passes. In some embodiments, the validator can be associated with the user identifier. The authentication service 1011B can transmit the validator and the API connection identifier to the API gateway 1008B. The authentication service 1011B can transmit the validator and the identification of the protected application 1002B to the user software 1014B. In some embodiments, the user 1001B can validate the identification of the protected application 1002B input the validator displayed on the user device via the login page 1004B into the user software 1014B. The user software 1014B can automatically transmit an input validator and the user device identifier to the REST API 1010B. The authentication service 1011B can automatically and dynamically search the cache 1012B for the user identifier associated with the user device identifier. If the authentication service 1011B finds the user identifier, the authentication service 1011B can retrieve the validator stored in the cache 1012B that is associated with the user identifier. The authentication service 1011B can automatically compare the validator associated with the user identifier and the input validator to determine if the input validator is a same string of characters as the validator associated with the user identifier. If the input validator is the same string of characters as the validator associated with the user identifier, the authentication service 1011B can retrieve the API connection identifier from the cache 1012B.

The authentication service 1011B can transmit an authentication response and user information retrieved from a user database 1015B to the API gateway 1008B, and the API gateway 1008B can transmit the authentication response to the login page 1004B. In response to receiving the authentication response, the login page 1004B can direct the user to the protected application 1002B.

In some embodiments, as shown in FIG. 10C, the authentication system 1000 can be authentication system 1000C and instead of using the API gateway 1008B, can use an in-memory channel 1008C. The in-memory channel 1008C can be associated with the identifiers, and the authentication service 1011B can associate the in-memory channel 1008C with the API connection. In some embodiments, the scheduler 1013B can remove the in-memory channel 1008C after the predetermined time passes. In some embodiments, instead of storing the validator on the cache 1012B, the authentication service 1011B can store the validator on the in-memory channel 1008C.

In some embodiments, as shown in FIG. 10D, the authentication system 1000 can be authentication system 1000D, and the REST API 1010B and the authentication service 1011B can instead be a serverless API 1010D stored on a cloud service provider. The serverless API 1010D can transmit the API connection identifier to a queue 1016B via a serverless function. In some embodiments, the queue 1016D can include a predetermined time-out interval. The predetermined time-out interval can be a predetermined interval when the queue 1016D can be visible to other components of the authentication system 1000D. In some embodiments, the serverless function can run periodically at a predetermined interval. In some embodiments the serverless function can close any API connections associated with API connection identifiers other than the API connection identifier.

FIGS. 11A-11C

Figure 11A:
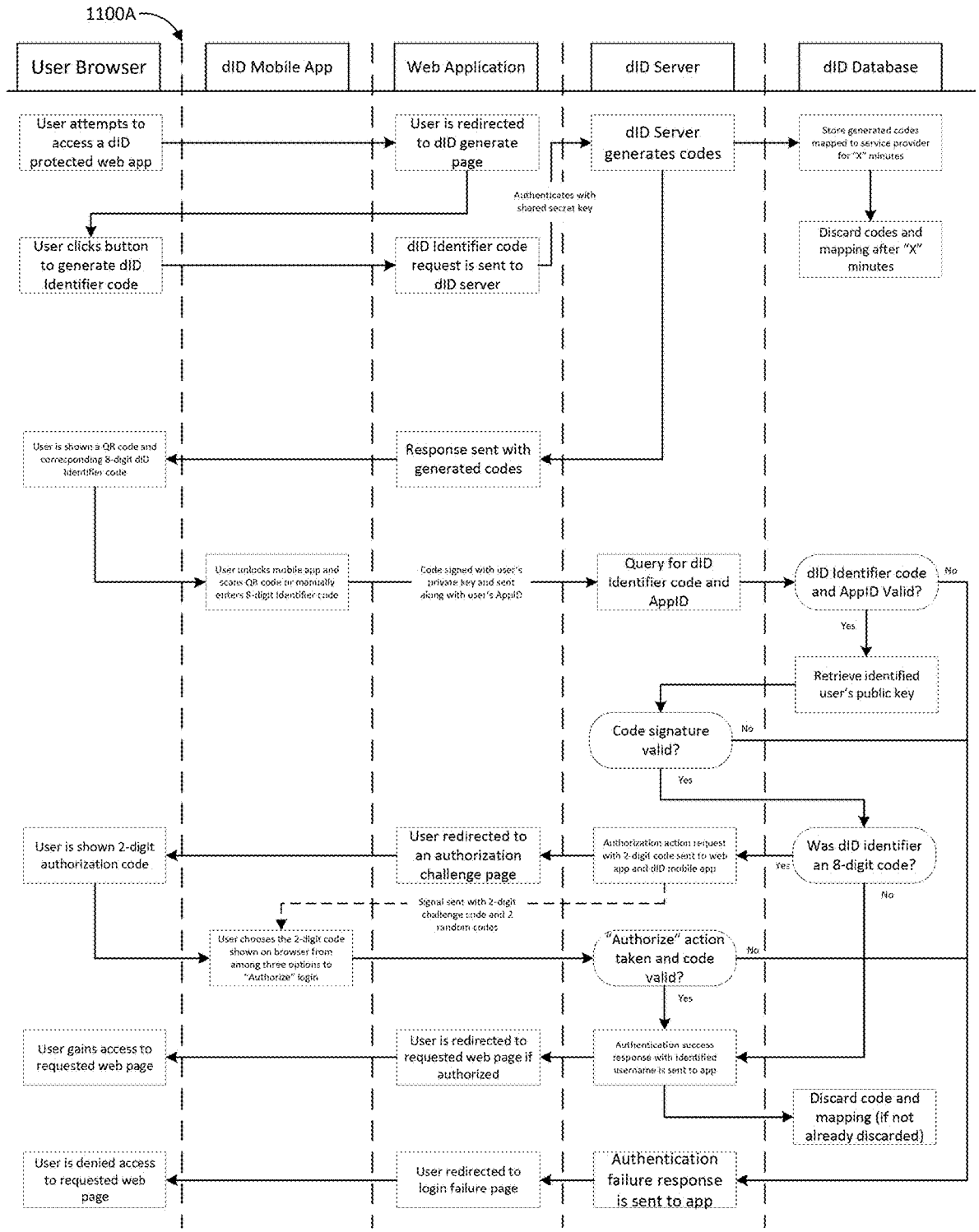
FIG. 11A-11C are schematics of various methods of dynamic authentication and identification, in accordance with embodiments of the present application.
Figure 11B:
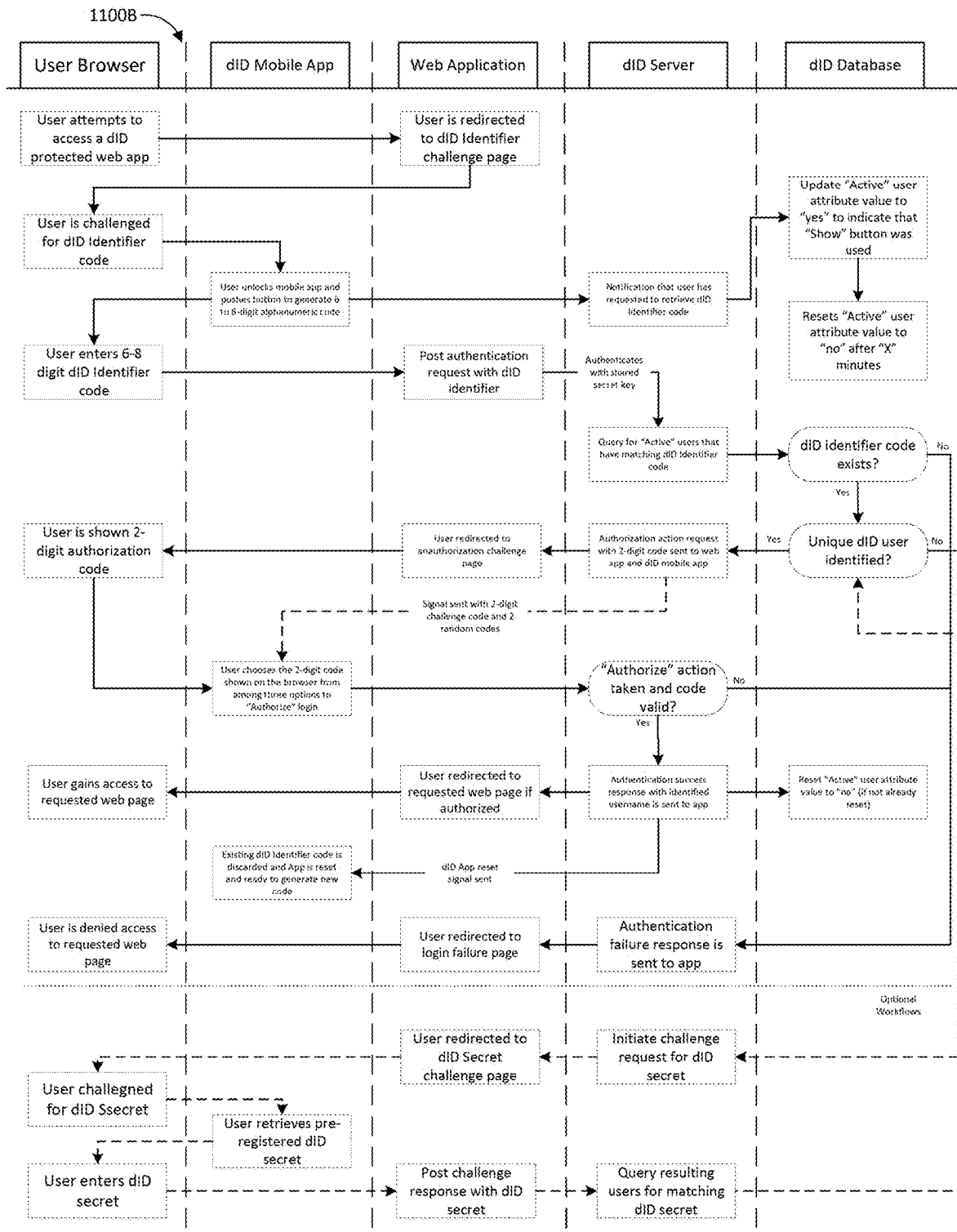
Figure 11C:
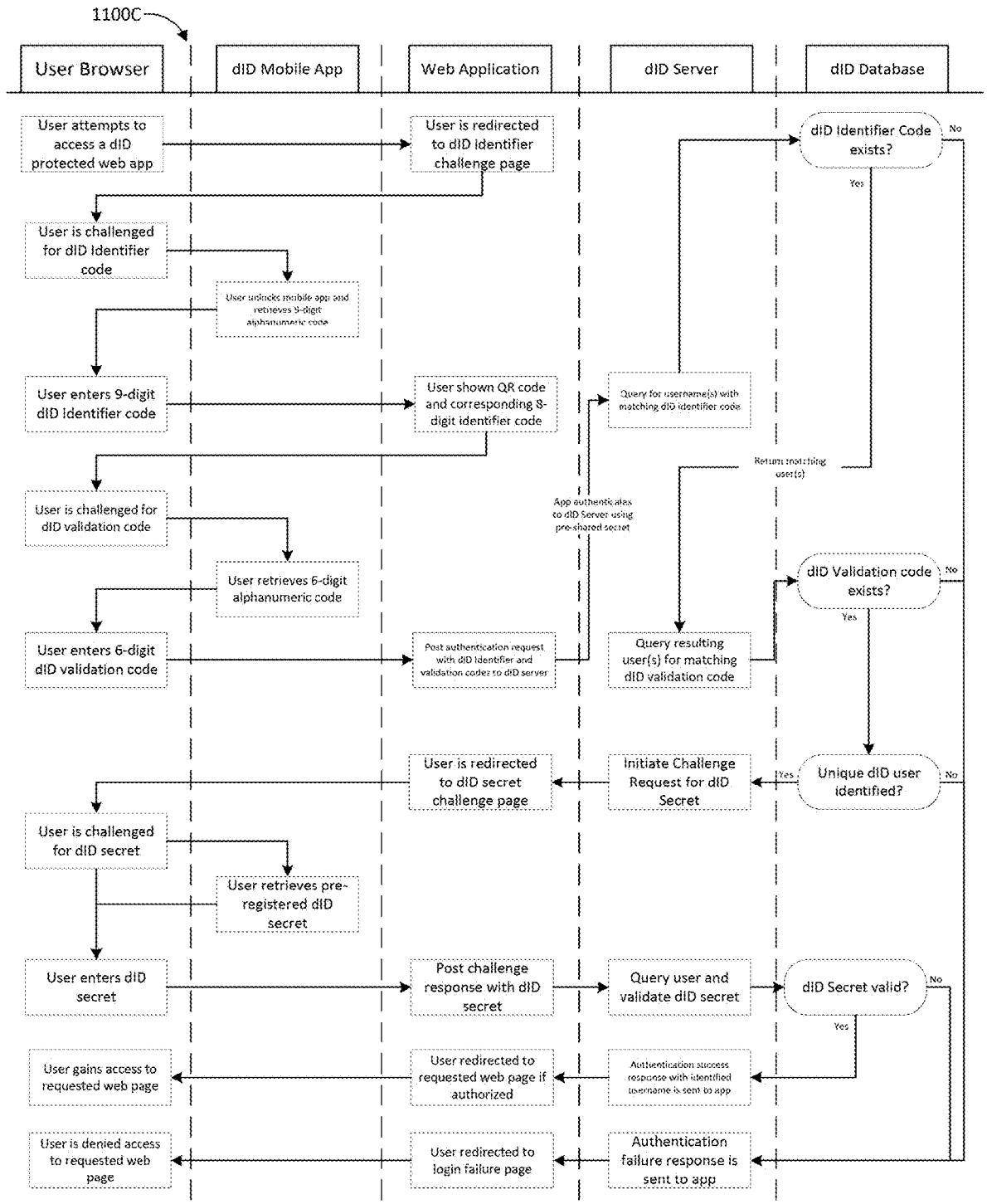

FIGS. 11A-11C show examples of implementing methods 900A-900F when a user has internet access and when a user does not have internet access.

As shown in FIG. 11A, methods 900A-900F can be implemented online via method 1100A. More specifically, a user with internet access may desire to access a protected resource (e.g., a dID protected web app), and the user may be able to obtain identifiers for authentication through a web browser (e.g., on their computing device). In some cases, the dID identifier code may be a 32—digit numeric or alpha-numeric string/code encoded by a QR code; a user scanning a QR code into the dID mobile app may result in a 32—digit numeric or alpha-numeric string/code as the identifier that is sent to the dID server. In some cases, the dID identifier code may be a 8—digit numeric or alpha-numeric string/code; a user manually entering the code into the dID mobile app may result in that 8—digit numeric or alpha-numeric string/code being the identifier that is sent to the dID server. In some embodiments, the AppID may be generated at the time of user registration and it may be unique to a user (e.g., a SUID). In some embodiments, the dID mobile application may be referred to as an authentication application, the web application may be referred to as an authentication portal, the dID server may be referred to as an authentication server, and the dID database may be referred to as an authentication database.

As shown in FIG. 11B methods 900A-900F can be implemented online on a mobile device via method 1100B. More specifically, a user with internet access may desire to access a protected resource (e.g., a dID protected web app), and the user may be able to obtain identifiers for authentication through their mobile device (e.g., on a dID mobile application). In some embodiments, the dID mobile application may be referred to as an authentication application, the web application may be referred to as an authentication portal, the dID server may be referred to as an authentication server, and the dID database may be referred to as an authentication database.

As shown in FIG. 11C methods 900A-900F can be implemented offline via method 1100C. More specifically, a user may desire to access a protected resource (e.g., a dID protected web app) through the use of a pre-registered dID secret. In some embodiments of method 1100C, the authentication system can request a user enter a preregistered validator after the user enters the validator. In some embodiments, the dID mobile application may be referred to as an authentication application, the web application may be referred to as an authentication portal, the dID server may be referred to as an authentication server, and the dID database may be referred to as an authentication database.

FIGS. 12, 13A-13B, 14, and 15A-15G

Figure 12:
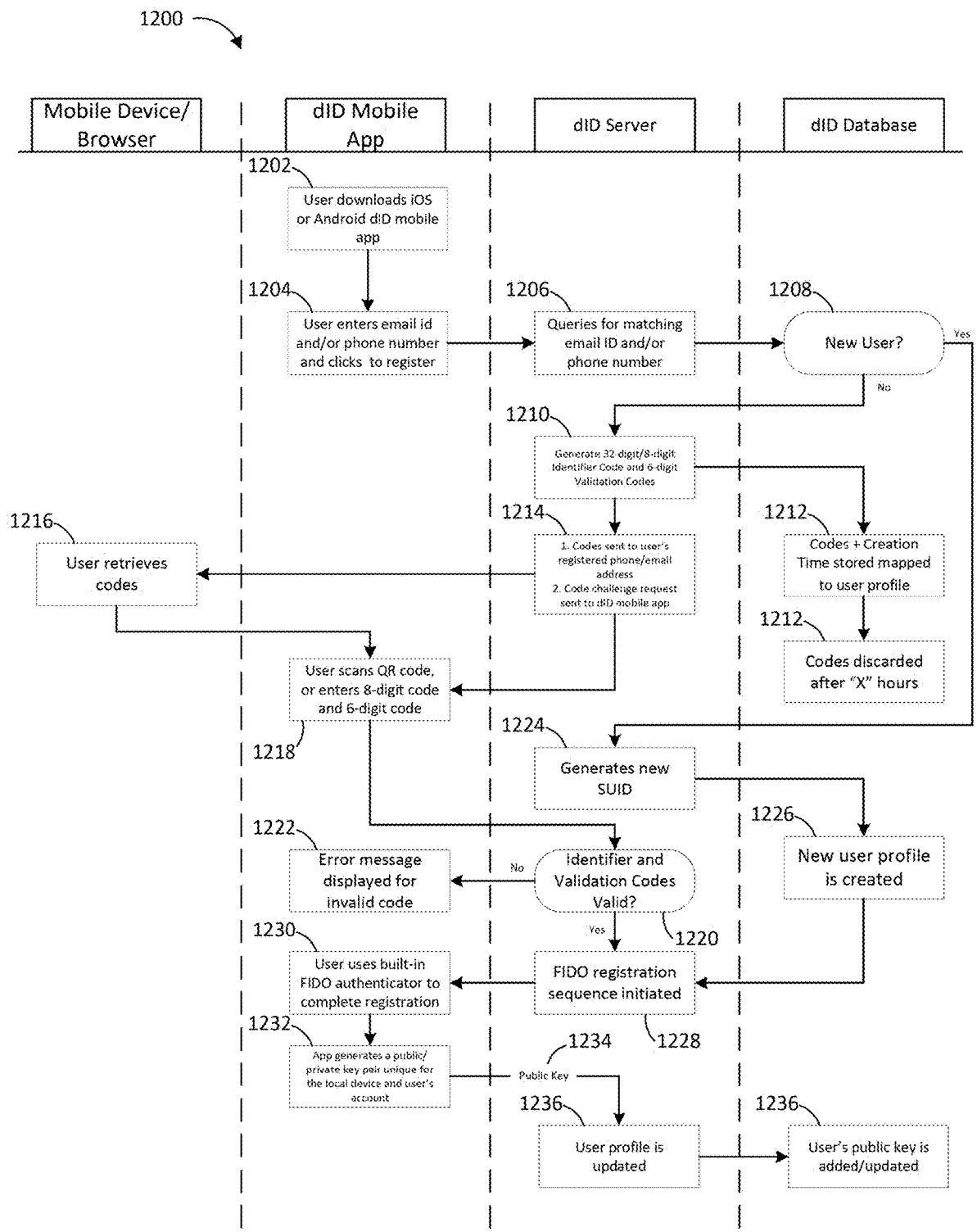
FIG. 12 is a schematic of a method of device authentication, in accordance with embodiments of the present application.

FIG. 12 shows a method 1200 for device registration, such as for a new user or a replacement mobile device registration. In some embodiments, the dID mobile application may be referred to as an authentication application, the dID server may be referred to as an authentication server, and the dID database may be referred to as an authentication database. In some embodiments, if a user does not have an authentication app for an authentication system, the user can download the authentication app at step 1202. Once the user downloads the authentication app, the user may select to register a user device at step 1204. In some embodiments, the user can input an email, a phone number and/or any other user or user device identifier. At step 1206, a server can automatically search a user database for the email, the phone number and/or the other user or user device identifiers. At step 1208 the server, via the user database can automatically determine if the user already has a user profile for the authentication system.

If the user has a profile, at step 1210, the server can generate one or more identifiers and/or one or more validators. The server can automatically store the identifiers and validators in the user database for a predetermined time at step 1212. At step 1214, the server can transmit the identifier and the validator to the user device and transmit a challenge request to the authentication app. The user can receive the identifier and the validator at step 1216. In some embodiments, the user can receive the identifier and the validator via a machine-readable optical label, and/or the user can receive the identifier and the validator via a text message, an email, a push notification, or any other communication protocol. At step 1218, the user can input the identifier and the validator into the authentication app or the user can scan the machine-readable optical label via a camera of the user device. At step 1220, the server can receive the input identifier and the input validator, or the server can automatically determine if the user scanned the machine-readable optical code. The server can automatically determine if the user is valid by automatically determining if the input identifier and/or the input validator, or the scanned machine-readable optical code is a same identifier and/or validator, or machine-readable optical code transmitted to the user at step 1214. If at step 1220 the server determines the user is not valid, the authentication app can display an error message to the user at step 1222.

If the user database determines the user does not have a profile at step 1208, authentication system can skip steps 1210-1222 and can instead perform steps 1224-1226. At step 1224, the server can automatically generate a user identifier for the user and create a user profile at step 1226.

If the server determines the user is valid at step 1222 or the server automatically generates the user profile at step 1226, the server can initiate FIDO user device registration at step 1228. At step 1230, the user can user a FIDO authenticator in the authentication app to complete the user device registration. At step 1232, once the user completes the user device registration, the authentication app can generate a public and/or a private key pair for the user device and the user profile. At step 1234, the server can receive a transmitted public key from the authentication app and update the user profile to include the public key by sending the public key to the user database at step 1236.

Figure 13A:
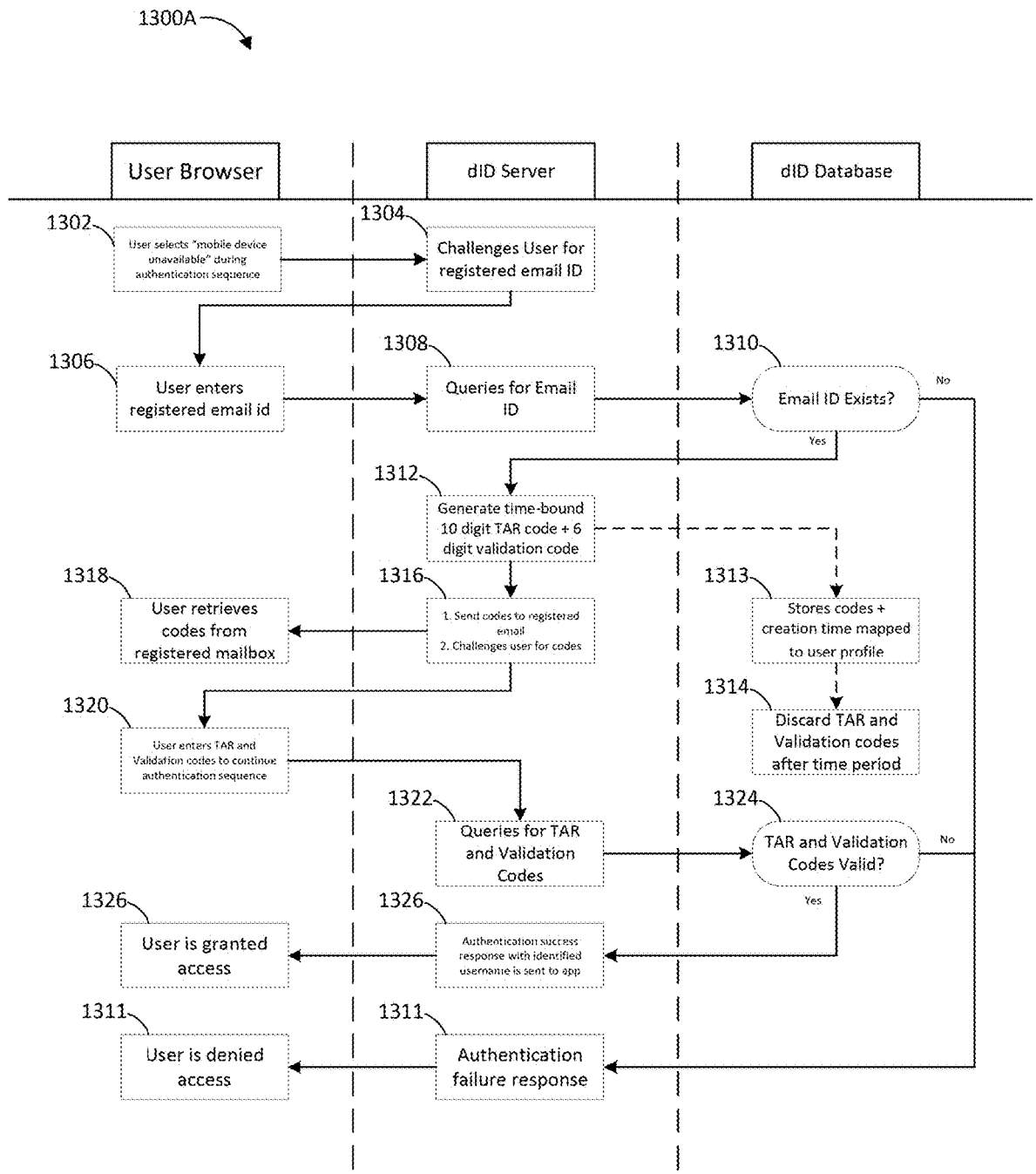
FIGS. 13A and 13B are schematics of methods for temporary access to an authentication system, in accordance with embodiments of the present application.
Figure 13B:
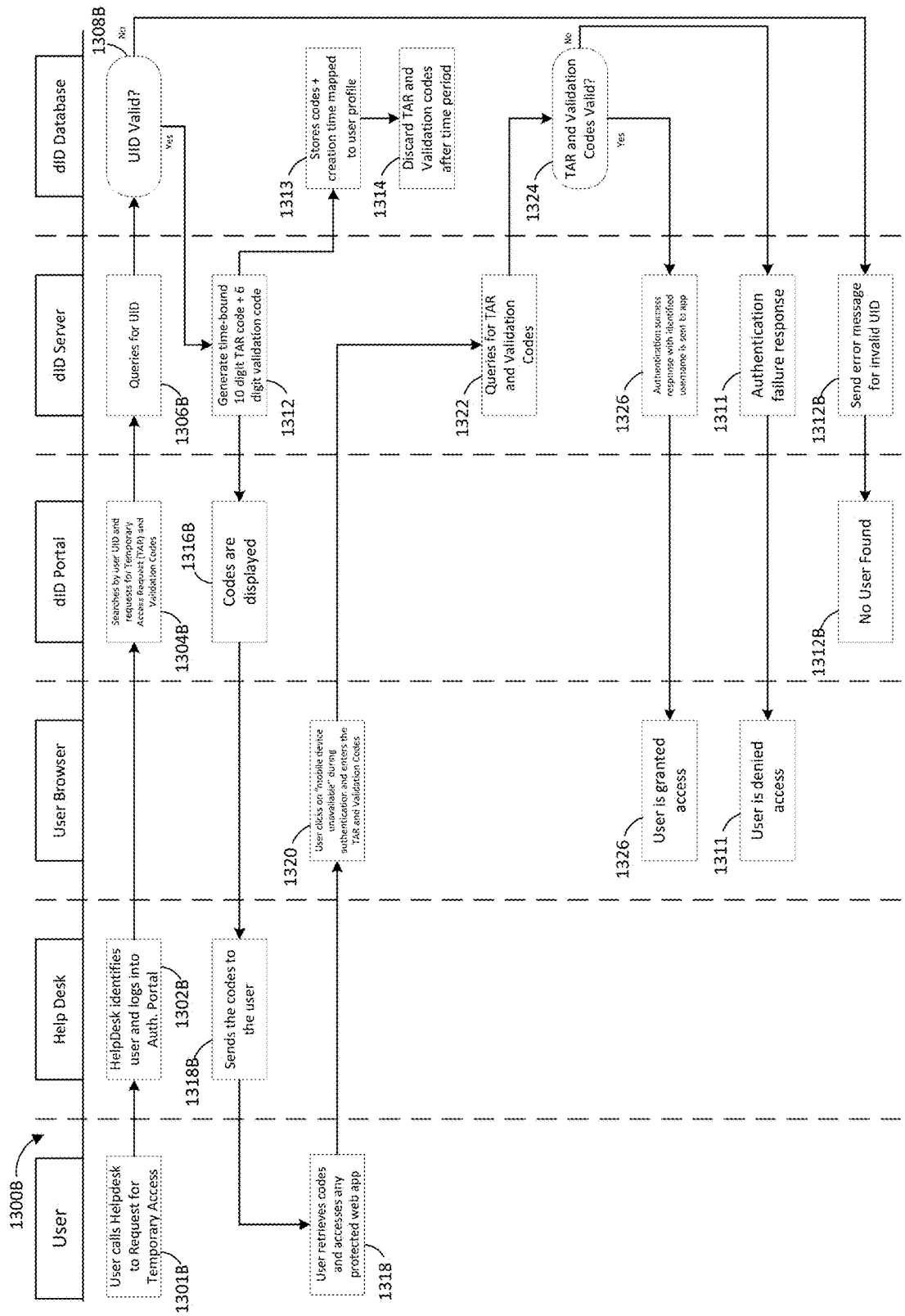

FIGS. 13A and 13B show methods 1300A and 1300B for providing a user with temporary access to the authentication system (e.g., if the user forgets their mobile device). In some embodiments, the dID server may be referred to as an authentication server, the dID portal may be referred to as an authentication portal, and the dID database may be referred to as an authentication database.

As shown in FIG. 13A, at step 1302, the user can select that a user device is not available. At step 1304, the server can request the user to input an email associated with the user profile. At step 1306, the user can input an email, and the server can, at step 1308 search the user database for the input email. At step 1310, the user database can automatically determine if the input email exists. If the input email does not exist, at step 1311, the system can deny the user access.

If at step 1310 the input email does exist, the server can automatically generate a temporary access request (TAR) code and/or a validator at step 1312. At step 1313 the server can send the TAR code and/or the validator to the user database, and a creation time of the TAR code and/or the validator, and the user database can store the TAR code and/or the validator, and the creation time of the TAR code and/or the validator. At step 1314, the user database can automatically delete the TAR code and/or the validator after a predetermined time.

At step 1316, the server can transmit the TAR code and/or the validator to the email associated with the user profile, and the server can request the user input the TAR code and/or the validator. At step 1318, the user can receive the TAR code and/or the validator via the email associated with the user profile. At step 1320, the user can input the TAR code and/or the validator, and the server can automatically search for the input TAR code and/or the input validator in the user database at step 1322. At step 1324, the user database can automatically determine if the input TAR code and/or the input validator are valid by automatically determining if the input TAR code and/or the input validator are a same TAR code and/or validator as the TAR code and/or the validator stored in the user database.

If at step 1324, the user database determines the TAR code and/or the validator are not valid, at step 1311, the system can deny the user access. If at step 1324, the user database determined the TAR code and/or the validator are valid, the server can authenticate the user and transmit a username associated with the user to the authentication client. At step 1326 the user can be granted access to the digital service.

As shown in FIG. 13B method 1300B can include the same steps at method 1300A except as described here. At step 1301B of method 1300B the user can contact a helpdesk to request access to the authentication system. The helpdesk can include human resources (HR), any enterprise or organization, or company tech support department. At step 1302B, the helpdesk can identify the user and login to a user identification portal to submit a user identification request at step 1304B by inputting a user identifier associated with the user. At step 1306B, the server can automatically search the user database for the user identifier. At step 1308B user database can automatically determine if the user identifier is valid by comparing the user identifier request with user identifiers stored I the user data base. If the user identifier is not valid, the server can transmit an error message to the user identification portal at step 1312B.

After the server generates the TAR code and/or the validator at step 1312, the server can transmit the user identification portal to display the TAR code and/or the validator to the helpdesk at step 1316B. At step 1318B the helpdesk can transmit the TAR code and/or the validator to the user.

Figure 14:
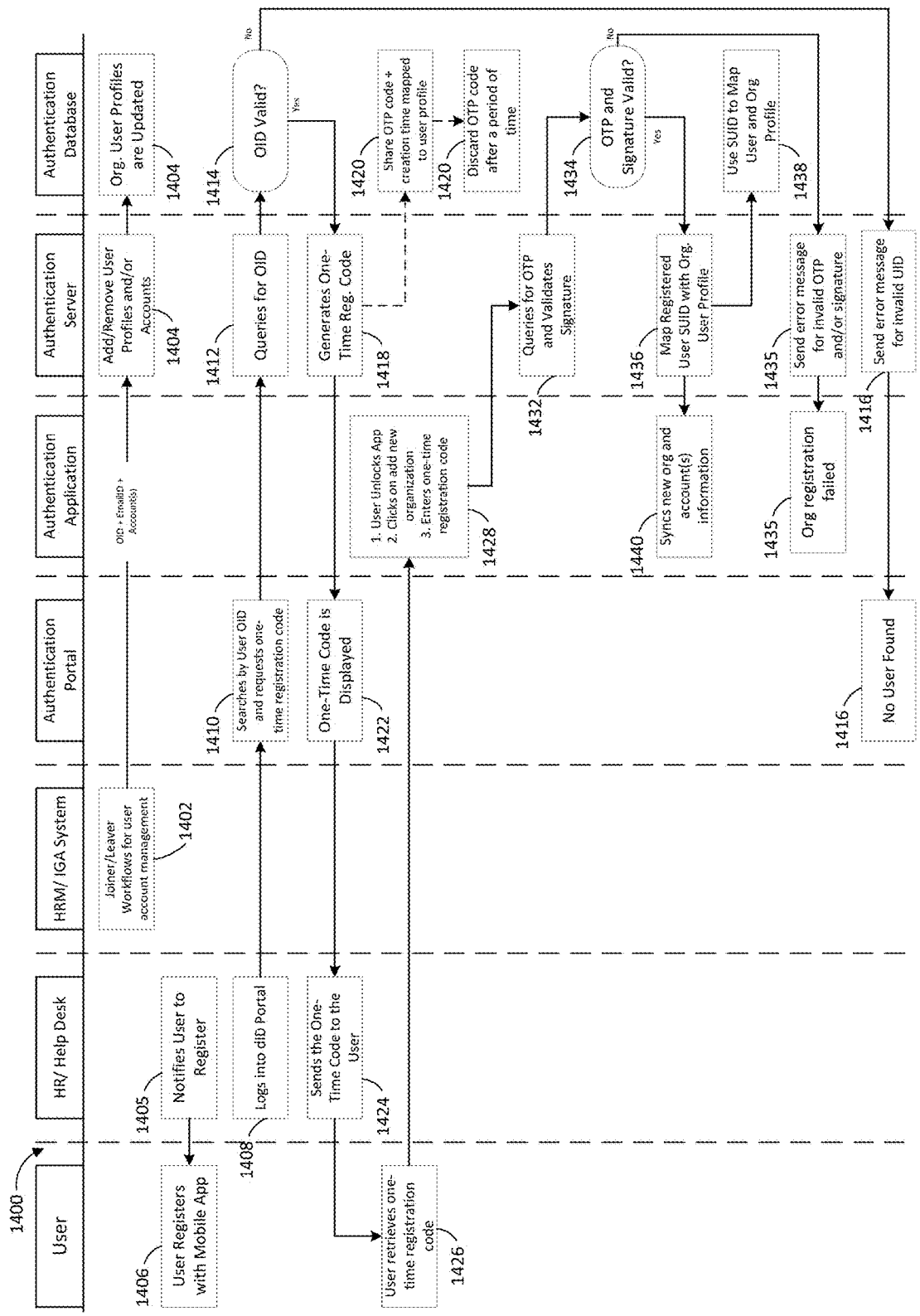
FIG. 14 is a method of mapping user accounts, in accordance with embodiments of the present application.
Figure 15A:
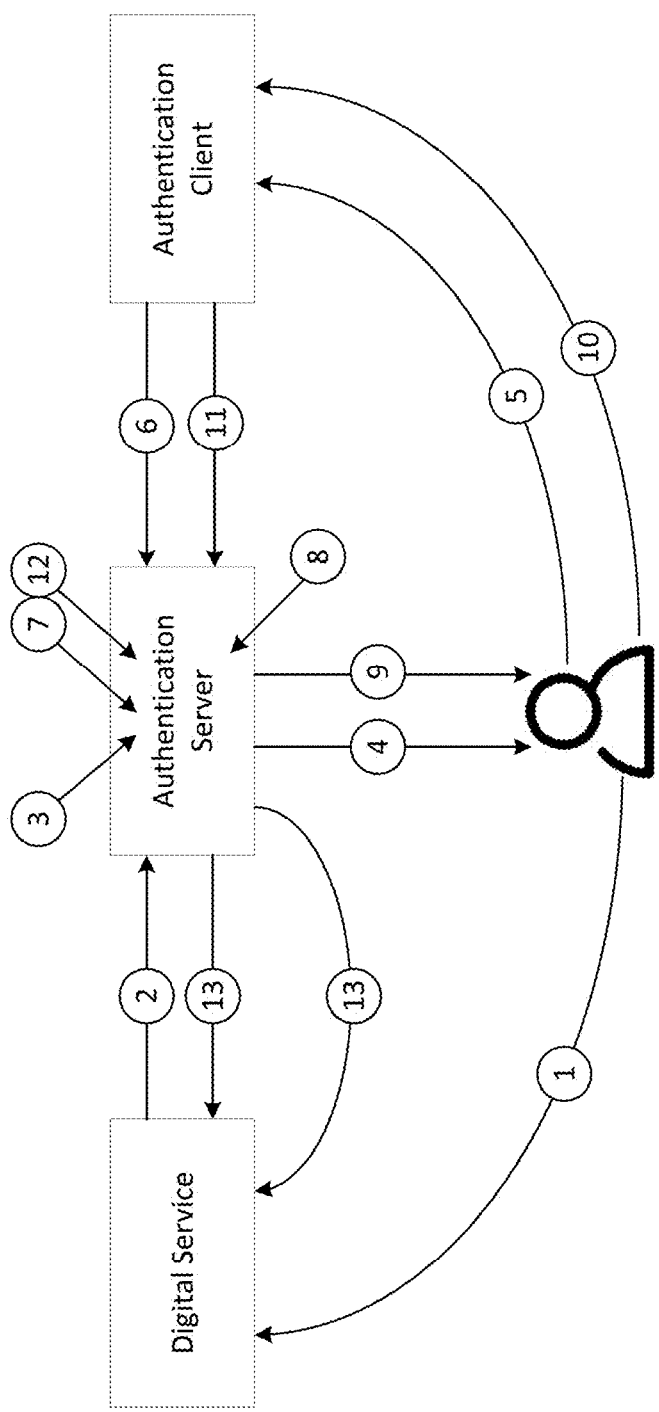
FIGS. 15A-15G are schematics of various embodiments of systems, methods, and devices for dynamic authentication and identification of the present application.
Figure 15B:
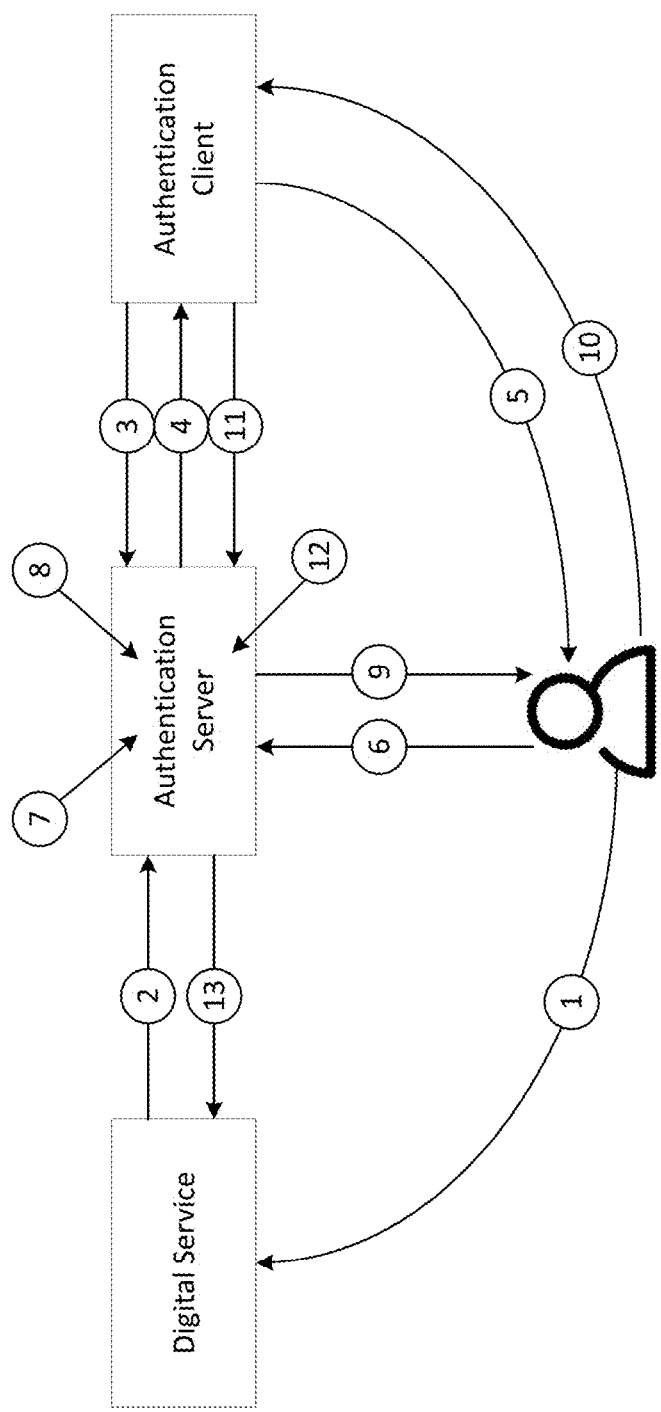
Figure 15C:
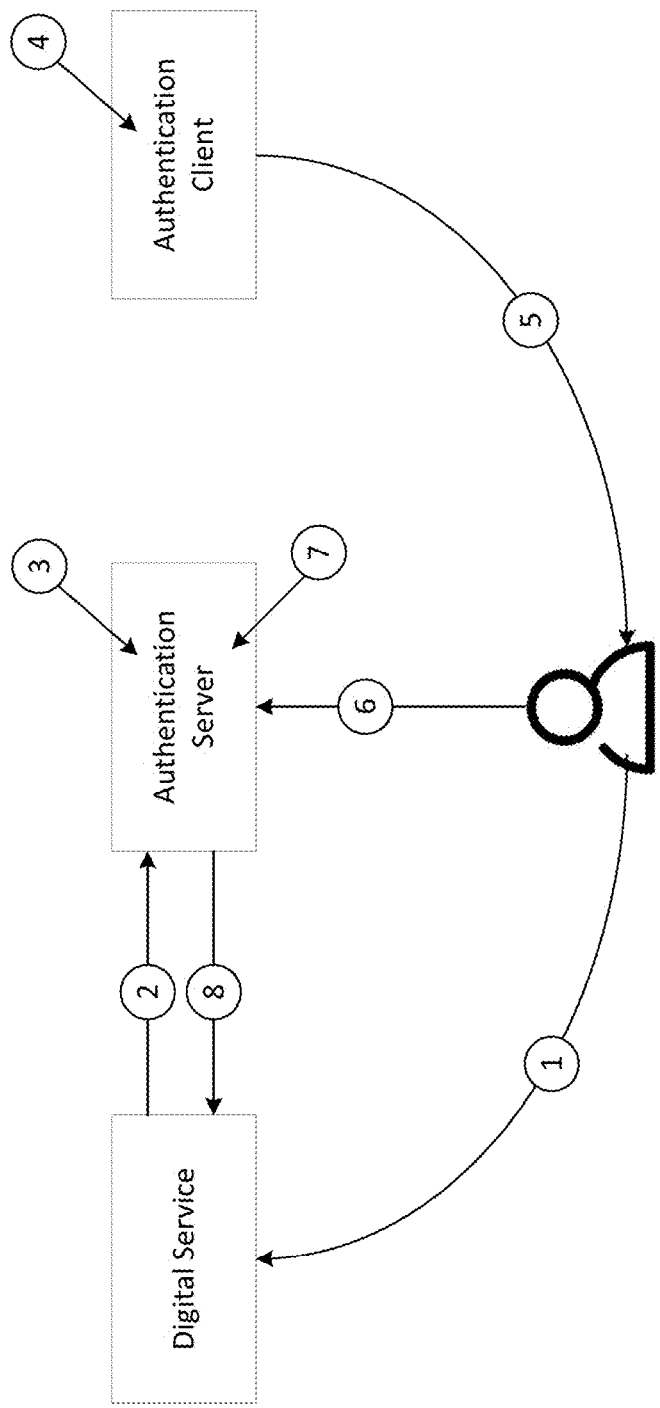
Figure 15D:
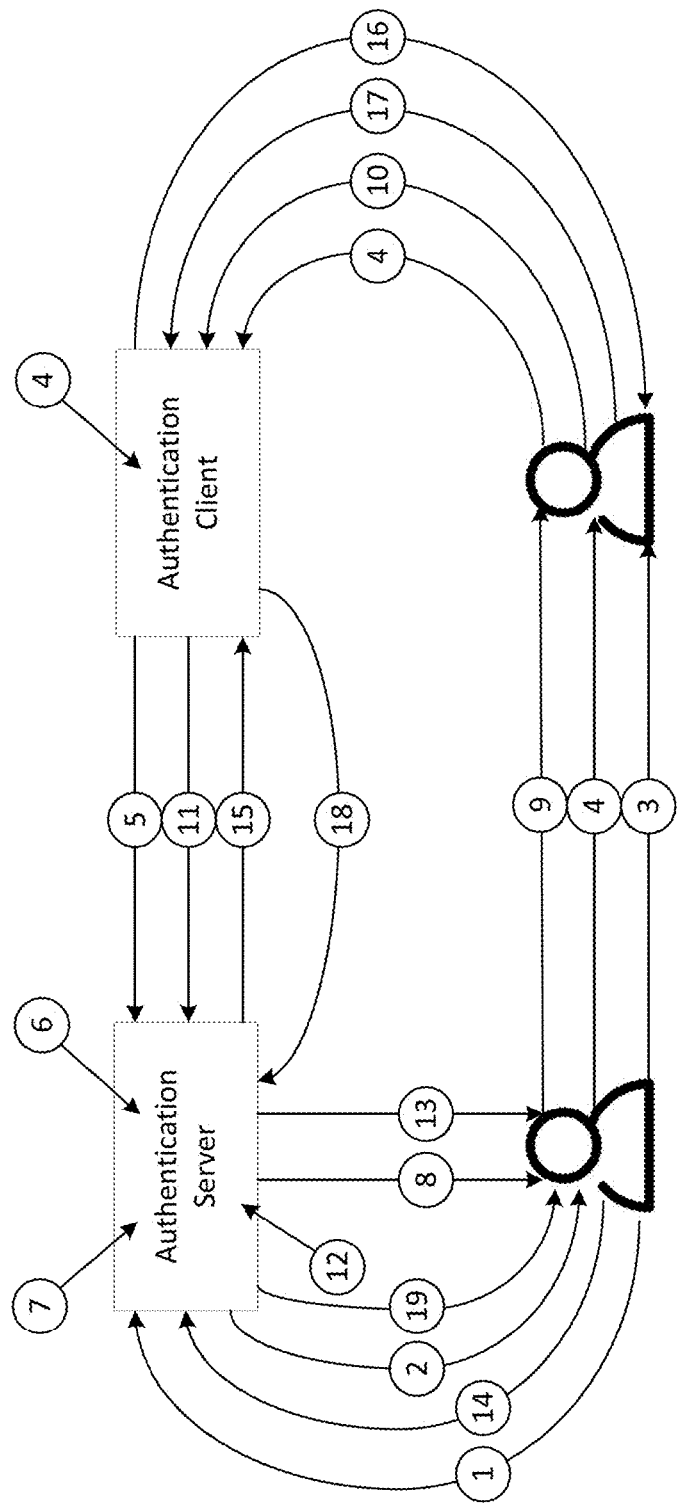
Figure 15E:
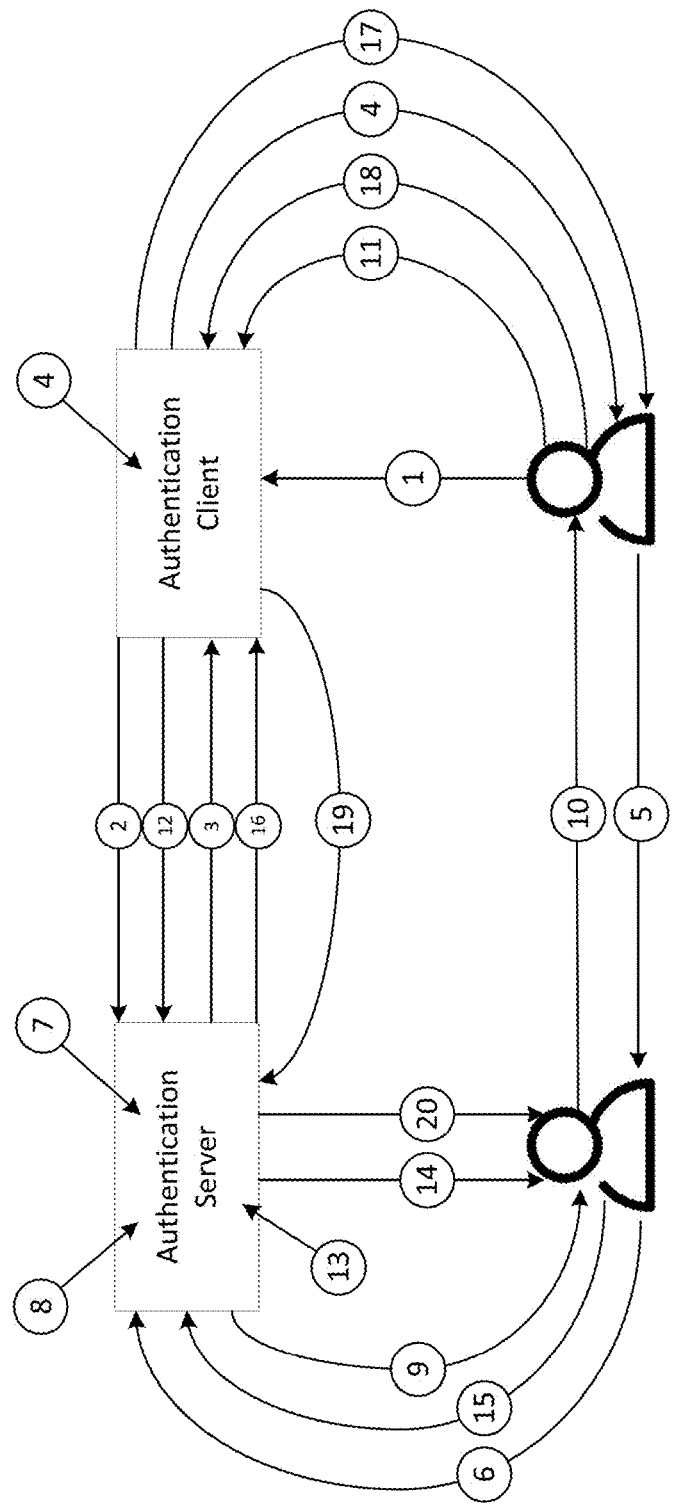
Figure 15F:
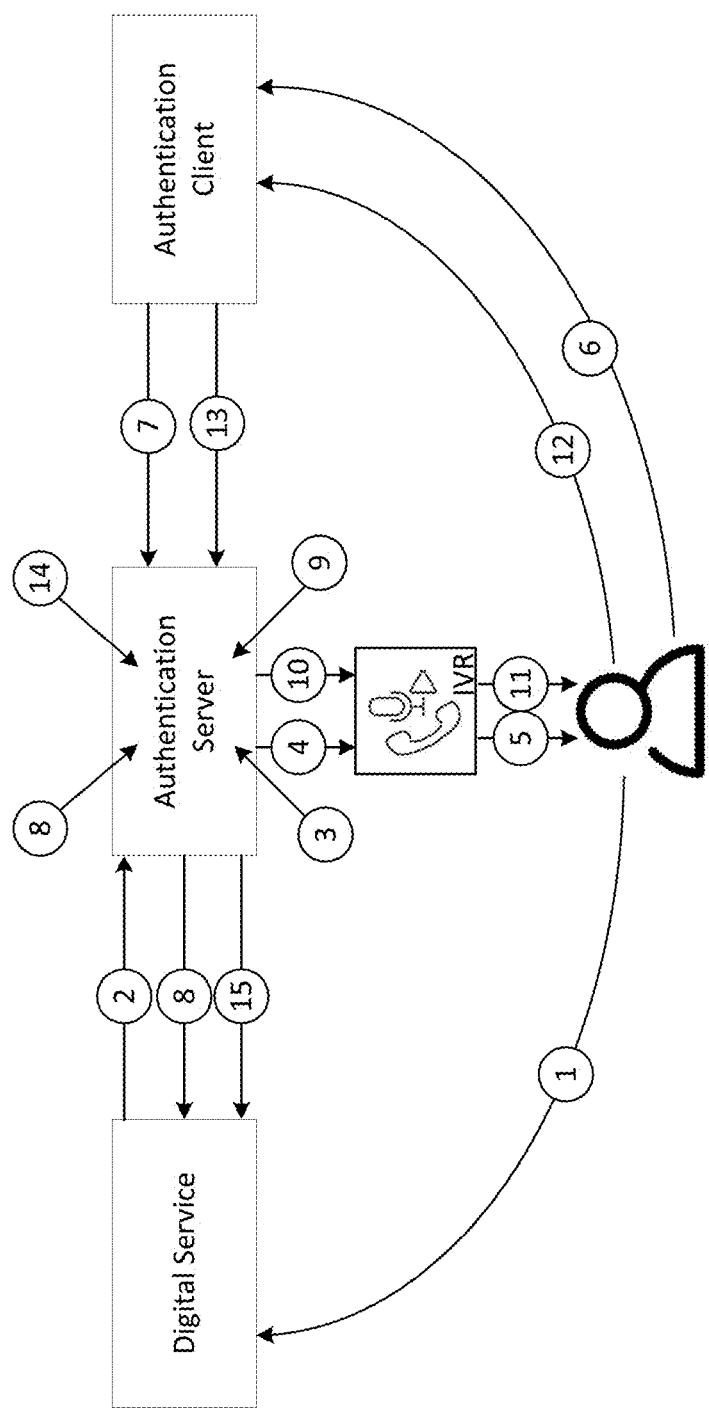
Figure 15G:
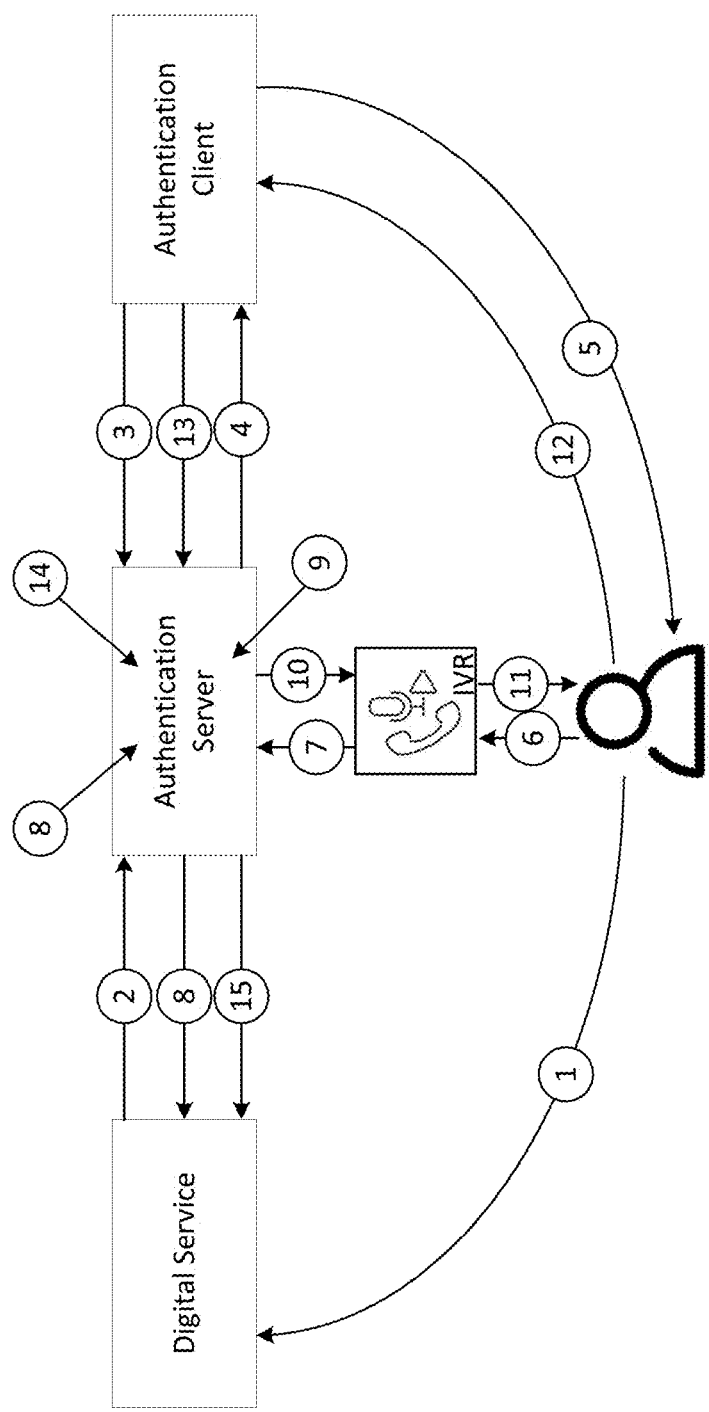

FIG. 14 shows a method 1400 for mapping user accounts. At step 1402, a user can join or leave a Human Resource Management (HRM) and/or Identity Governance and Administration (IGA) system. At step 1404, a server can add or remove the user. If the user joins the HRM or IGA system, the server can add the user by adding a user profile and/or account and transmitting the user profile and/or account to a user database. If the user leaves the HRM and/or IGA system, the server can remove the use by removing the user profile and/or account from the user database.

At step 1406, the user can register with an authentication app, via method 1200, after the user is notified to register at step 1405 by a helpdesk. After the user registers with the authentication app at step 1406, the helpdesk can login to a user identification portal at step 1408. At step 1410 the helpdesk can enter a user identifier associated with the user profile and/or account generated at step 1404. The user identification portal can request the server retrieve the user identifier from the user database and can request the server generate a registration code. At step 1412, the server can search the user database for the user identifier. At step 1414, the user database can determine if the user identifier is valid by comparing the user identifier to user identifiers stored in the user database. If the user identifier is the same as a user identifier stored in the user database, the user identifier can be valid. If the user identifier is not that same as any of the user identifiers stored in the user database, the user identifier can be invalid.

If at step 1414 the user database determines the user identifier is invalid, the server can transmit an error message to the portal at step 1416. The error message may contain a message that states that no user is found.

If at step 1414 the user database determines the user identifier is valid, the server can generate a registration code at step 1418. At step 1420, the server can transmit the registration code and a creation time to the user database. The user database can store the registration code and creation time and associate the registration code and the creation time with the user profile and/or account. In some embodiments, at step 1420, the user database can automatically delete the registration code after a predetermined time passes.

At step 1422, the server can transmit the registration code the user identification portal and the user identification portal can display the registration doe to the helpdesk. At step 1424, the helpdesk can transmit the registration code to the user. At step 1426, the user can receive the registration code. At step 1428, the user can select an option in the authentication app to add a new enterprise or organization, and the user can input the registration code into the authentication app. At step 1430, the authentication app can transmit the registration code and a public key associated with the user authentication app account to the server. At step 1432, the server can search the user database for the registration code and request that the user database validate the public key At step 1434, the user database can automatically determine if the registration code and the public key are valid.

The user database can determine if the registration code is valid by searching the user database for a same registration code stored in the user database. If the user database finds the same registration code, the user database can compare the public key to a user public key of a user authentication app account associated with the user. If the user public key is the same as the public key, the user database can determine that the registration code and the public key are valid. If the user database cannot find the same registration code or the user public key is not the same as the public key, the user database can determine that the registration code and the public key are invalid and, the server, at step 1435 send an error message to the use authentication app that registration failed.

If the at step 1434 the user database determines the registration code and the public key are valid, the server, at step 1436, can request the user database map the user authentication app account to the user profile and/or account. At step 1438, the user database can map the user authentication app account to the user profile and/or account via the public key. At step 1440, the authentication app can automatically sync the user authentication app account with the user profile and/or account.

FIGS. 16A-16B, 17, and 18

Figure 16A:
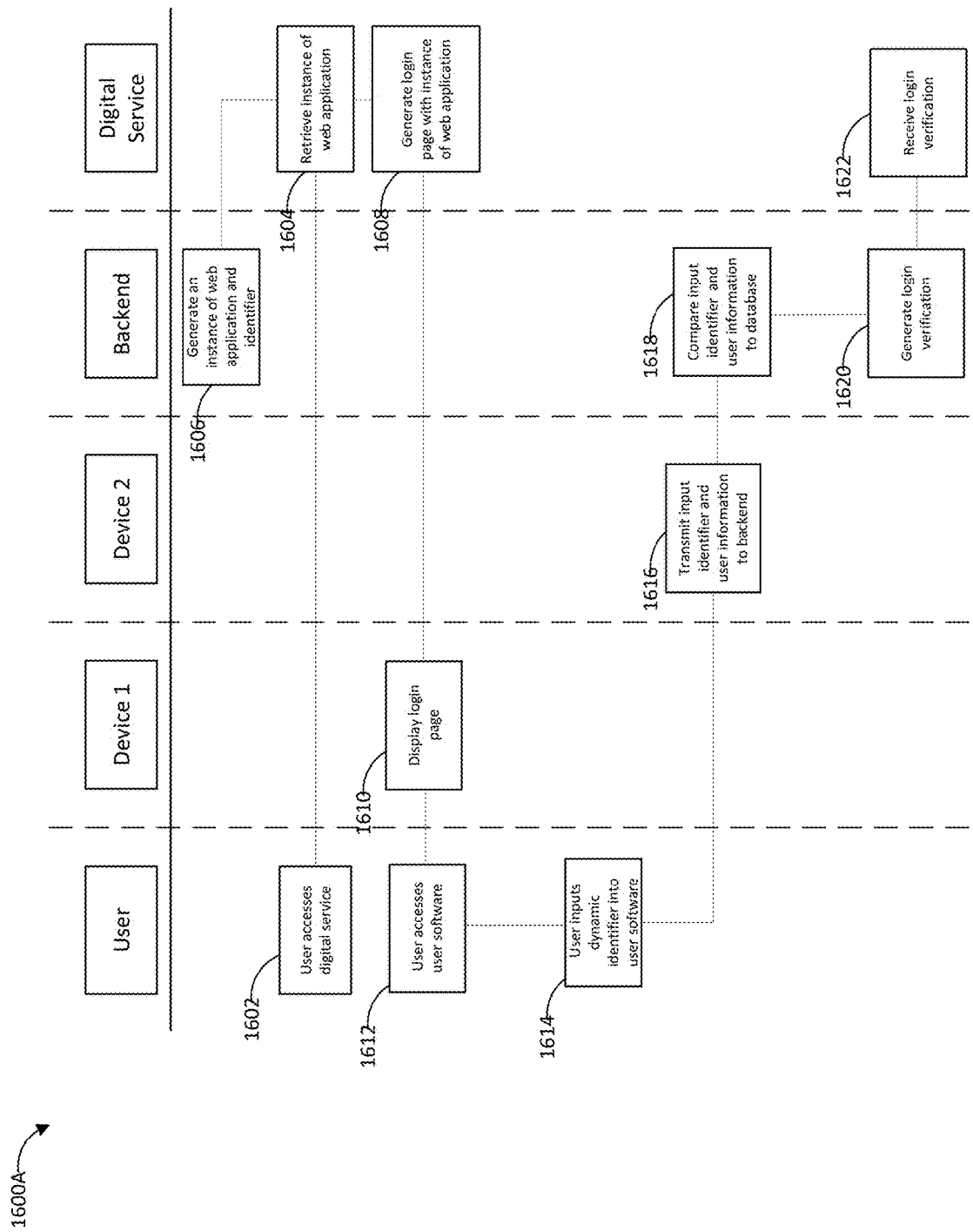
FIGS. 16A and 16B are schematics of various embodiments of systems, methods, and devices for dynamic authentication and identification of the present application.

FIG. 16A is a schematic of a method 1600A for dynamic authentication and identification. At step 1602 a user can access a digital service. In some embodiments, the user can access the digital service via a first device. The first device can be a mobile phone, a desktop computer, a laptop, and/or any other personal computing device. In some embodiments, the digital service can include a mobile application, a website, a web application, and/or any other service with a login sequence. In some embodiments, when the user accesses the digital service, the user can access a login sequence of the digital service. In some embodiments, the user can request to login to the digital service.

In some embodiments, at step 1604, the digital service can retrieve or request an instance of a web application from a backend of an authentication service (ID Service). In some embodiments, the digital service can transmit an authentication request to the backend. In some embodiments, digital service can transmit the authentication request via a federated protocol or an authentication protocol such as Security Assertion Markup Language (SAML) or OpenID Connect (OIDC). In some embodiments, the backend can be an authentication server. In some embodiments, the digital service can retrieve the instance of the web application and/or transmit the authentication request when the user accesses the digital service, when the user accesses the login sequence and/or when the user requests to login to the digital service. In some embodiments, the digital service can retrieve the instance of the web application and/or transmit the authentication request after the user accesses the digital service, after the user accesses the login sequence and/or after the user requests to login to the digital service.

In some embodiments, at step 1606, the backend can generate an instance of the web application. In some embodiments, the web application can include an instance of a service login page. In some embodiments, the backend can generate the instance of the web application in response to the authentication request from the digital service. The web application can include a display for an identifier. In some embodiments, the identifier can be a unique dynamic identifier. In some embodiments, the unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the predetermined length can be greater than 50 characters. In some embodiments, the identifier can be a barcode, a QR code, and/or any other machine-readable optical label. In some embodiments, the identifier can include two or more identifiers. In these embodiments, the identifier can include a unique identifier and a machine-readable optical label.

In some embodiments, the backend can generate the identifier. In some embodiments, the backend can generate the identifier in response to the request from the digital service. In some embodiments, the identifier can be associated with the user, the first device, a session between the digital service and the first device and/or a session cookie or session identifier generated by the backend. In some embodiments, the identifier can be associated with a time. In some embodiments, the time can be a time of the session, a time the identifier is generated, a time of the request from the digital service, and/or any other time. In some embodiments, the backend can store the identifier in a database.

In some embodiments, the backend can transmit the instance of the web application to the digital service and the digital service can retrieve the instance of the web application at step 1604. In some embodiments, the backend can transmit the instance of the service login page to the digital service. In some embodiments, when the backend transmits the instance of the web application to the digital service, the backend can not transmit the identifier to the digital service such that the digital service cannot access or read the identifier.

In some embodiments, the digital service can generate a login page at step 1608. In some embodiments, the login page can include the instance of the web application and/or the service login page generated by the backend at step 1606. In some embodiments, the web application and/or the service login page can be separate or independent from the digital service. In some embodiments, the digital service can not have access to information included in the instance of the web application. In some embodiments, the information included in the instance of the web application can include the identifier.

In some embodiments, the digital service can display the login page on the first device at step 1610. In some embodiments, the backend can display the identifier on the login page via the instance of the web application such that the digital service cannot access or read the identifier displayed in the instance of the web application. In some embodiments, when the backend displays the backend can display one or both of the unique identifier and the machine-readable optical label.

In some embodiments, the backend can generate an updated identifier. In some embodiments, the backend can generate the updated identifier after a predetermined time from when the backend generates the identifier. In some embodiments, the predetermined time can be about 1 second, about 2 seconds, about 3 seconds, about 4 seconds, about 5 seconds, about 10 second, about 15 seconds, about 20 seconds, about 25 seconds, about 30 seconds, about 31 seconds, about 32 seconds, about 33 seconds, about 34 seconds, about 35 seconds, about 36 seconds, about 37 seconds, about 38 seconds, about 39 seconds, about 40 seconds, about 41 seconds, about 42 seconds, about 43 seconds, about 44 seconds, about 45 seconds, about 50 seconds, about 55 seconds, about 1 minute, about 1 minute and 30 seconds, about 2 minutes, about 2 minutes and 30 seconds, about 3 minutes, about 3 minutes and 30 seconds, about 4 minutes, about 4 minutes and 30 seconds, about 5 minutes, about 6 minutes, about 7 minutes, about 8 minutes, about 9 minutes, about 10 minutes, about 15 minutes, about 20 minutes, about 30 minutes, and/or any value in between the aforementioned values.

In some embodiments, the backend can delete or remove the identifier from the database after the backend generates the updated identifier. In some embodiments, the backend can replace the identifier with the updated identifier, and the backend can store the updated identifier in the database. In some embodiments, the updated identifier can be associated with the user, the digital service, the first device, the session and/or the session cookie or session identifier between the digital service and the first device. In some embodiments, the updated identifier can be associated with a time. In some embodiments, the time can be a time of the session, a time the updated identifier is generated, a time of the request from the digital service, and/or any other time.

In some embodiments, the instance of the web application and/or the login page can automatically update or refresh after the predetermined time such that the updated identifier is displayed by the web application.

In some embodiments, the backend can continue to generate updated identifiers after the predetermined time since the backend last generated an identifier or updated identifier. In some embodiments, the backend can generate updated identifiers until the user logs into the digital service and/or the session ends.

In some embodiments, the user can access user software at step 1612. In some embodiments, the user software can be installed on a second device. In some embodiments, the user software can be an authentication application installed on a second device.

In some embodiments, when the user accesses the user software, the user software can perform a device security check of the second device. In some embodiments, the device security check can determine if the second device is jailbroken, if the second device has a user identification enabled (e.g., Biometric input, PIN, password, etc.), and/or any other potential security issues of the second device. If the device security check determines the second device has any security issues, the user software may prevent the user from accessing the user software.

In some embodiments, the user software can include a home screen, a user profile screen, and/or a history screen. In some embodiments, the user software can save data locally on the second device. In some embodiments, the data can include user identity information, a device signature, a public device key, a private device key, one or more organizations associated with the user, one or more devices associated with the user, a registration step of the second device, a user's name, a user's email, a user's phone number, and/or any other data.

In some embodiments, the second device, via the user software, can transmit data to the backend. In some embodiments, the second device can transmit data via a server call. In some embodiments, the server call can be a call to a REST API. In some embodiments, the server call can include a JSON payload. In some embodiments, responses to the server calls from the backend to the second device can include a JSON payload. In some embodiments, the responses to the server calls, can include a result of the server call, one or more errors, an error code, a time stamp, and/or any other data.

In some embodiments, the user can access the user software without user identification such that the user only has to login to the second device to access the user software. In some embodiments, the user software can request the user to input user identification to access the user software such that the user has to login to the second device and the user software to access the user software. In some embodiments, the user identification can be a user created password. In some embodiments, the user created password can be stored locally on the second device. In some embodiments, the user identification can be a biometric input. In some embodiments, the biometric input can be accessed by the user software via an operating system API. In some embodiments, the biometric input may be stored locally on the second device. Although in some embodiments the user does not need to enter the user identification to access the user software, these embodiments can be as secure as embodiments, where the user has to input the user identification to access the user software.

In some embodiments, when the user installs, downloads, and/or otherwise includes the user software on the second device, the user software can request or require the user to enroll or register to associate the second device with the user software. In some embodiments, the backend and/or the user software can transmit a one-time password (OTP) to the second device and/or the user. In some embodiments, the backend and/or the user software can transmit the OTP to the second device and/or the user to determine that the user can access the second device. In some embodiments, the OTP can confirm an identity of the user. In some embodiments, the user can quit or leave the enrollment or registration process. In some embodiments, if the user leaves the registration process, the user software can send a server call to determine a registration status of the user. In some embodiments, if the registration status of the user indicates that a user profile does not exist, the user software can delete any of the data saved locally on the device.

In some embodiments, the user software can require the user to input the OTP within a predetermined time period from when the OTP was generated. In some embodiments, the predetermined time period can be 1 minute, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, and/or any values between the aforementioned values.

In some embodiments, if the user does not input the OTP within the predetermined time period, the user software can generate a new OTP and/or send the new OTP to the user. In some embodiments, if the user enters the OTP within the predetermined time period, the user software can make a server call to the backend. In some embodiments, the server call can include the user identity information, the OTP and/or any other data or information. In some embodiments, the backend can respond with a JSON. In some embodiments, the JSON can include the OTP status, a device ID, devices associated with a phone number of the user, a name of the organization, and/or any other information. In some embodiments, the OTP status can be an integer. In some embodiments, the OTP status can indicate if the OTP sent in the server call a same OTP as an OTP stored in the backend, of the OTP sent in the server call is not the same OTP as the OTP stored in the backend, if an OTP exists for the user, if the user exists, and/or any other status of the OTP.

In some embodiments, if the phone number is associated with a device other than the second device, the user software can prompt the user to input whether the user wants to register the second device.

In some embodiments, when the user enrolls, the user software and/or the backend can create a user profile. In some embodiments, when the user enrolls, the user software can create a device signature such that the user can only access the user software on the second device. In this way, the user can only access the user software if the user can access or login to the second device. In some embodiments, the user software and/or the backend can associate the device signature with the user profile.

In some embodiments, the user profile can include the user's name, address, digital service account information, payment methods, and/or any other information commonly associated with digital service accounts. In some embodiments, the user profile can include a registration status, the user identity information, an organization name, an organization ID, a date and/or time the user added the organization to the user profile, and/or any other data or information disclosed herein.

In some embodiments, the device signature can include a MAC address, a device serial number, and/or any other software or hardware information of the second device. In some embodiments, the user software can access a device signature stored on the second device. In some embodiments, the device signature can be a dynamic device signature. In some embodiments, the user software can generate the device signature using device fingerprinting.

In some embodiments, the user profile can be associated with a user enterprise account. In these embodiments, when the user enrolls to associate the second device with the user software, the user software can request the user to login to the user enterprise account.

In some embodiments, when the user enrolls to associate the second device with the user software, the backend can associate the user enterprise account, the second device, the user software and/or the device signature with the user. In some embodiments, the backend can store information of the user enterprise account, the second device, user software and/or the device signature in a database and associate the information with the user.

In some embodiments, at step 1614, after the user accesses the user software at step 1612, the user can input the identifier displayed on the login page into the user software. In some embodiments, the user can input the identifier by inputting the unique dynamic identifier into the user software. In some embodiments, the user can input the identifier by capturing an image of the machine-readable code displayed on the login page.

In some embodiments, after the user inputs the identifier into the user software at step 1614, the user software and/or the second device can transmit the identifier to the backend at step 1616. In some embodiments, the user device and/or the second device can transmit user identification information to the back end. In some embodiments, the user identification information can include the device signature, a time when the user input the identifier into the user software, and/or any other information associated with the user, the second device or the identifier.

In some embodiments, the backend can receive the identifier and/or the user identification information and compare the received identifier and/or the user identification information to information in the database in order to confirm the user at step 1618. In some embodiments, if the received identifier is the same as the identifier stored in the database, the backend can confirm the user. In some embodiments, if the received identifier is the same as the identifier stored in the database, the time when the user input the identifier into the user software is within the predetermined time when the backend generated the identifier, and/or the device signature is a same device signature associated with the user that is stored in the database, the backend can confirm the user.

In some embodiments, after the database confirms the user at step 1618, the backend can generate a login verification at step 1620. In some embodiments, the backend can retrieve the session between the digital service and the first device and/or the session cookie or session identifier. In some embodiments, the backend can retrieve information from the user profile associated with the second device. In some embodiments, the information from the user profile associated with the second device can be information associated with the digital service of the session associated with the identifier. In some embodiments, the login verification can include the information from the user profile associated with the digital service of the session associated with the identifier. In some embodiments, the login verification can include the backend instructing the digital service allow the user to login or the backend instructing the digital service to deny the user login.

In some embodiments, the backend can transmit the login verification to the digital service of the session associated with the identifier, and the digital service can receive the login verification at step 1622. In some embodiments, the digital service can login the user or deny the user based on the login verification. In some embodiments, the digital service can login the user to a user digital service profile based on the information from the user profile associated with the digital service.

In some embodiments, if the user does not have a user digital service profile, the backend can automatically and dynamically generate or create the user digital service profile by using the information from the user profile. In some embodiments, the backend can store each user digital service profile associated with the user. In this way, the user does not have to keep track of every digital service the user has user digital service profiles for.

Figure 16B:
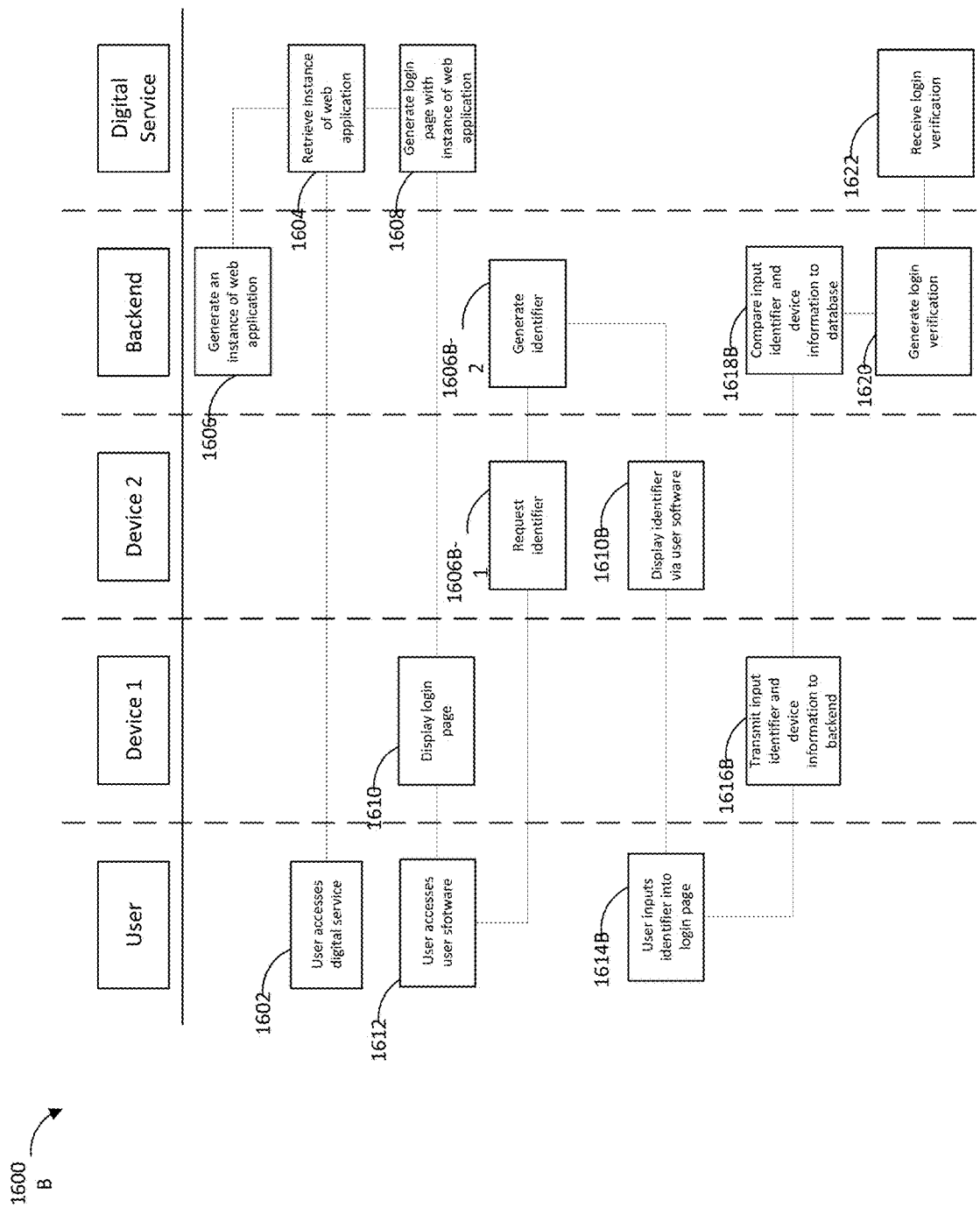

FIG. 16B is a schematic of a method 1600B for dynamic authentication and identification. Common features and/or steps between the method 1600A and the method 1600B will not be described again but are incorporated here in their entirety. In some embodiments, the user software can display the identifier to the user at step 1610B instead of the login page displaying the identifier to the user via the web application at step 1610. In some embodiments, when the digital service displays the login page at step 1610, the web application can display an input to the user at step 1610B.

In some embodiments, instead of generating the identifier at step 1606, the backend can generate the identifier at step 1606B-2. In some embodiments, the backend can generate the identifier at step 1606B-2 in response to a request for an identifier from the second device and/or the user software at step 1602B-1. In some embodiments, the identifier can be associated with the user and/or the second device. In some embodiments, the identifier can be associated with a time. In some embodiments, a time the identifier is generated, a time of the request for an identifier from the second device and/or the user software, and/or any other time. In some embodiments, the backend can store the identifier in a database.

In some embodiments, the second device and/or the user software can display the identifier to the user at step 1610B. In some embodiments, the backend can generate an updated identifier. In some embodiments, the backend can generate the updated identifier after a predetermined time from when the backend generates the identifier. In some embodiments, the predetermined time can be about 1 second, about 2 seconds, about 3 seconds, about 4 seconds, about 5 seconds, about 10 second, about 15 seconds, about 20 seconds, about 25 seconds, about 30 seconds, about 31 seconds, about 32 seconds, about 33 seconds, about 34 seconds, about 35 seconds, about 36 seconds, about 37 seconds, about 38 seconds, about 39 seconds, about 40 seconds, about 41 seconds, about 42 seconds, about 43 seconds, about 44 seconds, about 45 seconds, about 50 seconds, about 55 seconds, about 1 minute, about 1 minute and 30 seconds, about 2 minutes, about 2 minutes and 30 seconds, about 3 minutes, about 3 minutes and 30 seconds, about 4 minutes, about 4 minutes and 30 seconds, about 5 minutes, about 6 minutes, about 7 minutes, about 8 minutes, about 9 minutes, about 10 minutes, about 15 minutes, about 20 minutes, about 30 minutes, and/or any value in between the aforementioned values.

In some embodiments, the backend can delete or remove the identifier from the database after the backend generates the updated identifier. In some embodiments, the backend can replace the identifier with the updated identifier, and the backend can store the updated identifier in the database. In some embodiments, the updated identifier can be associated with the user, and/or the second device. In some embodiments, the updated identifier can be associated with a time. In some embodiments, a time the updated identifier is generated, a time of the request from the second device and/or the user software, and/or any other time.

In some embodiments, the user software can automatically update or refresh after the predetermined time such that the updated identifier is displayed by the user device.

In some embodiments, the backend can continue to generate updated identifiers after the predetermined time since the backend last generated an identifier or updated identifier. In some embodiments, the backend can generate updated identifiers until the user logs into the digital service and/or the user stops accessing the user software.

In some embodiments, the user can input the identifier into the login page at step 1614B. In some embodiments, the user can input the identifier into the web application such that the digital service cannot access or read the identifier when the user inputs the identifier.

In some embodiments, the web application and/or the first device can transmit the input identifier to the backend at step 1616B. In some embodiments, the web application and/or the first device can transmit digital service information to the backend. In some embodiments, the digital service information can include the session between the digital service and the first device, an IP address of the first device, a network of the first device, and/or any other information associated with the digital service or the first device.

In some embodiments, at step 1618B, the backend can search or query the database for the identifier stored in the database that is the same as the input identifier received from the first device and/or the web application. In some embodiments, if the backend does not find the identifier stored in the database, the backend can instruct the digital service to deny the user login when the backend generates the login verification at step 1620. In some embodiments, if the backend finds the identifier stored in the database, the backend can instruct the digital service to allow the user to login when the backend generates the login verification at step 1620.

In some embodiments, in methods 1600A and 1600B, the first device and the second device can be the same device. In these embodiments, when the user accesses the digital service at step 1602, the user software can automatically determine that the user is attempting to login to the digital service on the same device. In some embodiments, the user software can automatically transmit a notification to the digital service, via the device operating system, that the same device has the user software. In some embodiments, when the user accesses the digital service at step 1602, the digital service can automatically determine that the user has the user software on the same device. In some embodiments, the digital can automatically transmit a notification to the user software, via the device operating system, that the user is attempting to login to the digital service on the same device.

In some embodiments, when the first device and the second device are the same device, the digital service can prompt or ask the user if the user wants to login via the user software. In some embodiments, steps 1610 and 1612 of method 1600A can be skipped. In these embodiments, if the user input that the user would like to login via the user software, in method 1600A, the web application can automatically transmit the identifier, and/or the session between the digital service and the same device, to the user software at step 1614. In some embodiments, steps 1610, 1612, 1606B-1, and 1610B of method 1600B can be skipped. In these embodiments if the user input that the user would like to login via the user software, in method 100B, the user software can automatically transmit the identifier and/or the device signature to the web application at step 1614B.

In some embodiments, the user software and/or the web application can not transmit the identifier, and the backend can automatically generate a login verification at step 1620 when the first device and the second device are the same device.

FIG. 17 shows a schematic of a login page 1700 of the digital service. In some embodiments, the login page 1700 can include a digital service portion 1702 and a web application 1704. In some embodiments, the web application 1704 may be displayed by a digital service such that both the digital service portion 1702 and the web application 1704 appear to be or look like a same webpage. In some embodiments, as described above with reference to FIGS. 16A and 16B, the web application 1704 can be displayed by the digital service as part of the login page 1700, but the digital service cannot access to read any information displayed to the user via the web application 1704. In this way, an identifier displayed to the user is not transmitted to the digital service. In some embodiments, the web application 1704 can display an identifier 1706 and/or organization information 1708. In some embodiments, the organization information 1708 can include information about the digital service and/or information about an enterprise associated with the user.

Figure 18:
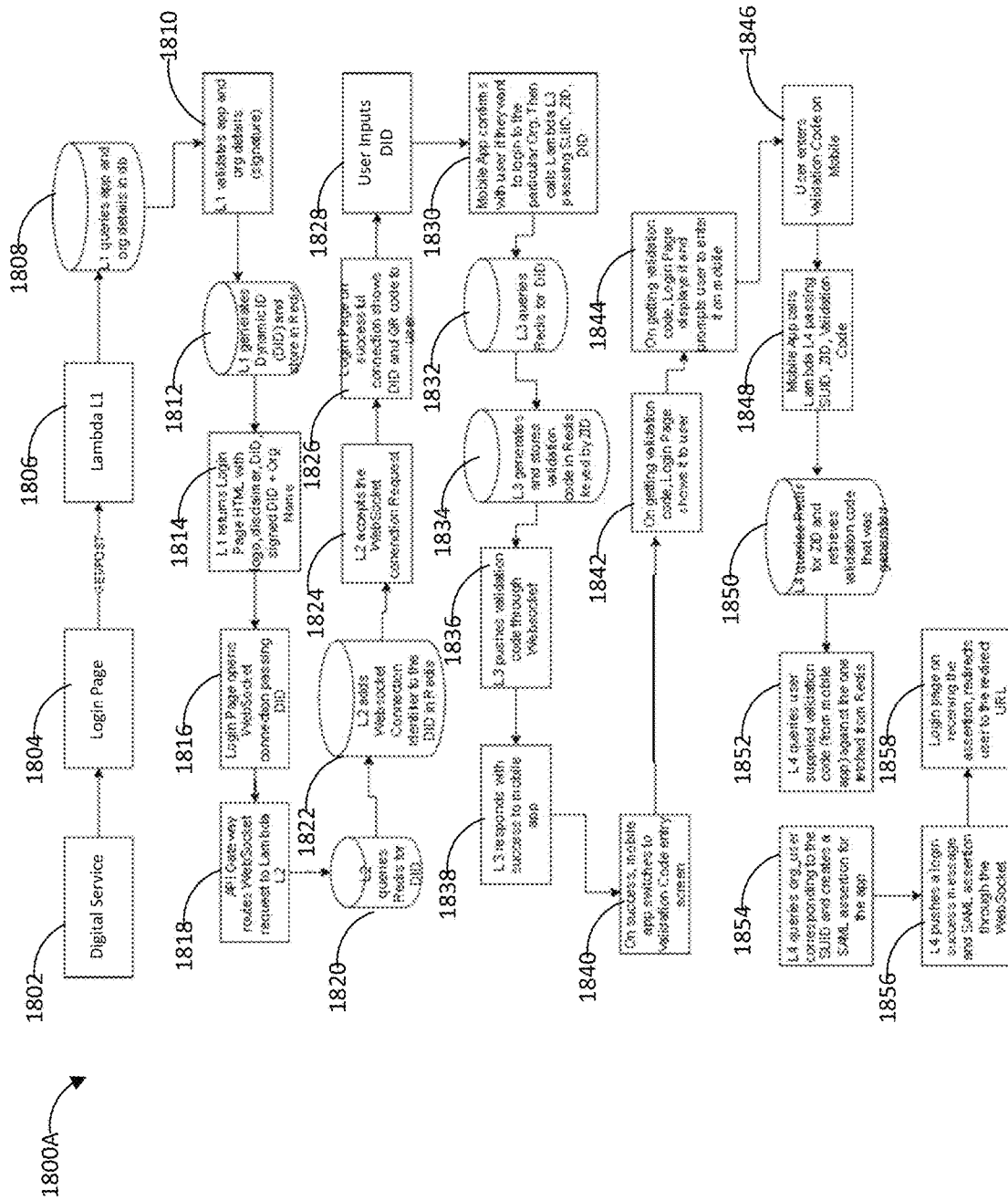
FIG. 18 is a schematic of a method of an embodiment of systems, methods, and devices for dynamic authentication and identification of the present application.

FIG. 18 shows a schematic of a method 1800A of a dynamic authentication and identification described herein. In some embodiments, at step 1802, a user can attempt to login to a digital service. In some embodiments, the user can attempt to login to the digital service via an enterprise account. In some embodiments, the digital service can include any software application, website, and/or any other software that requires a user to login. In some embodiments, the digital service can include an intranet digital service or intranet corporate application. In some embodiments, the digital service can include a digital service with an enterprise account login option.

In some embodiments, at step 1804, the user can access a sign on page of the digital service. In some embodiments, the sign on page can be a single sign on page (SSO). In some embodiments, the digital service can have a Security Assertion Markup Language (SAML) integration with a service for dynamic authentication and identification (ID Service). In some embodiments, when the user accesses the sign on page, the digital service can use a GET request and/or a POST request to a first function of the ID Service (Lambda L1) at step 1806. In some embodiments, if the digital service uses a POST request, the SAML request can be sent as Form Data.

In some embodiments, Lambda L1 can query a metadata database to retrieve metadata at step 1808. In some embodiments, Lambda L1 can receive an organization name and integration ID from the SAML request. In some embodiments, the organization name can include a name of the enterprise. In some embodiments, the integration ID can include a numeric, alphabetical, and/or alphanumeric string associated with the digital service. In some embodiments, Lambda L1 can use the organization ID and the integration ID to query the metadata database to retrieve the metadata.

In some embodiments, the metadata can include enterprise information. In some embodiments, the enterprise information can include the organization ID, an enterprise name, an enterprise logo, an enterprise disclaimer, and/or an enterprise disabled date/time. In some embodiments, the organization ID can be an integer, a numerical value, an alphabetical, and/or alpha-numeric string. In some embodiments, the organization ID can be used by Lambda L1 to query the metadata database for the enterprise information. In some embodiments, the metadata can include an application information. In some embodiments, Lambda L1 can use the integration ID to query for an application that corresponds to the integration ID. In some embodiments, the application information can be information or data stored in the metadata database associated with the application. In some embodiments, the application information can include an application ID, an application name, a session timeout threshold, an integration type, application metadata, an application disabled date/time, and/or application attributes. In some embodiments, the enterprise disabled date/time and/or the application disabled date/time can include a date and/or time when the user stopped using or disabled the ID Service with the enterprise account and/or the digital service.

In some embodiments, Lambda L1 can verify the SAML request at step 1810. In some embodiments, Lambda L1 can use signature validation with a public key corresponding to the application and/or a user device.

In some embodiments, after Lambda L1 verifies the SAML request, Lambda L1, Lambda L1 can generate an identifier at step 1812. In some embodiments, the identifier can be a unique dynamic identifier. In some embodiments, the unique dynamic identifier can be a numerical, alphabetical, or alpha-numeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 characters, 14 characters, 15 characters, 20 characters, 25 characters, 30 characters, 40 characters, 50 characters, and/or any value between the aforementioned values. In some embodiments, the predetermined length can be greater than 50 characters. In some embodiments, the identifier can be a machine-readable code. In some embodiments, the machine-readable code can be a barcode, a QR code, and/or any other machine-readable optical label. In some embodiments, the identifier can include two or more identifiers. In these embodiments, the identifier can include a unique identifier and a machine-readable optical label.

In some embodiments, Lambda L1 can store the identifier in an identifier database. In some embodiments, the identifier database can be a part of the metadata database or the identifier database can be a separate database. In some embodiments, the identifier database can be Redis and/or any other database. In some embodiments, the Lambda L1 can associate the identifier with a value. In some embodiments, the value can include the integration ID, the organization ID, and the application attributes. In some embodiments, the value can include any of the metadata. In some embodiments, the identifier can be a unique identifier or a QR code including the value.

In some embodiments, Lambda L1 can use set to generate and/or store the identifier. In some embodiments, Lambda L1 can use setNx to generate and/or store the identifier so Lambda L1 does not create a race condition.

In some embodiments, Lambda L1 can set the identifier to expire after a predetermined time. In some embodiments, the predetermined time can be about 1 second, about 2 seconds, about 3 seconds, about 4 seconds, about 5 seconds, about 10 second, about 15 seconds, about 20 seconds, about 25 seconds, about 30 seconds, about 31 seconds, about 32 seconds, about 33 seconds, about 34 seconds, about 35 seconds, about 36 seconds, about 37 seconds, about 38 seconds, about 39 seconds, about 40 seconds, about 41 seconds, about 42 seconds, about 43 seconds, about 44 seconds, about 45 seconds, about 50 seconds, about 55 seconds, about 1 minute, about 1 minute and 30 seconds, about 2 minutes, about 2 minutes and 30 seconds, about 3 minutes, about 3 minutes and 30 seconds, about 4 minutes, about 4 minutes and 30 seconds, about 5 minutes, about 6 minutes, about 7 minutes, about 8 minutes, about 9 minutes, about 10 minutes, about 15 minutes, about 20 minutes, about 30 minutes, and/or any value in between the aforementioned values.

In some embodiments, at step 1814, Lambda L1 can generate or render a ID Service login page (referred to as the instance of a web application above with reference to FIGS. 16A-17). In some embodiments, the ID Service login page can be in an HTML format. In some embodiments, the ID Service login page can include the organization logo, the organization disclaimer, a signed payload with the identifier, the organization name, and/or a hidden field including the identifier. In some embodiments, Lambda L1 can transmit the ID Service login page to the digital service in response to the SAML request.

In some embodiments, the ID Service login page can open a WebSocket connection at step 1816. In some embodiments, the ID Service login page can expose the WebSocket connection via an API Gateway. In some embodiments, the ID Service login page can transmit the identifier and/or cookies through the WebSocket connection via a connection request.

In some embodiments, at step 1818, the connection request can be routed or directed to a second function of the ID Service (Lambda L2). In some embodiments, the connection request can be routed or directed with a WebSocket connection identifier. In some embodiments, at step 1820, Lambda L2 can query the identifier database for the identifier.

In some embodiments, if Lambda L2 finds or identifies the identifier in the identifier database, Lambda L2 can store the WebSocket connection identifier in the identifier database at step 1822. In some embodiments, Lambda L2 can add the WebSocket connection identifier to the value of the identifier.

In some embodiments, at step 1824, if Lambda L2 finds or identifies the identifier and adds the WebSocket connection identifier to the value of the identifier, Lambda L2 can transmit a success message through the WebSocket connection to accept the connection request.

In some embodiments, in response to the success message, the ID Service login page can display the identifier in a text field of the ID Service login page at step 1826. In some embodiments, the ID Service login page can display the unique identifier and/or the machine-readable code. In some embodiments, the machine-readable code can include a signed unique identifier and/or the organization name. In some embodiments, the ID Service login page can prompt the user to scan the machine-readable code with a user device and/or manually input the unique identifier into the user software.

In some embodiments, at step 1828, the user can input the identifier. In some embodiments, the user can input the identifier into user software of the user device. In some embodiments, the user software can be an authentication application. In some embodiments, the ID Service can automatically verify a signature of the signed unique identifier of the machine-readable code.

In some embodiments, at step 1830, the ID service can prompt the user, in the user software and/or the ID Service login page, to confirm the user wants to login to digital service via the enterprise the user software and/or the ID Service login page.

In some embodiments, once the user confirms the user wants to login to the digital service via the enterprise, at step 1832, the user software can call a third function of the ID Service (Lambda L3). In some embodiments, the user software can transmit a payload to Lambda L3. In some embodiments, the payload can be a signed payload. In some embodiments, the payload can include the identifier (i.e., the unique identifier and/or the machine-readable code), a user device ID, and/or a user ID. In some embodiments, the user device ID and/or the user ID can be stored locally on the user device. In some embodiments, the user device ID can include a device signature as described above with reference to FIGS. 16A and 16B. In some embodiments, the user ID generated when the user enrolls in the ID Service. In some embodiments, the user ID can include the user information as described above with reference to FIGS. 16A and 16B.

In some embodiments, Lambda L3 can query the identifier database for a same identifier as the identifier included in the payload at step 1832.

In some embodiments, if Lambda L3 finds the same identifier in the identifier database, Lambda L3 can generate a validation code at step 1834. In some embodiments, the validation code can be a numerical, alphabetical, or alphanumeric string of characters of a predetermined length. In some embodiments, the predetermined length can be 1 character, 2 characters, 3 characters, 4 characters, 5 characters, 6 characters, 7 characters, 8 characters, 9 characters, 10 characters, 11 characters, 12 characters, 13 character, 14 characters, 15 characters, 20 characters, 25 characters, 30 characters, 40 characters, 50 characters, and/or any value between the aforementioned values. In some embodiments, the validation code can be machine-readable code. In some embodiments, the machine-readable code can be a barcode, a QR code, and/or any other machine-readable optical label. In some embodiments, Lambda L3 can add the validation code to the value of the identifier.

In some embodiments, at step 1836, Lambda L3 can transmit the validation code via the WebSocket connection opened by the ID Service login page.

In some embodiments, at step 1838, Lambda L3 can transmit a success message to the user software. In some embodiments, the user software can receive the success message. In some embodiments, in response to receiving the success message, the user software can display an input for the user to input the validation code at step 1840.

In some embodiments, at step 1842, the ID Service login page can receive the validation code. In some embodiments, the ID Service login page can display the validation code to the user.

In some embodiments, at step 1844, the ID Service login page can prompt the user to input the validation code into the user software. In some embodiments, at step 1846 the user can input the validation code by scanning the machine-readable code with the user device and/or manually inputting the unique identifier into the user software. In some embodiments, the user software can receive the validation code.

In some embodiments, in response to receiving the validation code, at step 1848, the user software can call a fourth function of the ID service (Lambda L4). In some embodiments, the user software can transmit a payload to Lambda L4. In some embodiments, the payload can be a signed payload. In some embodiments, the payload can include the validation code, the identifier, the user ID, the device ID, and/or any other information.

In some embodiments, at step 1850, Lambda L4 can query the identifier database for the device ID. In some embodiments, Lambda L4 can retrieve the validation code of the value that includes the device ID. In some embodiments, at step 1852, Lambda L4 can query or compare the validation code from the identifier database to the validation code input by the user.

In some embodiments, if the validation code from the identifier database and the validation code input by the user are the same, at step 1854, Lambda L4 can delete the identifier and/or the value from the identifier database. In some embodiments, Lambda L4 can query the metadata database for an enterprise user of the enterprise corresponding to the user ID. In some embodiments, Lambda L4 can retrieve user attributes of the enterprise user from the metadata database. In some embodiments, the user attributes can include a user's name, a user's profile, address, payment information, and/or any other user information associated with the digital service. In some embodiments, Lambda L4 can generate an SAML assertion. In some embodiments, the SAML assertion can include the user attributes.

In some embodiments, the at step 1856, Lambda L4 can transmit a success notification to the user software. In some embodiments, the user software receives the success notification. In some embodiments, in response to receiving the success notification, the user software can display the success notification to the user. In some embodiments, Lambda LA can transmit the SAML assertion via the WebSocket connection.

In some embodiments, Lambda L3 can complete at least a portion of steps 1854 and 1856, instead of Lambda L4, if Lambda L3 finds the same identifier in the identifier database at step 1832. In this way, the user can login to the digital service without the validation code and the user can login to the digital service with just the identifier.

In some embodiments, at step 1858, the ID Service login page can receive the SAML assertion. In some embodiments, in response to receiving the SAML assertion, the ID Service login page can redirect the user to a URL. In some embodiments, the URL can be a URL included in the SAML request or the URL can be a default URL in SAML metadata.

It is to be appreciated that the terms enterprise and/or organization used with reference to FIG. 18 can refer to a company, a partnership, a school, an economic organization, a business organization, a government organization, a partnership, the digital service (i.e., the application or website the user is attempting to login to), and/or any other enterprise or organization.

FIGS. 19A-19B, 20A-20B, 21A-21E, 22A-22B, 23A-23B, and 24

A technical benefit of userID-less and password-less authentication is that it further reduces the attack vector. Otherwise one would need to additionally know about the different approaches for defending attacks that involve a login ID.

Offer customers (digital services) a portal for them to manage their employees from an administrator/super user account (e.g., HR). Employees of a customer may also be able to use the portal to manage some things about their own account.

Every customer can have a provisioning system for employees when they are onboarded when they join and offboarded when they resign. That provisioning system can directly call the authentication server via an API and be directly integrated.

Figure 19A:
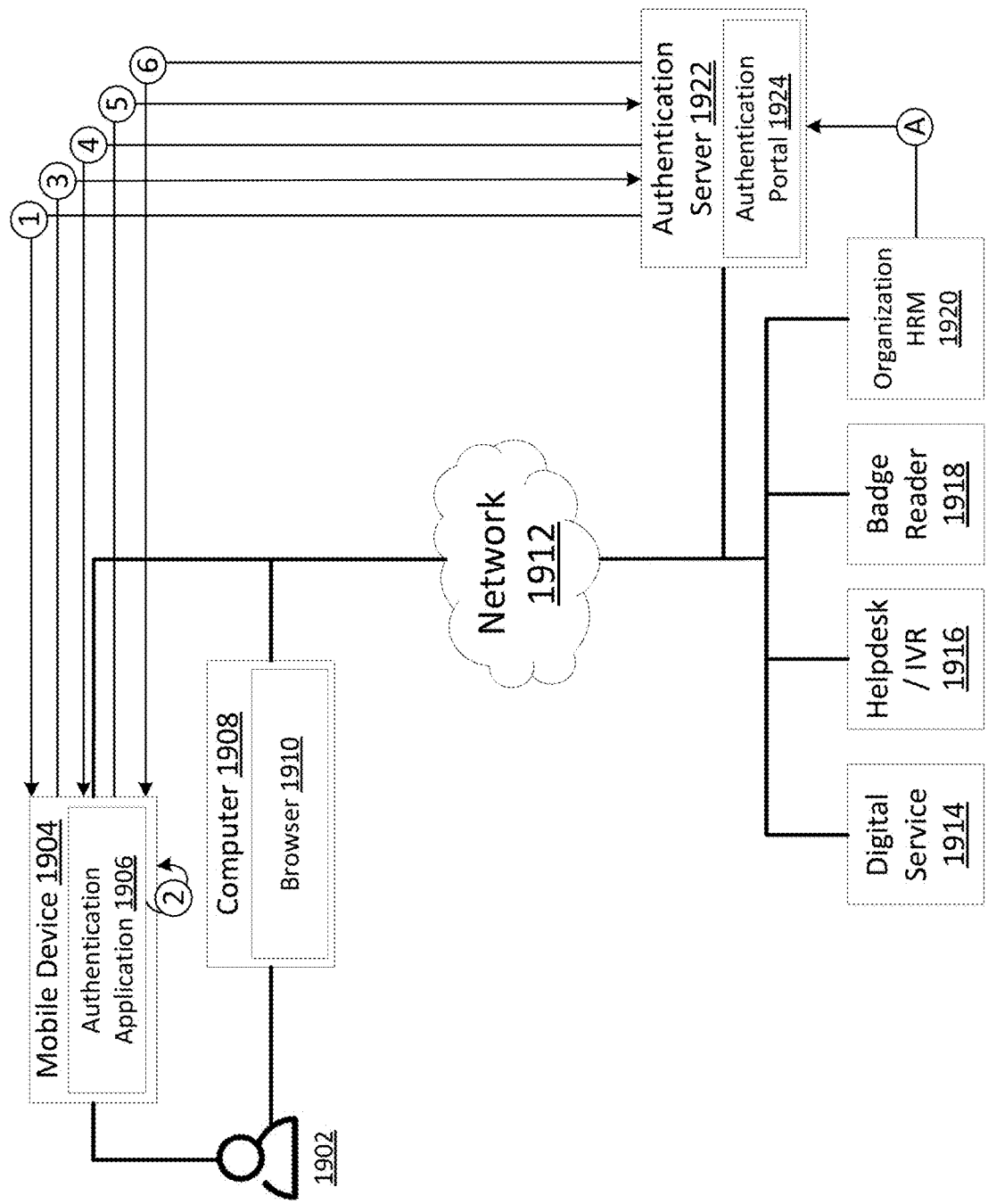
FIGS. 19A-19B are hybrid system diagrams illustrating a workflow associated with the initial registration of an organization followed by the registration of a new user associated with the organization, in accordance with embodiments of the present application.
Figure 19B:
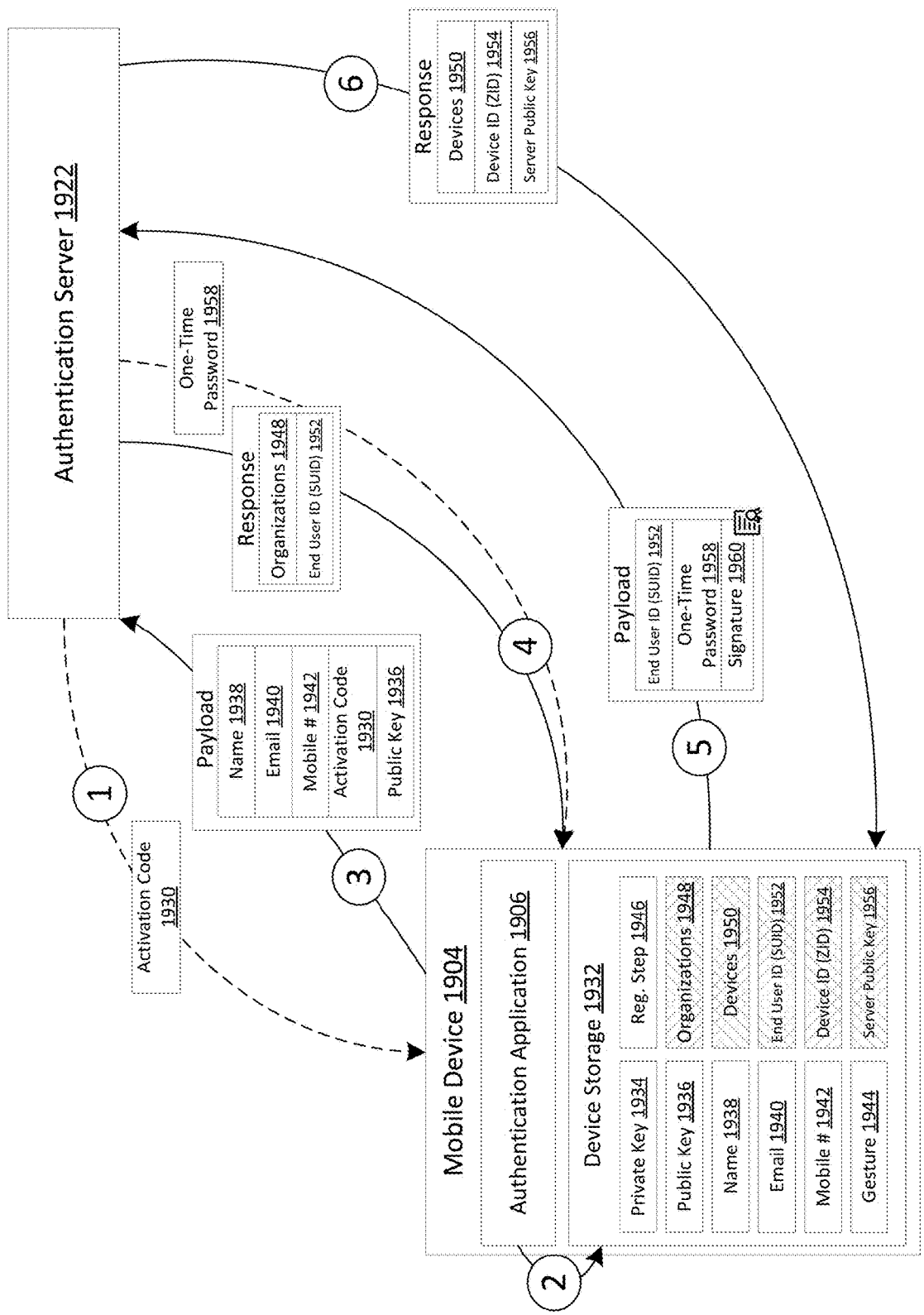

FIG. 19A is a hybrid system diagram illustrating a workflow associated with the initial registration of an organization followed by the registration of a new user associated with the organization, in accordance with embodiments of the present application. FIG. 19B illustrates how information may be saved and transmitted at various points in the workflow illustrated in FIG. 19A. More specifically, it illustrates in greater detail how information may be transmitted between the authentication server 1922 and the mobile device 1904 during circles 1-4 of the workflow. FIGS. 19A & 19B are described in conjunction below.

At circle A, the first time an organization signs up with the authentication server 1922 (e.g., a new customer of the authentication service provided by the authentication server 1922), the organization may provide information about the organization, information about protected resources or digital services 1914 associated with the organization, and also bulk upload information about all their associated users (e.g., all their employees) to the authentication server 1922. In some embodiments, the organization's human resource management (HRM) system 1920 may bulk upload this information about all the associated users to the authentication server 1922. The authentication server 1922 may ingest this information, add additional information (e.g., generate associated identifiers), and store the information into one or more databases.

For instance, in some embodiments, for an organization, the authentication server 1922 may save an organization code (e.g., a unique identifier for the organization), organization details (e.g., name, logo, welcome text, etc.), a primary attribute (e.g., an attribute that is considered not empty and unique for every user in this organization, which will serve as the primary key), a primary email (e.g., a unique or empty field; usable in a query by email address to locate a user when the user signs up or adds an organization from mobile), and/or unique attributes (e.g., one or more additional user attributes that is unique to every user in this org). The unique attributes may be optional and serve to facilitate searching for users by any of those attributes.

In some embodiments, for the protected resources or digital services 1914 (e.g., applications) associated with the organization, the authentication server 1922 may save an application name, an organization code (to link the entry to an organization) a disabled status (e.g., a timestamp), an integration type (e.g., SAML, OIDC, IVR, etc.), an integration ID (e.g., a unique ID which is the primary identifier for the particular integration type), SAML metadata (applicable if the integration type is SAML), OIDC metadata (applicable if the integration type is OIDC), a primary attribute (the attribute with a value for the user that is returned on a successful login for this application, e.g.—in a SAML flow, value of this attribute for the logged-in user is what will be returned as NameId in the authentication response), and/or any additional attributes. The additional attributes may be optional and have values for a user that are returned on a successful login for this application (e.g., in a SAML flow, values for these attributes are what will be returned as attributes in the authentication response).

In some embodiments, for the users associated with the organization (e.g., employees of a company), the authentication server 1922 may save—for each user—a primary attribute (defined for the organization, which will serve as the primary key), a primary email, each of the unique attributes defined for the organization, an end user ID (e.g., SUID), a disabled status (e.g., a timestamp), an activation code (along with timestamps of when the activation code was sent or when activation was completed), and/or other attributes which could be repeating or multi-valued (e.g., any user attributes besides those defined as primary or unique).

All of this information may be stored in various ways and across one or more databases. In some embodiments, the data for an organization may be stored as a row in a universal org table (e.g., one table that stores the organization codes for all the organizations). In some embodiments, the data for a protected resource or application may be stored as a row in a universal application table (e.g., one table that stores all the application information for all the organizations). In some embodiments, the data for all the users of an organization may be stored as rows in an org-specific user table (e.g., a table that stores data for only the users of a particular organization).

Thus, it can be understood that the authentication server 1922 may keep a repository of all the users of the organization that is populated when the organization onboards to the authentication service. Afterwards, for any user management (e.g., an employee joins/resigns), the organization may be able to interact with the authentication server 1922 in order to add, delete, and manage users.

For example, if user 1902 joins an organization and is onboarded, some information for the user 1902 will be provided to the authentication server 1922 to be added to an org-specific user table. For instance, the organization's human resource management (HRM) system 1940 may— automatically or on-request (e.g., by an administrator)— provide that information to the authentication server 1922, or an administrator could enter the user's information into an authentication portal 1924 (e.g., a web-based application) provided by the authentication server 1922, and so forth. The authentication server 1922 may generate a one-time activation code 1930 for the user 1902. In some embodiments, the authentication server 1922 may save the activation code 1930 with a user's email (e.g., the email assigned to them by the organization), along with any other identifiers associated with the user 1920 (e.g., username, LDAP user ID, etc.).

At circle 1, the authentication server 1922 may transmit the generated one-time activation code 1930 to the user 1902, with the activation code 1930 intended to be entered on the user's mobile device 1904. The authentication server 1922 may provide the activation code 1930 to the user 1902 in various ways, such as by sending it to the user 1902 (e.g., via an email that also informs the user 1904 to download and install an authentication application 1906 on their mobile device 1904 in order to register). The user 1902 may download and install the authentication application 1906 on their mobile device 1904 (e.g., such as by opening the email on their mobile device 1904 and clicking the link).

At circle 2, once installed and executed, the authentication application 1906 may have a new registration option or immediately launch the new registration workflow. The authentication application 1906 may collect certain information useful in the registration and/or authentication workflow (e.g., by prompting the user 1902 to provide that information). The authentication application 1906 may save some or all of this information to the device storage 1932 of the mobile device 1904. For example, the authentication application 1906 may prompt the user 1902 to provide the user's name 1938, the user's email address 1940, the mobile number 1942 associated with the mobile device 1904, the activation code 1930, and a secret gesture 1944. For the email address 1940, the user 1902 may supply their company/organization email address. The secret gesture 1944 may be a unique identifier (e.g., a 6—digit pin number) or any other unique set of features associated with the user 1902, including biometric identifiers such as a fingerprint or facial features. The gesture 1944 may be used to allow the user to unlock and access the authentication application 1906, for user validation purposes, to unlock some key information saved by the authentication application 1906, and so forth. In some embodiments, the authentication application 1906 may perform input field validations for the information provided by the user (e.g., on the email and mobile number fields, to make sure that the provided email and mobile number are valid).

The authentication application 1906 may also generate a private key 1934 and public key 1936 pair for the mobile device 1904 using a suitable asymmetric, public-key cryptography algorithm, such as RSA. The authentication application 1906 may save the public key 1936 and private key 1934 in the device storage 1932 of the mobile device 1904. In some embodiments, the keys may be generated and stored in accordance with Fast Identity Online (FIDO) specifications via hardware or software. For example, information such as the public key 1934 and private key 1932 pair can be stored in a trusted platform module (TPM), which is a piece of hardware (e.g., an embedded security chip) that can store sensitive information and is resilient against physical tampering. Or, as another example, the authentication application 1906 can lock the sensitive information behind a gesture or biometric, such as gesture 1944. Thus, the authentication application 1906 can leverage hardware and security modules that already exist on the user's mobile device, such as facial recognition and fingerprint scanners, in order to protect sensitive information in a secure and convenient manner. In some embodiments, the private key 1934 and public key 1936 pair may even be generated based on the gesture 1944.

Thus, the private key 1934 in particular may be hidden on the mobile device 1904 and protected (e.g., behind a gesture). It never leaves the mobile device 1904 and never gets sent to the authentication server 1922. The public key 1936 can be shared with the authentication server 1922. All the messages sent from the mobile device 1904 to the authentication server 1922 can be signed using the private key 1934, and the authentication server 1922 can use the public key 1936 to validate the signature and authenticate the mobile device 1904.

In some embodiments, the authentication application 1906 can also save a registration step 1946 in the device storage 1932 of the mobile device 1904. The registration step 1946 may indicate the step of registration that the device is at (e.g., so that an interrupted registration can be resumed at the proper place). In some embodiments, the registration step 1946 is saved as an integer value that corresponds to a step in the registration process. For example, if the registration step 1946 is absent, that may indicate that the user is launching the application 1906 for first time or never got anywhere with registration; if the registration step 1946 is 0, that may indicate that the user never validated the activation code 1930 and the server purged any information for the account in cleanup (e.g., the SUID 1952 does not exist on the server), but the mobile device 1904 will already have certain user details saved locally that can be used to pre-populate any registration fields; if the registration step 1946 is 1, that may indicate that a one-time password 1958 was issued but never validated, but the user account exists on the server (e.g., the SUID 1952 exists); if the registration step 1946 is 2, that may indicate that the one-time password 1958 was validated but the registration is not complete for some reason (e.g., certain information prompts have not been answered); if the registration step 1946 is 3, that may indicate that the user is registered successfully, and so forth.

In some embodiments, the authentication application 1906 can also save into the device storage 1932 any additional information that will be provided by the authentication server 1922 (e.g., in various responses from the server). This information may include a list of organizations 1948, a list of devices 1950, an end user ID (e.g., SUID) 1952, a device ID (e.g., ZID) 1954, and/or a server public key 1956. The organizations 1948 may be a list of organizations/companies associated with the user 1902 (each organization may be represented by a name, unique identifier, and/or date added—e.g., Lowes, LOW, Aug. 1, 2013 5.40 pm). The devices 1950 may be a list of devices associated with the user 1902, Including the mobile device 1904 once it is registered (each device may be represented by a name, unique identifier, and/or date added—e.g., iPhone 14, ip1234, Aug. 1, 2013 5.40 pm). The end user ID 1952 may be a unique identifier representing a specific user 1902, which can be generated and issued by the authentication server 1922. The device ID 1954 may be a unique identifier representing a specific mobile device 1904, which can be generated and issued by the authentication server 1922. The server public key 1956 may be a public key for the authentication server 1922 generated for use with any suitable public-key cryptography algorithm, and it may be used to validate messages sent from the authentication server 1922. It should be noted that this set of additional information may not be available when the authentication application 1906 is first installed and executed, but they are shown in the device storage 1932 of FIG. 19B in order to facilitate understanding. The authentication application 1906 may save that information as it is received from the authentication application 1906 in various workflows.

In some embodiments, some or all communications from the authentication application 1906 to the authentication server 1922 may include a payload. In some of such embodiments, some or all communications from the authentication application 1906 to the authentication server 1922 may be via calls to a REST API and may include a JSON payload. In some embodiments, some or all communications from the authentication server 1922 to the authentication application 1906 may include a JSON payload.

For instance, at circle 3, the authentication application 1906 may send a payload to the authentication server 1922. The payload may include any of the information entered by the user 1902 at an earlier step, including the user's name 1938, the use"'s email address 1940, the mobile number 1942 associated with the mobile device 1904, and/or the activation code 1930. The payload may also include the public key 1936, which can be saved and used by the authentication server 1922 to authenticate digital signatures of future communications from the mobile device 1904. The authentication server 1922 may proceed to validate the contents of the payload. For example, the authentication server 1922 may check that the activation code 1930 and/or the email 1940 in the payload are correct (e.g., they match an existing activation code and/or existing email that the server has on file).

In some embodiments, if the validation is successful, the authentication server 1922 may generate an end user ID (e.g., SUID) 1952, which can be a unique identifier that represents the particular user 1902. In some embodiments, the end user ID 1952 may include the form ([FIRST_NAME]—[LAST_NAME]—[ORG_NAME]). For the user 1902, the authentication server 1922 may save the end user ID 1952 along with any relevant information in the payload, including the public key 1936. Thus, the authentication server 1922 will be able to use the end user ID 1952 to look up and retrieve the public key 1936 that is associated with the mobile device 1904 of the user 1902.

At circle 4, the authentication server 1922 may send a response to the authentication application 1906. In some embodiments, the response may be in JSON format. The response may contain an indication of whether the registration was successful (e.g., true/false). If the registration was successful (e.g., the activation code 1930 is correct), the response may also contain the end user ID 1952 along with details for organizations 1948 that are associated with the user. For example, for a particular organization associated with the user, there could be an organization name (e.g., Lowes), an organization id or unique identifier (e.g., LOW), an organization add date (e.g., Aug. 1, 2013 5.40 pm), and so forth. The authentication application 1906 may save this information to the device storage 1932 of the mobile device 1904. In some embodiments, the authentication application 1906 may also save a timestamp associated with the response, which can be used as a timestamp for the one-time password 1958 and determining whether an expiration/timeout has elapsed.

The authentication server 1922 may also generate and send a one-time password 1958 to the mobile device 1904. In some embodiments, the one-time password 1958 may be sent in the same response that contains the indication of whether the registration was successful. In other embodiments, the one-time password 1958 may be sent out-of-band (e.g., via SMS to the mobile number associated with the mobile device 1904), so that the one-time password 1958 can be input into the authentication application 1906. In some embodiments, the authentication server 1922 may temporarily keep the generated one-time password 1958 on file for the user 1902, such the one-time password 1958 can be looked up and retrieved based using the end user ID (SUID) 1952.

The authentication application 1906 may notify the user 1902 that the one-time password 1958 has been sent to the mobile device and prompt them to enter the one-time password 1958. In some embodiments, the one-time password 1958 may have an expiration/timeout (e.g., 5 minutes from a timestamp of when the one-time password was issued), and the authentication application 1906 may have an option to request that a new one-time password be generated and sent if the user 1902 does not enter the one-time password 1958 within the expiration/timeout.

If the user 1902 successfully enters the one-time password 1958, then at circle 5, the authentication application 1906 may send a payload to the authentication server 1922 that contains the end user ID 1952 and the entered one-time password 1958. Some or all of the information in the payload may be digitally signed with the private key 1934 of the mobile device 1904, resulting in a cryptographic digital signature 1960 that can also be included in the payload. In the illustrated embodiment of FIG. 19B, the payload includes the end user ID 1952, the one-time password 1958, and a signature 1960. The signature 1960 may be a result of signing a message of the end user ID 1952 and/or the one-time password 1958 with the private key 1934. For example, in some embodiments, the authentication application 1906 may sign both the end user ID 1952 and/or the one-time password 1958 (e.g., a concatenation of the end user ID 1952 and the one-time password 1958) with the private key 1934. It should be noted that at this point onwards, any communication or request made by the authentication application 1906 to the authentication server 1922 (including this one) may be signed with the private key 1934.

Upon receiving the payload, the authentication server 1922 may proceed to authenticate the signature 1960 and the contents of the payload. For example, the authentication server 1922 may use the end user ID 1952 in the payload to look up and retrieve the public key 1936 that was saved and associated with the end user ID 1952 (by the authentication server 1922). Since the public key 1936 corresponds to the private key 1934 that was used to generate the signature 1960, it can be used to authenticate the signature 1960. The authentication server 1922 may also determine if the one-time password 1958 in the payload is valid (e.g., that it matches the one-time password that was generated at circle 4). For example, the authentication server 1922 may also use the end user ID 1952 in the payload to look up and retrieve the one-time password 1958 that it has on file and compare it to the one-time password 1958 in the payload.

In some embodiments, if the authentication is successful, the authentication server 1922 may generate a device ID (e.g., ZID) 1954, which can be a unique identifier that represents the particular mobile device 1904. The authentication server 1922 may save this device ID 1954 along with the public key 1936 under the end user ID 1952. Thus, for a particular user and end user ID 1952, there may be numerous devices that are registered and associated with that user, and the authentication server 1922 may be able to keep track of those various devices and the corresponding device ID and public key for each device.

At circle 6, the authentication server 1922 may then send a response back to the authentication application 1906. In some embodiments, the response may be in JSON format. The response may contain an indication of a status associated with the validation of the one-time password 1958 submitted in the payload. For example, the OTP status may have: an integer value of 0 representing a successful validation; an integer value of 1 representing that the submitted one-time password 1958 did not match the password on file; an integer value of 2 representing that no one-time password exists on file for the user; an integer value of 3 representing that no user exists for the submitted end user ID 1952; and so forth. The response may also include a list of devices 1950, which provide details of existing devices (e.g., friendly names) that are already registered and associated with the end user ID 1952 or mobile number 1942.

If the validation of the submitted one-time password 1958 was successful, the response may also contain the generated device ID (e.g., ZID) 1954, a name of the organization associated with the user 1902 that registration just occurred for, and/or a server public key 1956 associated with the authentication server 1922. The authentication application 1906 may save this information to the device storage 1932 of the mobile device 1904. In some embodiments, the server public key 1956 may be used to authenticate messages from the authentication server 1922.

Figure 20A:
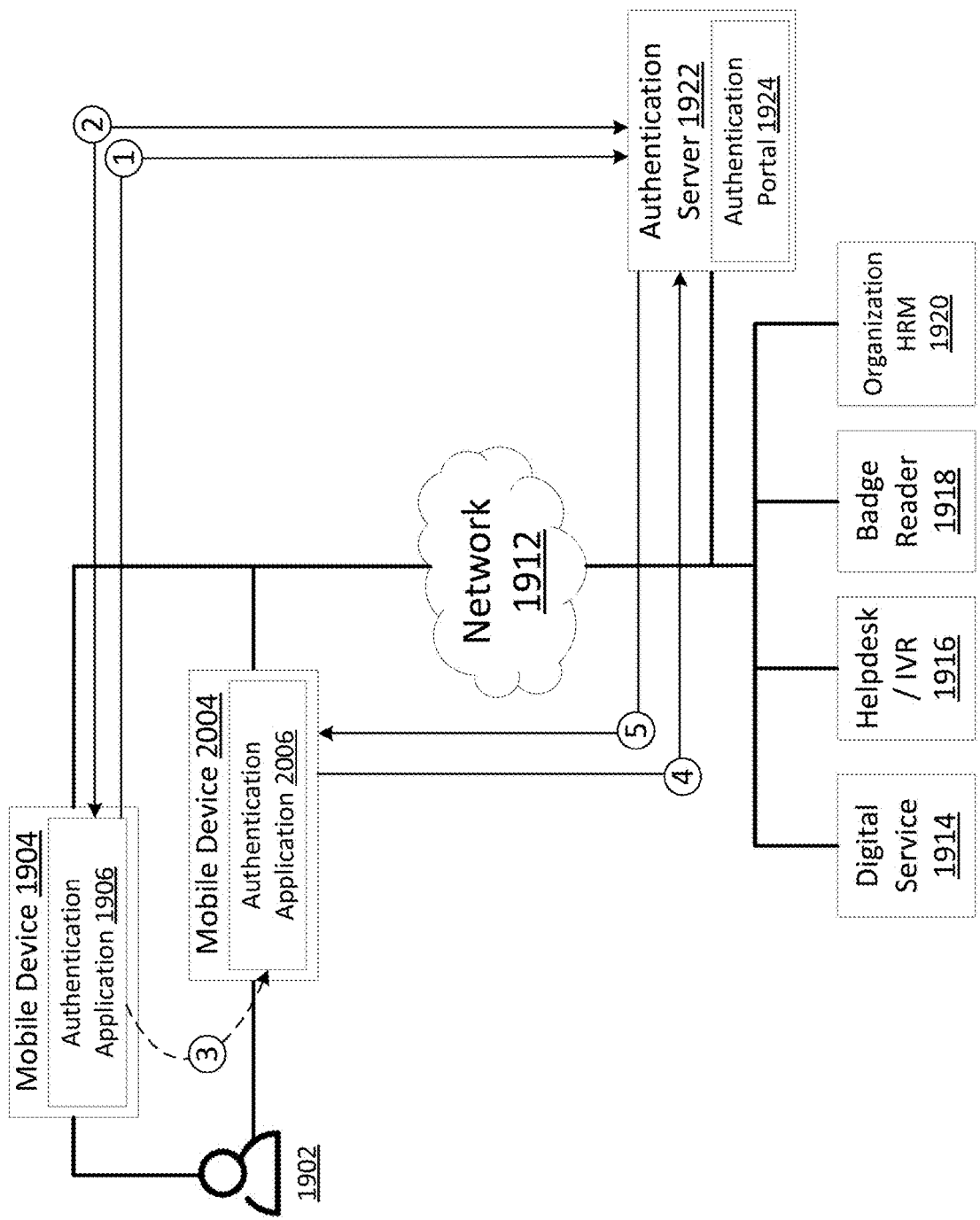
FIGS. 20A-20B are hybrid system diagrams illustrating a workflow associated with registering a new device to an existing user profile, in accordance with embodiments of the present application.
Figure 20B:
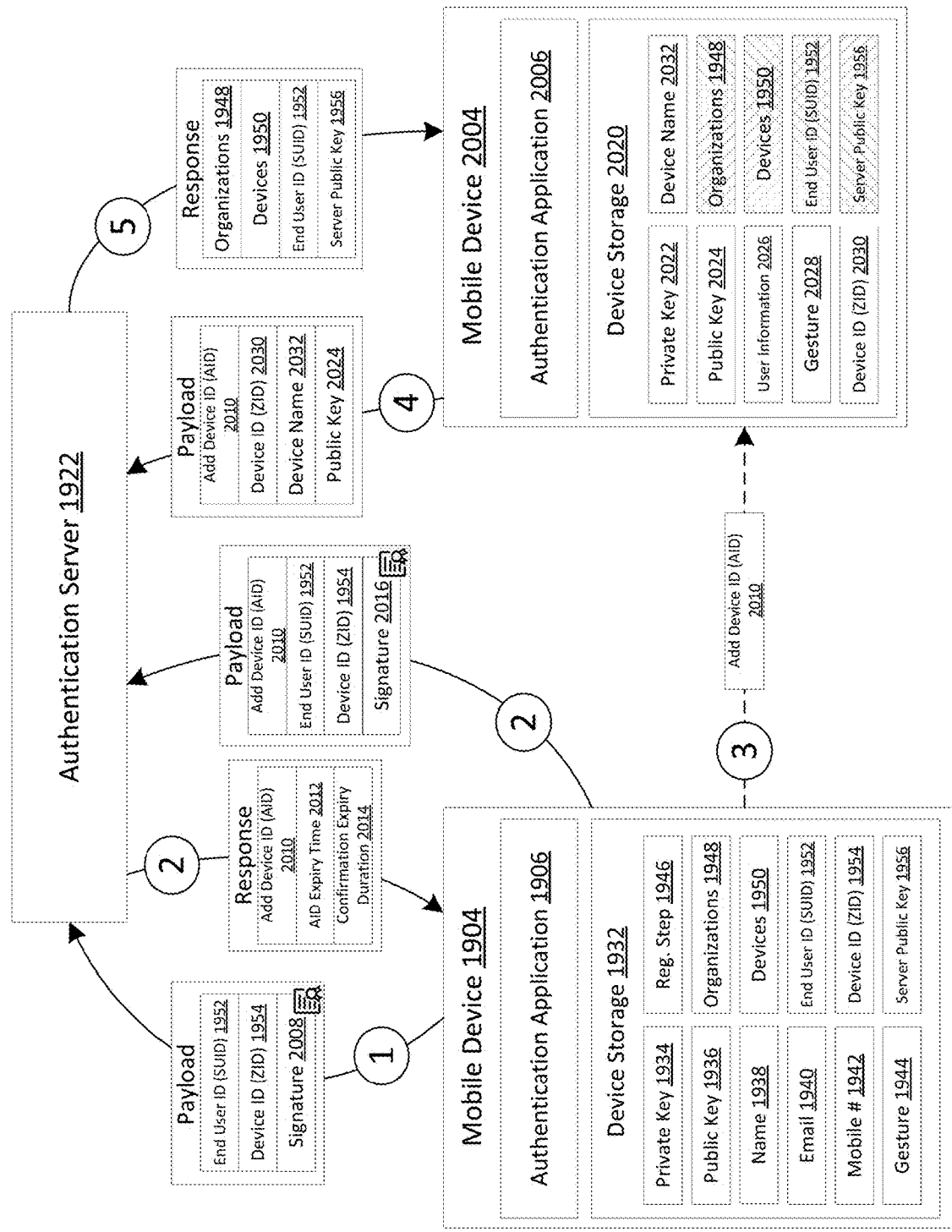

At this point, mobile registration is complete. In every future communication from the mobile device 1904 to the authentication server 1922, the end user ID (SUID) 1952 and the device ID (ZID) 1954 may be a required inclusion along with a signature using the private key 1934. The SUID 1952 serves as an ID for the user 1902 and the ZID 1954 serves as a device ID for the mobile device 1904, which are now tied together (e.g., the mobile device 1904 is owned by the user 1902, who has been verified based on data supplied by the organization and from the issued activation code 1930). If the user 1902 adds more mobile devices in future, those devices will receive new ZIDs and they all will be tied to the same SUID 1952 for the user 1902. FIGS. 20A-20B further illustrate and describe this process. Also, since the user 1902 is tied to the mobile device 1904, the authentication server 1922 can identify any messages or requests coming from the mobile device 1904 with the public key 1936, allowing for many use cases—including user authentication and single sign-on. FIGS. 21A-21F further illustrate and describe this use case.

FIG. 20A is a hybrid system diagram illustrating a workflow associated with registering a new device to an existing user profile, in accordance with embodiments of the present application. FIG. 20B illustrates how information may be saved and transmitted at various points in the workflow illustrated in FIG. 20A. More specifically, it illustrates in greater detail how information may be transmitted between the authentication server 1922, a registered mobile device 1904, and a mobile device 2004 to-be-registered. FIGS. 20A & 20B are described in conjunction below.

In the case that the user 1902 has already registered mobile device 1904 (e.g., via the workflow described in FIGS. 19A-19B), they can leverage that existing registration to register an additional mobile device 2004 with the authentication server 1922. The user 1902 may install authentication application 2006 on the mobile device 2004. There may be an option in the authentication application 2006 to add a new device for an existing user. Selecting this option may prompt the user 1902 to go to their already registered device in order to add a new device. The user 1902 may go to the authentication application 1906 on their already registered mobile device 1904 and all select an option to add a new device.

At circle 1, the authentication application 1906 may send a request to the authentication server 1922 for adding a new device, and the request may include the device ID (ZID) 1954 associated with the mobile device 1904, the end user ID (SUID) 1952 associated with the user 1902, and a signature 2008 based on the private key 1934 (e.g., from signing the ZID 1954 and/or SUID 1952). In some embodiments, the authentication application 1906 may make a REST API call to the authentication server 1922 to send the request.

The authentication server 1922 will authenticate the signature 2008 (e.g., based on the public key 1936 that it has on file for the end user ID 1952) and also validate the device ID 1954 and the end user ID 1952. If valid, the authentication server 1922 may generate an add device ID (e.g., AID) 2010, which can be a unique identifier (e.g., a 6—digit alphanumeric code) used specifically for adding a new device to an existing user. The authentication server 1922 may also determine an AID expiry time 2012 and a confirmation expiry duration 2014. In some embodiments, the AID expiry time 2012 may correspond to an absolute expiry time for the AID 2010 (and/or the QR code that may be generated based on the AID 2010). In some embodiments, the confirmation expiry duration 2014 may correspond to an expiry duration (not absolute time) of a confirmation prompt event that will occur on the mobile device 1904 and/or the mobile device 2004.

The authentication server 1922 may store the AID 2010, the AID expiry time 2012, the ZID 1954, and/or the SUID 1952 in a database, cache, or data store. Thus, the AID 2010 and the AID expiry time 2012 can be looked up and retrieved (e.g., for validation purposes) based on the ZID 1954 and/or the SUID 1952.

At circle 2, the authentication server 1922 may send a response back to the authentication application 1906. This response may include the generated AID 2010, the expiry time of the AID 2012, and/or an expiry duration of confirmation 2014. In some embodiments, upon receiving this response from the authentication server 1922, the authentication application 1906 may send a request to establish a connection with the authentication server 1922 (e.g., a request to establish a new WebSocket connection). The request may contain the AID 2010 (passed back to the server), the SUID 1952, the ZID 1954, and a signature 2016 based on the private key 1934 (e.g., from signing the AID 2010, the SUID 1952, and/or the ZID 1954).

The authentication server 1922 can authenticate the signature 2016 using the public key 1936 that it has saved and also validate the AID 2010, the SUID 1952, and/or the ZID 1954. If the information in the payload is not valid (e.g., the signature 2016 is wrong, the AID 2010 does not match the AID that the server has on file for the user, etc.), then the connection request can be rejected. Otherwise, if the information in the payload is valid and the AID 2010 in the request matches, the authentication server 1922 may accept the connection request. In some embodiments, the authentication server 1922 may accept the WebSocket connection request and also save a WebSocket connection identifier that can be used to uniquely identify the WebSocket connection established between the authentication server 1922 and the mobile device 1904 (e.g., by associating the WebSocket connection identifier with the AID 2010, the AID expiry time 2012, the ZID 1954, and/or the SUID 1952 in a database, cache, or data store).

Once the connection request is accepted, then at circle 3, the authentication application 1906 may cause the AID 2010 to be displayed on the display of the mobile device 1904 so that the user 1902 can enter the AID 2010 into the authentication application 2006 on mobile device 2004. Alternatively, the mobile device 1904 can display a QR code that may be generated based on the AID 2010, the AID expiry time 2012, and/or the confirmation expiry duration 2014. For instance, the QR code may encode the AID 2010, the AID expiry time 2012, and/or the confirmation expiry duration 2014. The camera of the mobile device 2004 can then be used to scan the QR code within the authentication application 2006, which will provide the encoded information to the authentication application 2006 without the user 1902 having to manually enter it. and may be associated with a timer with expiry set to the expiry time of the AID.

After the user 1902 inputs the AID 2010 or scans a QR code encoding the AID 2010 via the authentication application 2006 on the mobile device 2004, the authentication application 2006 may collect and save a set of information within the device storage 2020 of the mobile device 2004. Some of this information may include user information 2026, which can be similar to the information collected about the user 1902 through prompts in the initial registration process shown in FIGS. 19A-19B, such as the user's name, the user's email address, the mobile number associated with the mobile device 2004, and so forth. The authentication application 2006 may also save a secret gesture 2028 that will allow the user to unlock and access the authentication application 2006, unlock some key information saved by the authentication application 2006, and so forth. As with the initial registration process, the authentication application 2006 may also generate a private key 2022 and a public key 2024 pair for the mobile device 2004 using a suitable asymmetric, public-key cryptography algorithm, such as RSA. The authentication application 2006 may save the private key 2022 and the public key 2024 in the device storage 2020 of the mobile device 2004. The authentication application 2006 may also generate a new device ID (e.g., ZID) 2030 that represents the mobile device 2004. The authentication application 2006 may also collect (e.g., via a prompt) or generate a device name 2032 (e.g., a friendly device name) associated with the mobile device 2004. The authentication application 2006 may save all this information within the device storage 2020 of the mobile device 2004.

At circle 4, the authentication application 2006 may send a request to establish a connection with the authentication server 1922. In some embodiments, the authentication application 2006 may send a request for a new WebSocket connection. The request may contain the add device ID (e.g., AID) 2010 that was scanned or input on the mobile device 2004, the device ID (ZID) 2030 of mobile device 2004, the public key 2024 generated for the mobile device 2004, and/or the device name 2032.

The authentication server 1922 may verify the AID 2010 in the request (e.g., by checking that it exists in the database, cache, data store, etc.) and accept the connection request if the AID 2010 is valid. In some embodiments, the authentication server 1922 may save the information provided in the request, such as the ZID 2030, the public key 2024, and/or the device name 2032, in a database, cache, or data store. For example, the authentication server 1922 may use the AID 2010 to look up the SUID 1952 that the AID 2010 was generated for, and the ZID 2030, the public key 2024, and/or the device name 2032 may be saved as another device associated with the SUID 1952.

In some embodiments, the authentication server 1922 may accept a WebSocket connection request from the mobile device 2004. The authentication server 1922 may save a WebSocket connection identifier that can be used to uniquely identify the WebSocket connection established between the authentication server 1922 and the mobile device 2004 (e.g., by associating and saving the WebSocket connection identifier with the ZID 2030, device name 2032, and/or the public key 2024).

In some embodiments, registration of the new device may be completed at this point, and at circle 5, the authentication server 1922 may send back a response to the mobile device 2004 that contains the list of organizations 1948 associated with the user, the list of devices 1950 associated with the user, the SUID 1952 for the user 1902, and/or the server public key 1956. This information can be saved in the device storage 2020 of the mobile device 2004 and used in future authentication workflows.

In other embodiments, one or more confirmation prompts may need to be pushed onto the mobile device 2004 and/or the mobile device 1904 (e.g., via the open connections) before circle 5 and the registration of the new device is completed. For instance, the authentication server 1922 may send a message to the mobile device 2004 (e.g., through the open WebSocket connection) that indicates the new device successfully connected with the authentication server 1922, along with a confirmation prompt indicator and new expiry time (e.g., expiry time of confirmation). Accordingly, the authentication application 2006 may cause the mobile device 2004 to display a confirmation prompt message, such as "Please confirm addition of new device prompt on your existing device" and start an expiry timer based on the expiry time of confirmation parameter. And if no success or failure message is received by the authentication server 1922 within this time, the user 1902 may be informed that device addition failed and be taken back to the add device screen on the authentication application 2006 (e.g., to re-attempt the new device registration workflow). The authentication server 1922 may also push a confirmation prompt indicator and expiry time of confirmation to the mobile device 1904 through the open connection, and the authentication application 1906 may cause the mobile device 1904 to display a confirmation prompt, such as "Are you trying to add a new device?" and start an expiry timer based on the expiry time of confirmation parameter. If the user 1902 does not answer within the expiry time, the user may be taken back to the add device screen on the authentication application 1906.

The mobile device 1904 may communicate the results of the confirmation prompt to the authentication server 1922 (e.g., via the open WebSocket connection). In some embodiments, whenever the confirmation prompt fails (e.g., if the user does not answer within the expiry time or the user indicates that they are not trying to add a new device), the authentication server 1922 may drop both connections to mobile device 1904 and mobile device 2004 and delete the stored AID 2010 and any other information received from the mobile device 2004.

Otherwise, if the user 1902 successfully answers the confirmation prompt on the mobile device 1904 (e.g., the user indicates within the allotted time that they are trying to add a new device), then the authentication server 1922 may send a success message to both the mobile device 1904 and the mobile device 2004 via the open connections. In some embodiments, at circle 5, the message sent to the mobile device 2004 may contain the list of organizations 1948 associated with the user, the list of devices 1950 associated with the user, the SUID 1952 for the user 1902, and/or the server public key 1956. This information can be saved in the device storage 2020 of the mobile device 2004 and used in future authentication workflows. The authentication server 1922 may close both open connections (e.g., close the WebSockets connections after sending the success messages) and make sure to save any relevant information, such as the ZID 2030, the device name 2032, and the public key 2024 of mobile device 2004 (e.g., as a new device row for the user 1902 with the SUID 1952). At this point, registration of the new mobile device 2004 may be completed.

Figure 21A:
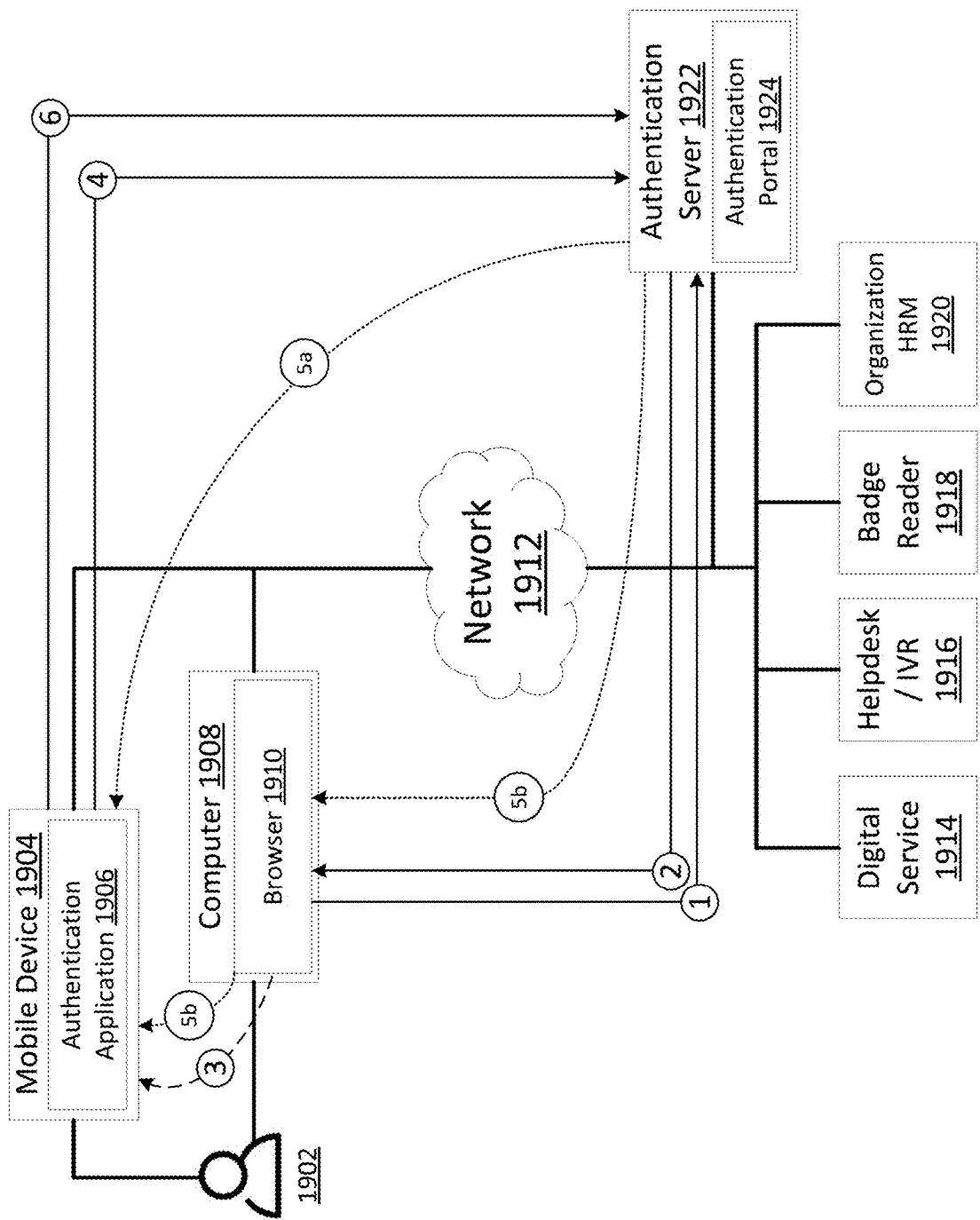
FIGS. 21A-21B are hybrid system diagrams illustrating an authentication workflow associated with logging in on a browser, in accordance with embodiments of the present application.
Figure 21B:
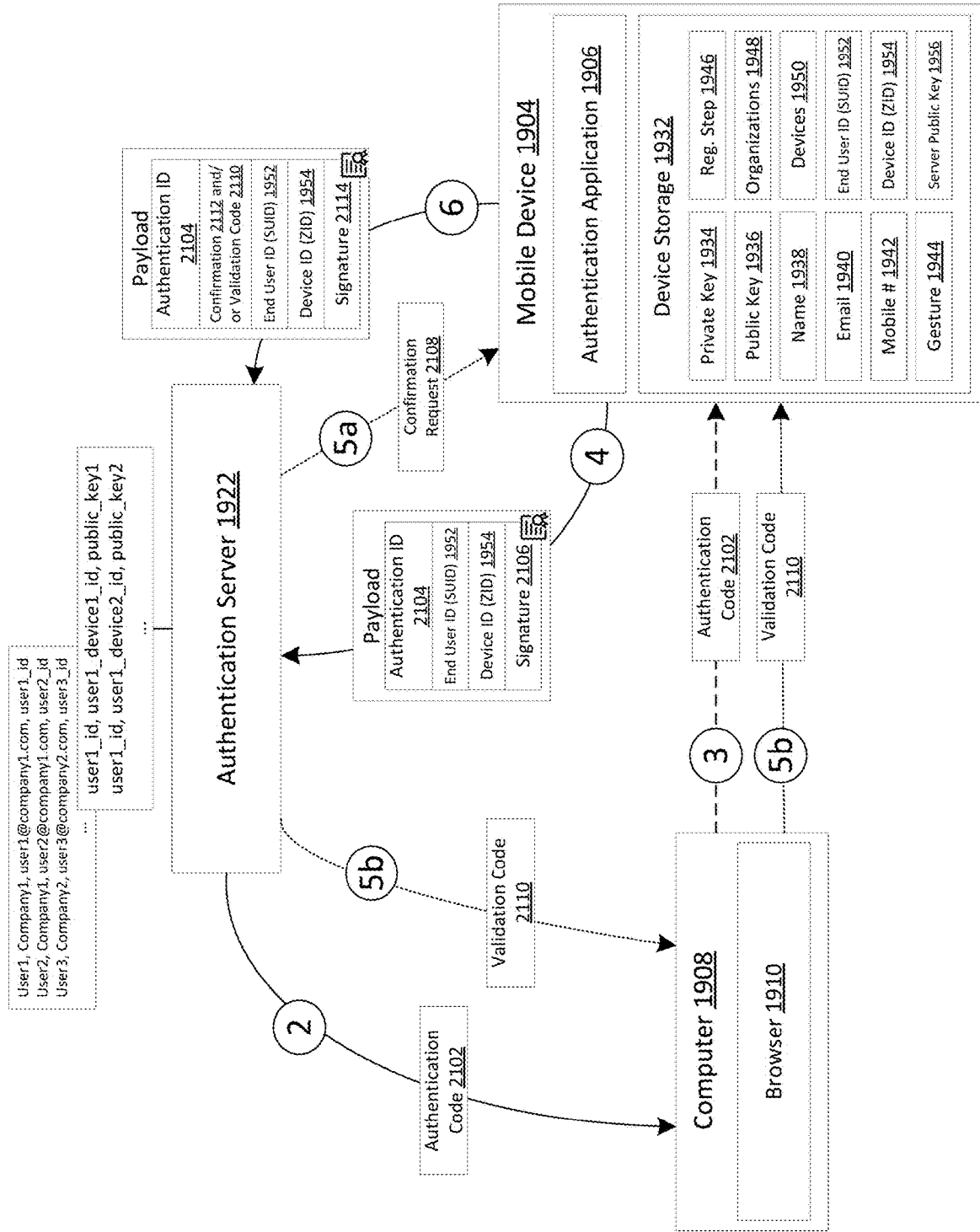
Figure 21C:
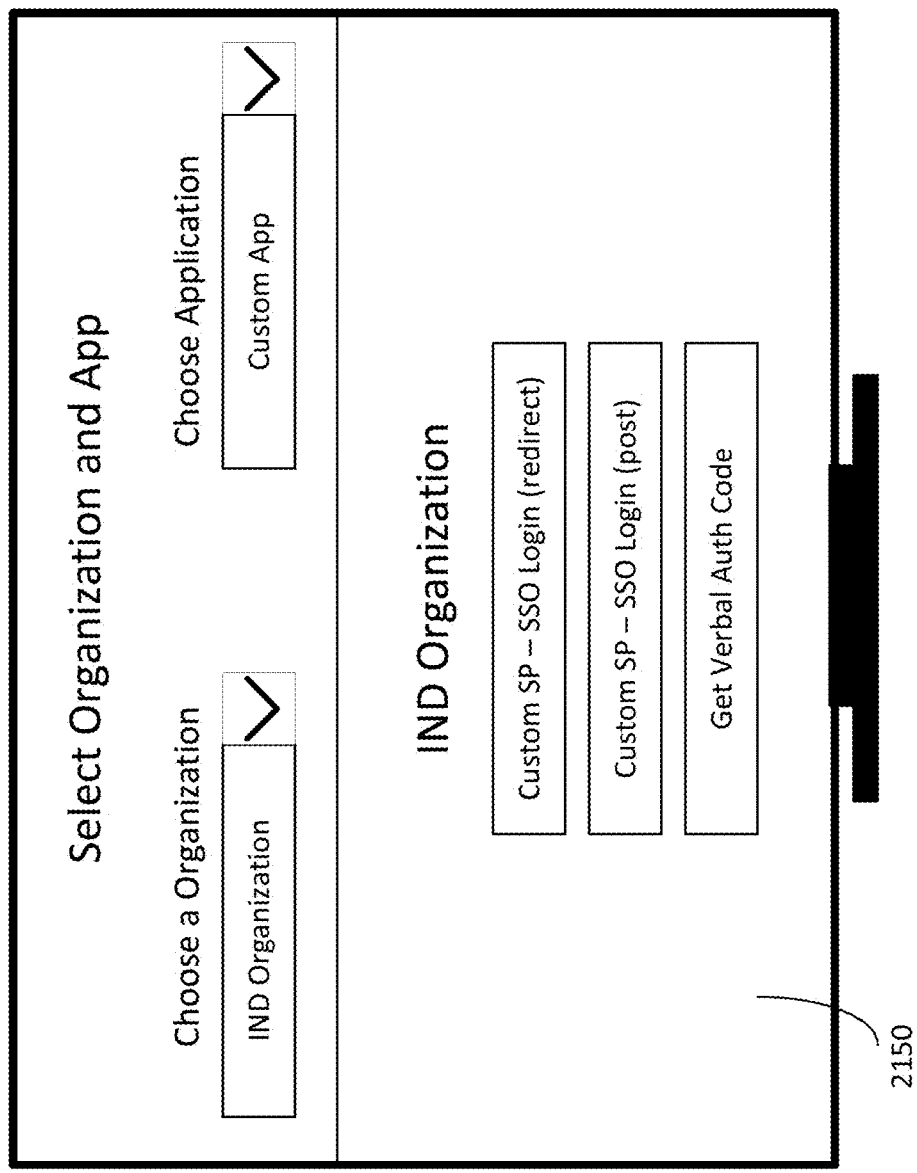
FIGS. 21C-21E illustrate various example graphical user interfaces associated with the authentication workflow discussed in FIGS. 21A-21B, in accordance with embodiments of the present application.
Figure 21D:
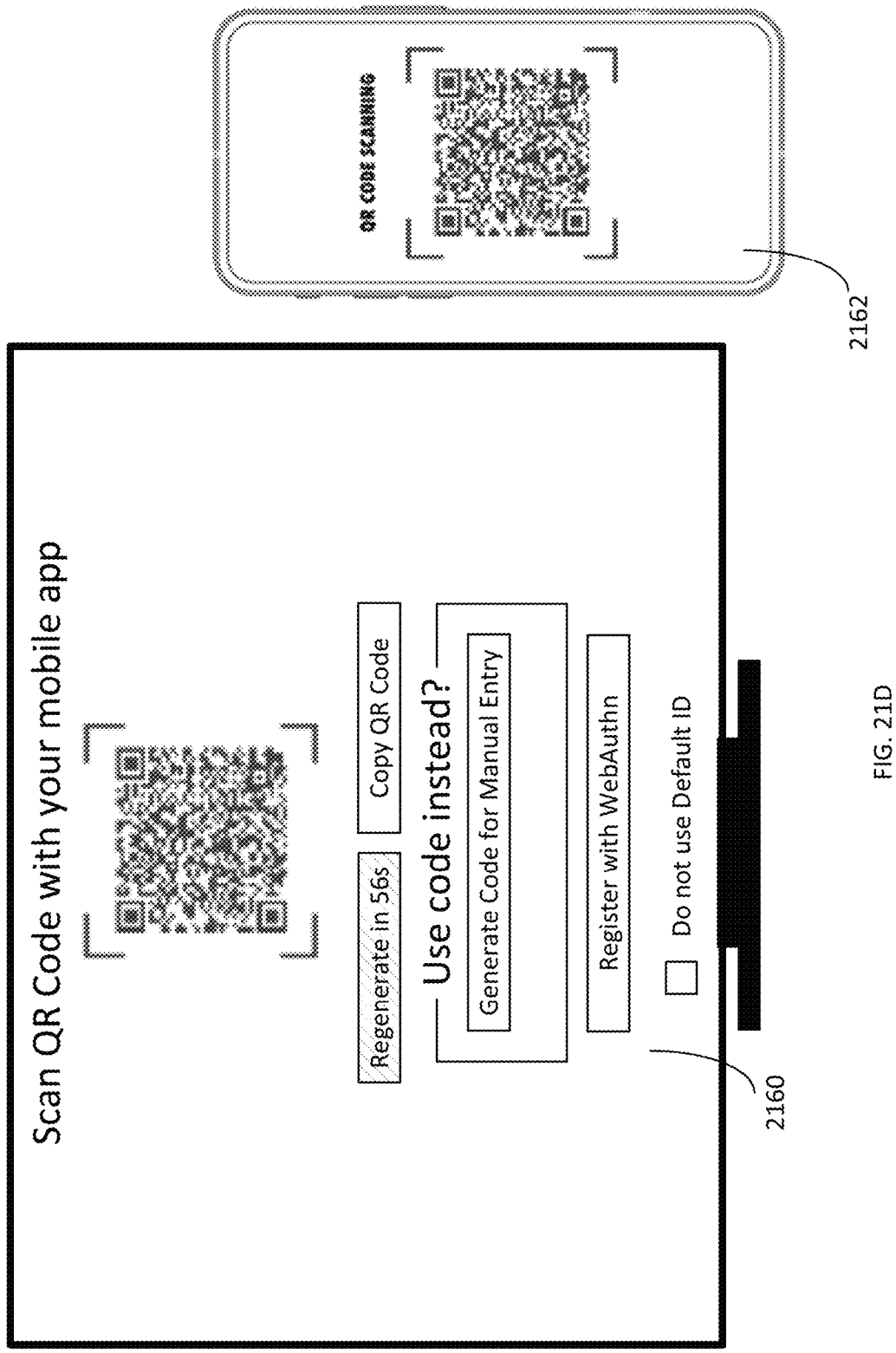
Figure 21E:
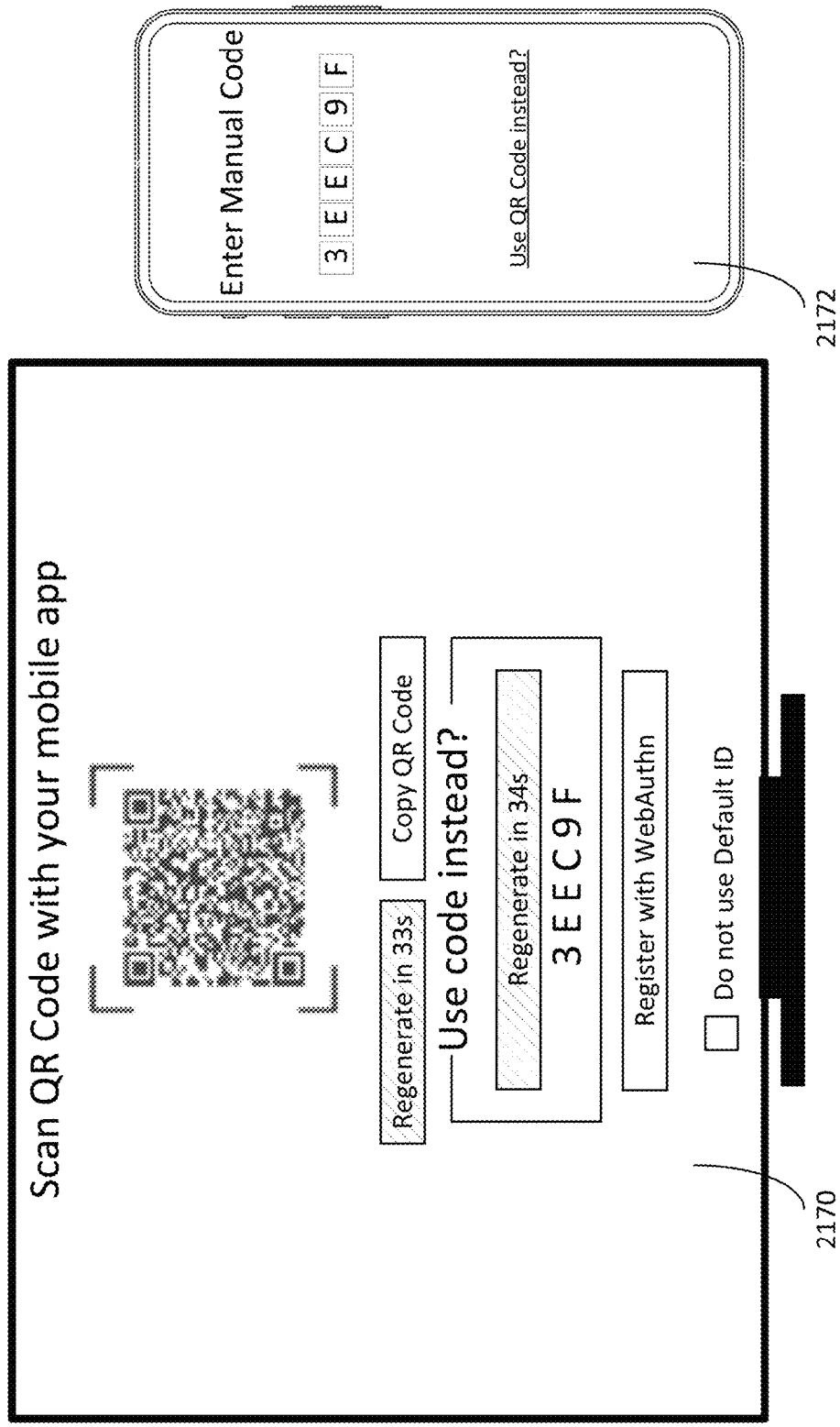

FIG. 21A is a hybrid system diagram illustrating an authentication workflow associated with logging in on a browser, in accordance with embodiments of the present application. FIG. 21B illustrates how information may be saved and transmitted at various points in the workflow illustrated in FIG. 21A. FIGS. 21A & 21B are described in conjunction below.

At circle 1, a user 1902 seeking to access a protected resource associated with their organization, such as a digital service 1914 or its corresponding website, may access the authentication portal 1924, such as via the browser 1910 on the computer 1908. The authentication portal 1924 may be a web-based application associated with the authentication server 1922. The user 1902 may be able to make selections in a user interface of the authentication portal 1924 and select their company/organization and the resource or application that they are trying to access (e.g., Workday). An example of such a login interface is shown by the interface 2150 in FIG. 21C, which has dropdown menus for the user to select their organization and the application (e.g., digital service 1914) that they are attempting to access.

Turning back to FIGS. 21A & 21B, once the user 1902 makes a selection, the browser 1910 may send this information to the authentication server 1922 in an authentication request. In some embodiments, the browser 1910 may send a request to establish a WebSocket connection with the authentication server 1922. Alternatively, the user 1902 may be attempting to access the protected resource directly, and the protected resource may be configured to redirect to the authentication portal 1924 to begin the login process at circle 2. In some embodiments, the user 1902 may be able to select a login approach at this step (e.g., display a QR code or generate a manually entered code, such as DynamicID).

At circle 2, the authentication server 1922 may generate an authentication ID 2104, which may be a unique identifier that is generated for, and associated with, this particular authentication session or login attempt by the user 1902. In some embodiments, the authentication server 1922 may save the generated authentication ID 2104 in temporary storage (e.g., an in-memory data store) or store it temporarily (e.g., remove after a timeout duration of 1 minute). The authentication server 1922 may also generate a challenge or an authentication code 2102, which is a unique, temporary code that is intended to be provided to the user 1902 during the various authentication workflows described herein. In some cases, the authentication code 2102 may actually be the authentication ID 2104 (in such instances, it may also be referred to as a DynamicID or DID), such as if the authentication code 2102 is a string of alphanumeric characters. In such cases, separately generating an authentication code 2102 may not be required.

In other cases, the authentication code 2102 may be generated based on, and associated with, the authentication ID 2104. For instance, the authentication ID 2104 may be a string of alphanumeric characters and the authentication code 2102 can be an image of those alphanumeric characters (e.g., a CAPTCHA image). Furthermore, the authentication code 2102 may also encode a set of information, which can include the authentication ID 2104. For example, the authentication code 2102 may be a QR code that encodes a set of information, including the authentication ID 2104 (which in this instance may also be referred to as a QR identifier or QID), an organization name (e.g., associated with the user 1902), a digital signature, and/or a thumbprint. The digital signature may be created by signing the authentication ID 2104 and/or the organization name with a private key of the authentication server 1922, and the digital signature may be authenticated by any device that knows the server's public key (e.g., the server public key 1956 discussed in FIGS. 19A-19B). In some embodiments, the thumbprint may be an identifier associated a public key or key pair, which may be used to identify the specific server public key (or the private key that was used to produce the digital signature) for authenticating the digital signature, such as will be the case if the authentication server 1922 employs multiple key pairs (e.g., for different purposes/workflows/organizations, etc.) or periodically rotates to a different key pair. For example, the authentication application 1906 may be used to scan and decode the QR code (authentication ID 2104) and use the thumbprint to determine if a server public key matching the thumbprint is available in the local device storage 1932 of the mobile device 1904. If the corresponding server public key is locally available, then the authentication application 1906 can use it to authenticate the digital signature. If the corresponding server public key is not locally available, the authentication application 1906 may be able to download and retrieve the appropriate server public key from a server (possibly the authentication server 1922), store that server public key into the local device storage 1932, and use it to authenticate the digital signature.

Accordingly, it can be understood that the authentication code 2102 can take on various suitable forms, some of which include a string of alphanumeric characters, a CAPTCHA image, a machine-readable optical label or pattern (e.g., a QR code or barcode), and so forth. Furthermore, the authentication code 2102 may take on different forms based on the chosen login approach, and certain aspects of the authentication workflows described herein may be slightly different based on the format of the authentication code 2102 used. For instance, the user 1902 may be able to switch between login approaches via the authentication portal 1924 (e.g., there may be a button to switch from using a QR code to a DID for the authentication code 2102, and vice versa).

After generating the authentication code 2102, the authentication server 1922 may provide the authentication code 2102 to the user 1902. In some embodiments, the authentication code 2102 may be visually provided to the user 1902, such as by transmitting the generated authentication code 2102 to the computer 1908 to be displayed to the user 1902 in the authentication portal 1924 via the browser 1910. There may also be accompanying instructions informing the user 1902 that the authentication code 2102 will have to be input into the authentication application 1906. Some formats for the authentication code 2102 (e.g., a QR code or an alphanumeric DID) may be configured so that the user 1902 will be able to easily input and transfer the authentication code 2102 into the authentication application 1906. In some embodiments, the format of the authentication code 2102 used may be based on a default setting or based on a login approach selected by the user 1902, who may also be able to switch between different login approaches (e.g., via the authentication portal 1924). For example, the authentication server 1922 may default to generating a QR code for the authentication code 2102, but the user 1902 may be able to select a different login approach (e.g., have the authentication server 1922 generate a manually-entered 6—digit DID instead, and vice versa), such as by clicking a button in the authentication portal 1924. Examples of this are shown by user interface 2160 of FIG. 21D, which displays a QR code but has a button for generating an alphanumeric code for manual entry. Clicking on that button may result in displaying the alphanumeric code to be used for the login approach, as shown by user interface 2170 of FIG. 21E.

Turning back to FIGS. 21A & 21B, in response to the authentication request and generating the authentication code 2102 and/or authentication ID 2104 (that the authentication code 2102 may be based on), the authentication server 1922 may establish a connection with the computer 1908 to transmit the authentication code 2102 to the computer 1908 (e.g., for display). In some embodiments, the authentication server 1922 may return a WebSocket handshake response back and establish a WebSocket connection with the computer 1908 via the browser 1910. The authentication server 1922 may save the generated authentication ID 2104 with a WebSocket identifier for the WebSocket connection, which can be quickly looked up and retrieved using the authentication ID 2104. In some embodiments, this set of information may be saved in temporary storage (e.g., an in-memory data store) or be stored temporarily (e.g., removed after a timeout duration of 1 minute).

At circle 3, once the authentication code 2102 has been provided to the user 1902, the user 1902 may open the authentication application 1906 on their mobile device 1904. In some embodiments, when the authentication application 1906 is launched, it may perform a global device security policy check. Examples of things that could be checked include checking whether the mobile device 1904 is jailbroken or checking whether the mobile device 1904 has a device-locking mechanism enabled (e.g., such as a biometric, pin (6—digit), password (8—character), etc.) and/or a gesture 1944. The gesture 1944 can be any identifying information that can be tied to a specific users (e.g., like a fingerprint or behavior) to ensure that the user of the mobile device 1904 is the appropriate user (e.g., user 1902). If policy check is not met, the authentication application 1906 may show an error screen and quit.

In some embodiments, the user 1902 may unlock the authentication application 1906 by providing a gesture 1944 (e.g., a PIN) or both a username (e.g., name 1938 or email 1940) and a gesture 1944. In some embodiments, unlocking the authentication application 1906 may allow for some of the information stored in the device storage 1932 to be retrieved, such as the SUID 1952, the ZID 1954, and the private key 1934. In some embodiments, the authentication application 1906 reads the encrypted data stored against the username in the device storage 1932, and decrypts it (because the authentication application 1906 now has the user's gesture 1944 and/or username and can retrieve the decryption key) to obtain various information such as the SUID 1952, the ZID 1954, and/or the private key 1934. In particular, the private key 1934 may be used to digitally sign communications to the authentication server 1922 in various authentication workflows.

The user 1902 may then provide/input the authentication code 2102 to the authentication application 1906. For example, if the authentication code 2102 is a QR code displayed on the browser 1910, then the user 1902 may be able to scan the QR code through the authentication application 1906 using a camera of the mobile device 1904. The authentication application 1906 can decode the QR code to obtain any encoded information, such as an authentication ID 2104, an organization name (e.g., associated with the user 1902), a digital signature, and/or a thumbprint. The thumbprint may identify a server public key (e.g., the server public key 1956 discussed in FIGS. 19A-19B), which can be used to authenticate the digital signature. Alternatively, if the authentication code 2102 is a string of alphanumeric characters (e.g., a DID) that is displayed on the browser 1910, the user 1902 may be able to manually enter those characters into the authentication application 1906 (e.g., by selecting the characters on a81 eypadad rendered on a display of the mobile device 1904), and the authentication application 1906 may record the entered characters as the authentication ID 2104.

At circle 4, the authentication application 1906 may send a communication to the authentication server 1922 with a payload that may include the authentication ID 2104 (e.g., the QR identifier decoded from a scanned QR code, an identifier manually-entered by the user, and so forth), the end user ID (e.g., SUID) 1952, and/or the device ID (e.g., ZID) 1954. There may also be a digital signature 2106 that may be generated by signing some or all of this information with the private key 1934 (e.g., the authentication ID 2104, the SUID 1952, and/or the ZID 1954).

The authentication server 1922 may retrieve its stored copy of the public key 1936 (corresponding to the private key 1934 used to create the signature 2106) and use it to authenticate the signature 2106. For example, the authentication server 1922 may look up the end user ID (e.g., SUID) 1952 in an org-specific user table storing information about the various users of the organization to confirm that the user 1902 belongs to the organization, use that SUID 1952 to look up in a separate table all the devices (e.g., the device IDs and corresponding pubic keys) that are registered to the user 1902, determine that the public key 1936 is associated with the device ID 1954, and then use that public key 1936 to authenticate the signature 2106.

If authentication of the signature 2106 is successful, the authentication server 1922 may validate the authentication ID 2104 by comparing the authentication ID 2104 from the payload to the authentication ID 2104 that it generated and stored. For example, the authentication server 1922 may look up the value of the user-submitted authentication ID 2104 in memory. If the user entered a value that does not exist in the memory (e.g., the user entered the wrong value; the stored authentication ID 2104 was deleted; an expiration time has elapsed, such as after one minute; and so forth), then the authentication ID 2104 will not be found and the authentication server 1922 may return an error to the computer 1908 and/or mobile device 1904. The authentication process may need to be restarted.

However, if the user entered a value for the authentication ID 2104 that is found by the authentication server 1922, then the authentication server 1922 may take further action depending on the login approach and/or the format of the authentication code 2102.

For example, upon successful validation of the authentication ID 2104, if the login approach involved scanning a QR code for the authentication code 2102, then at circle 5a, the authentication server 1922 may send a confirmation request 2108, notification, or prompt back to the mobile device 1904. In some embodiments, the authentication server 1922 may sent the confirmation request 2108 via a push notification or SMS message to the mobile device 1904. The confirmation request 2108 may indicate the organization and/or digital service 1914 associated with the authentication request (e.g., "Are you trying to log into X application?", "Are you trying to access Y company's website?", and so forth). This step may be necessary for security purposes, otherwise a hacker or third-party may be able to take a QR code (e.g., authentication code 2102) and try to trick users into scanning the QR code. Then at circle 6, the mobile device 1904 may send a response to the authentication server 1922 with a payload that may include a confirmation 2112 along with the authentication ID 2104, the end user ID (e.g., SUID) 1952, and/or the device ID (e.g., ZID) 1954. There may also be a digital signature 2114 that may be generated by signing some or all of this information with the private key 1934 (e.g., the SID 1952, and/or the ZID 1954). The authentication server 1922 will validate all this information and then log in the user 1902 on the browser 1910.

For instance, the authentication server 1922 may redirect the user 1902 to the digital service 1914 and send a SAML assertion confirming that the user 1902 is logged in.

Alternatively, upon successful validation of the authentication ID 2104, if the login approach involved an alphanumeric DID for the authentication code 2102, then circle 5a may not be performed. Instead, at circle 5b, the authentication server 1922 may generate an additional challenge or validation code 2110. The validation code 2110 may be a temporary identifier that is generated for this authentication session or login attempt by the user 1902. For example, the validation code 2110 can be two-digit alphanumeric code. The authentication server 1922 may temporarily save the validation code 2110. In some embodiments, the authentication server 1922 may save the validation code 2110 with the SUID 1952 and the WebSocket identifier for the WebSocket connection (e.g., between the computer 1908 and the authentication server 1922), so that the validation code 2110 can be quickly looked up and retrieved using the SUID 1952. In some embodiments, this set of information may be saved in temporary storage (e.g., an in-memory data store) or be stored temporarily (e.g., removed after a timeout duration of 1 minute).

The authentication server 1922 may send the validation code 2110 to the computer 1908 (e.g., for display via the browser 1910), such as by pushing the validation code 2110 through the existing connection. The login page on the browser 1910 (e.g., the authentication portal 1924) may refresh to show the validation code 2110, and the authentication application 1906 on the mobile device 1904 may request that the user 1902 enter this validation code 2110 and also confirm they are trying to login to the organization and/or digital service 1914 associated with the authentication request. Then at circle 6, the mobile device 1904 may send a response to the authentication server 1922 with a payload that may include the validation code 2110, a confirmation 2112, the authentication ID 2104, the end user ID (e.g., SUID) 1952, and/or the device ID (e.g., ZID) 1954. There may also be a digital signature 2114 that may be generated by signing some or all of this information with the private key 1934 (e.g., the SID 1952, the ZID 1954, the authentication ID 2104, and/or the validation code 2110). The authentication server 1922 will authenticate the digital signature 2114 and validate all this information, including the user-entered validation code 2110. If the user 1902 entered the wrong validation code 2110 code or takes too long to enter the validation code 2110 (e.g., an expiration time, such as 1 minute, has elapsed), then the authentication server 1922 may return an error indicating that the login is canceled and/or the validation code 2110 is not found or invalid.

If the user enters the correct validation code 2110 within the allowable time window, the authentication server 1922 can then log in the user 1902, such as by pushing a logged in message (e.g., via the open WebSocket connection) to the browser 1910. In some embodiments, the authentication server may send an authentication response (e.g., a SAML assertion confirming that user 1902 is logged in) to an organization's website or digital service 1914) and the user's browser 1910 may be redirected.

It should be noted that various steps of the described workflow may provide increased security. For instance, a malicious user may attempt to brute force a connection with the authentication server 1922 by passing random authentication IDs. If the malicious user gets lucky at the right time and happens to use authentication ID 2104 (e.g., right after it is generated for user 1902), then the authentication server

1922 may establish a connection with the malicious user instead of the browser 1910. To combat this, the authentication server 1922 may first accept the connection request (e.g., a WebSocket connection) and establish a connection with the computer 1908 (e.g., after the user 1902 attempts to login via the browser 1910), before generating the authentication ID 2104 and/or authentication code 2102 and sending it to through the established connection. This may prevent a malicious user from brute forcing connections with the authentication server 1922, since for example, the authentication ID 2104 would already be tied to a connection ID and established connection.

In some cases, having the additional validation code 2110 in the workflow may serve to prevent accidents with wrong entries of the authentication code 2102 when the authentication code 2102 is an alphanumeric string (e.g., a DID). For example, a user could mistakenly enter a 0 instead of a 9, but that code may exist at that point in time (e.g., generated for someone else).

Figure 22A:
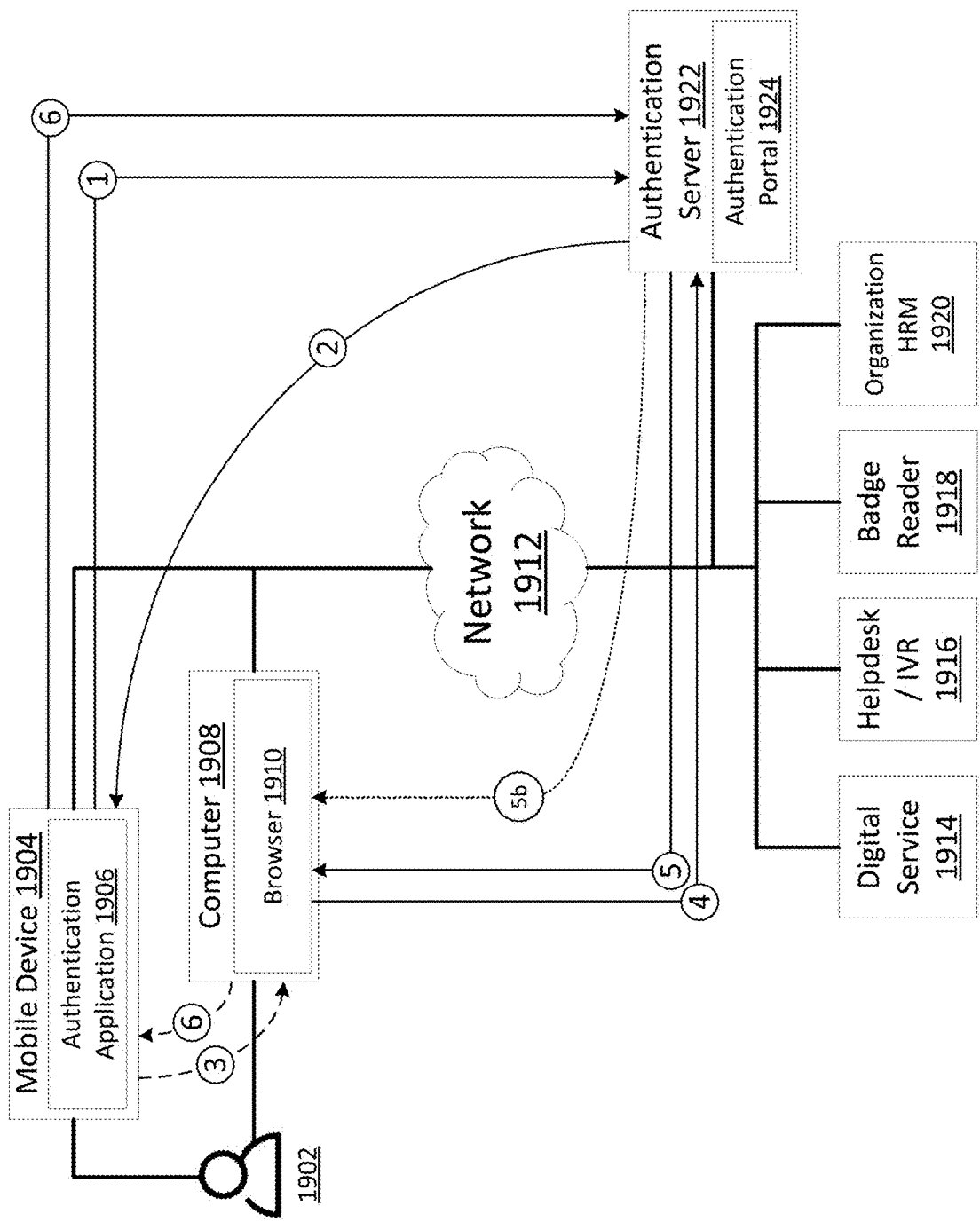
FIGS. 22A-22B are hybrid system diagrams illustrating an authentication workflow associated with logging in on a mobile device, in accordance with embodiments of the present application.
Figure 22B:
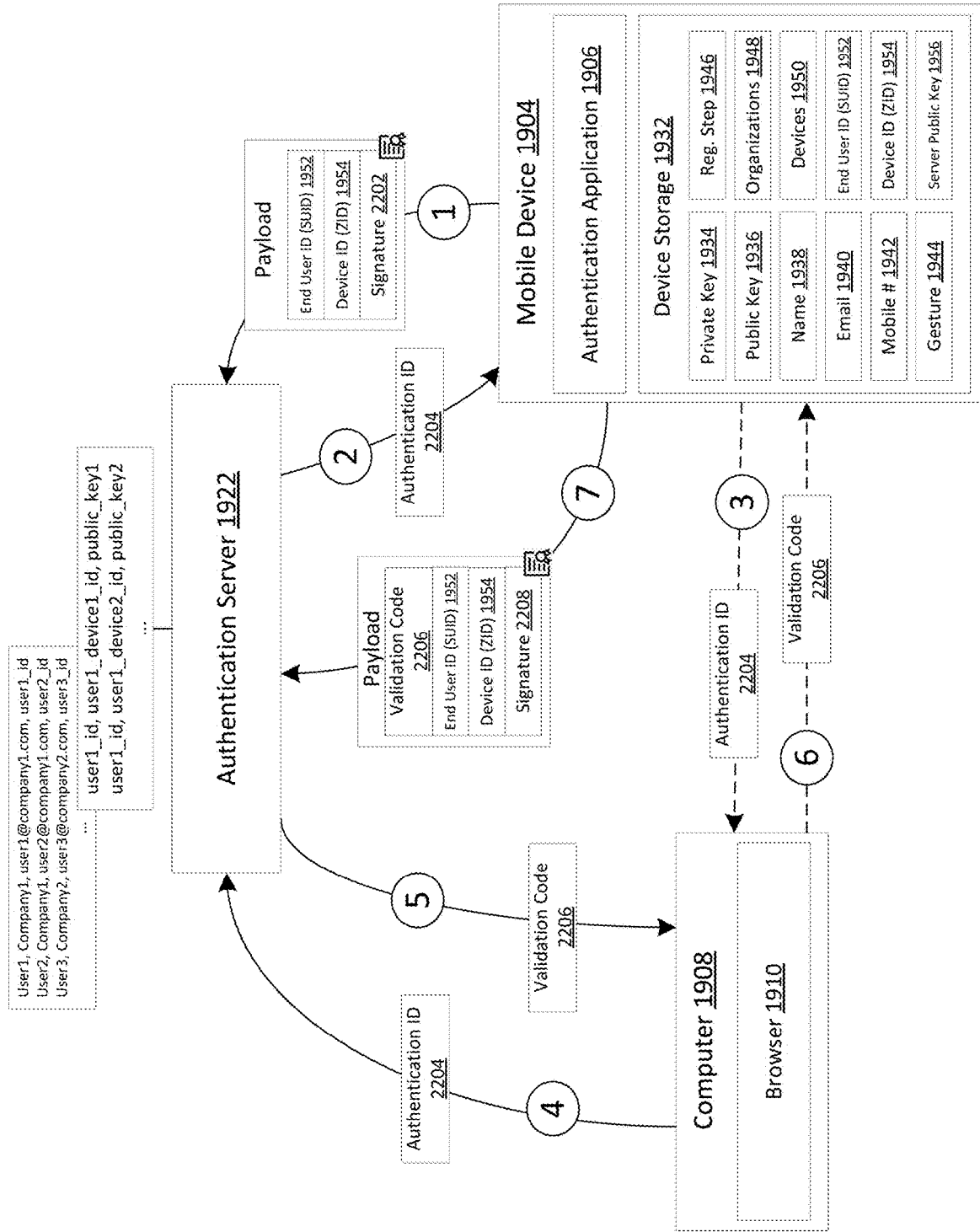

FIG. 22A is a hybrid system diagram illustrating an authentication workflow associated with logging in on a mobile device, in accordance with embodiments of the present application. FIG. 22B illustrates how information may be saved and transmitted at various points in the workflow illustrated in FIG. 22A. FIGS. 22A & 22B are described in conjunction below.

At circle 1, the user 1902 may wish to access a protected resource associated with their organization, such as a digital service 1914 or its corresponding website, via their mobile device 1904. The authentication application 1906 on the mobile device 1904 may send a request to the authentication server 1922. There may be a payload containing the end user ID (e.g., SUID) 1952 and/or the device ID (e.g., ZID) 1954. There may also be a digital signature 2202 that may be generated by signing some or all of this information with the private key 1934 (e.g., the SID 1952 and/or the ZID 1954). The authentication server 1922 will authenticate the digital signature 2202 and validate all this information, including validating the user 1902 based on the SUID 1952.

If the user is valid, then the authentication server 1922 may generate an authentication ID 2204, which may be a unique identifier that is generated for, and associated with, this particular authentication session or login attempt by the user 1902 and also intended to be provided to the user 1902 during the various authentication workflows described herein. In some cases, the authentication ID 2204 may be a string of alphanumeric characters, and in some instances, it may also be referred to as a DynamicID or DID. In some embodiments, the authentication server 1922 may save the generated authentication ID 2204 in temporary storage (e.g., an in-memory data store) or store it temporarily (e.g., remove after a timeout duration of X minutes). In some embodiments, the authentication server 1922 may associate the generated authentication ID 2204 with the SUID 1952 in the payload, so that the authentication ID 2204 can be used to loop up the SUID 1952 and vice versa.

At circle 2, the authentication server 1922 may send the authentication ID 2204 to the mobile device 1904. The authentication application 1906 may display the received authentication ID 2204 to the user 1902 (e.g., on the display of the mobile device 1904), asking them to enter the authentication ID 2204 on a browser of a different device.

At circle 3, the user 1902 may navigate the browser 1910 on computer 1908 to a login portal associated with the authentication server 1922, such as the authentication portal 1924. In some embodiments, the portal may have a login option associated with mobile flow (e.g., enter a code sent to a mobile device). The user 1902 may manually enter the authentication ID 2204 into the portal on the browser 1910.

At circle 4, the browser 1910 may send the entered authentication ID 2204 to the authentication server 1922 for validation. The authentication server 1922 may receive the authentication ID 2204 and validate it, such as by looking up the received authentication ID 2204 against the authentication ID values it has saved.

If the authentication ID 2204 is valid, then at circle 5, the authentication server 1922 may generate an additional challenge or validation code 2206. The validation code 2206 may be a temporary identifier that is generated for this authentication session or login attempt by the user 1902. For example, the validation code 2206 can be two-digit alphanumeric code. The authentication server 1922 may temporarily save the validation code 2206. In some embodiments, the authentication server 1922 may save the validation code 2206 with the SUID 1952, so that the validation code 2206 can be quickly looked up and retrieved using the SUID 1952. In some embodiments, this set of information may be saved in temporary storage (e.g., an in-memory data store) or be stored temporarily (e.g., removed after a timeout duration of 1 minute). The authentication server 1922 may send a success message with the validation code 2206 to the computer 1908 (e.g., for display via the browser 1910).

In some embodiments (not shown), the browser 1910 may cache the validation code 2206 locally and send back a connection request, such as a WebSocket connection request, to the authentication server 1922. The request may also include the authentication ID 2204 and/or the validation code 2206. The authentication server 1922 may validate this information, such as by using the authentication ID 2204 in the request to look up the SUID 1952 tied to it, and then using that SUID 1952 to look up the saved validation code 2206 (e.g., to compare to the validation code 2206 in the request).

In some embodiments, the login page on the browser 1910 (e.g., the authentication portal 1924) may refresh to show the validation code 2206, and the authentication application 1906 on the mobile device 1904 may request that the user 1902 enter this validation code 2206. At circle 6, the user 1902 may enter the displayed validation code 2206 into the authentication application 1906 of their mobile device 1904.

At circle 7, the mobile device 1904 may send a communication to the authentication server 1922 with a payload that includes the entered validation code 2206, the end user ID (e.g., SUID) 1952 and/or the device ID (e.g., ZID) 1954. There may also be a digital signature 2208 that may be generated by signing some or all of this information with the private key 1934 (e.g., the validation code 2206, the SID 1952 and/or the ZID 1954). The authentication server 1922 will authenticate the digital signature 2208 and validate all this information, including the entered validation code 2206. For instance, the authentication server 1922 may use the SUID 1952 to look up the saved validation code 2206 tied to it (e.g., to compare to the validation code 2206 in the payload). If the user 1902 entered the wrong validation code 2206 code or takes too long to enter the validation code 2206 (e.g., an expiration time, such as 1 minute, has elapsed), then the authentication server 1922 may return an error indicating that the login is canceled and/or the validation code 2206 is not found or invalid.

If the validation is successful, the user 1902 may be provided access to the protected resource (e.g., a digital service 1914), such as on the mobile device 1904 and/or through the browser 1910.

Figure 23A:
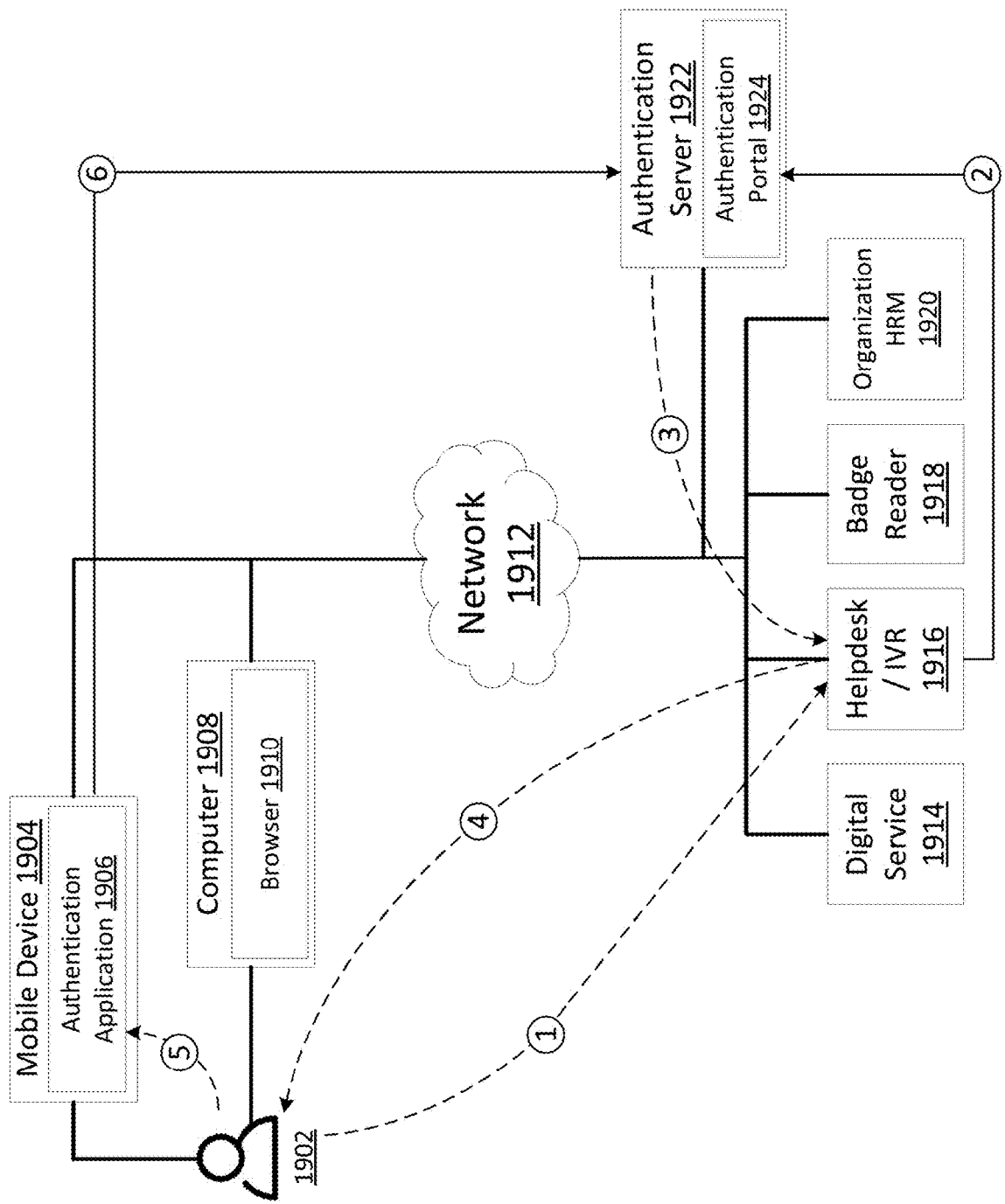
FIGS. 23A-23B are hybrid system diagrams illustrating an authentication workflow associated with verbal authentication, in accordance with embodiments of the present application.
Figure 23B:
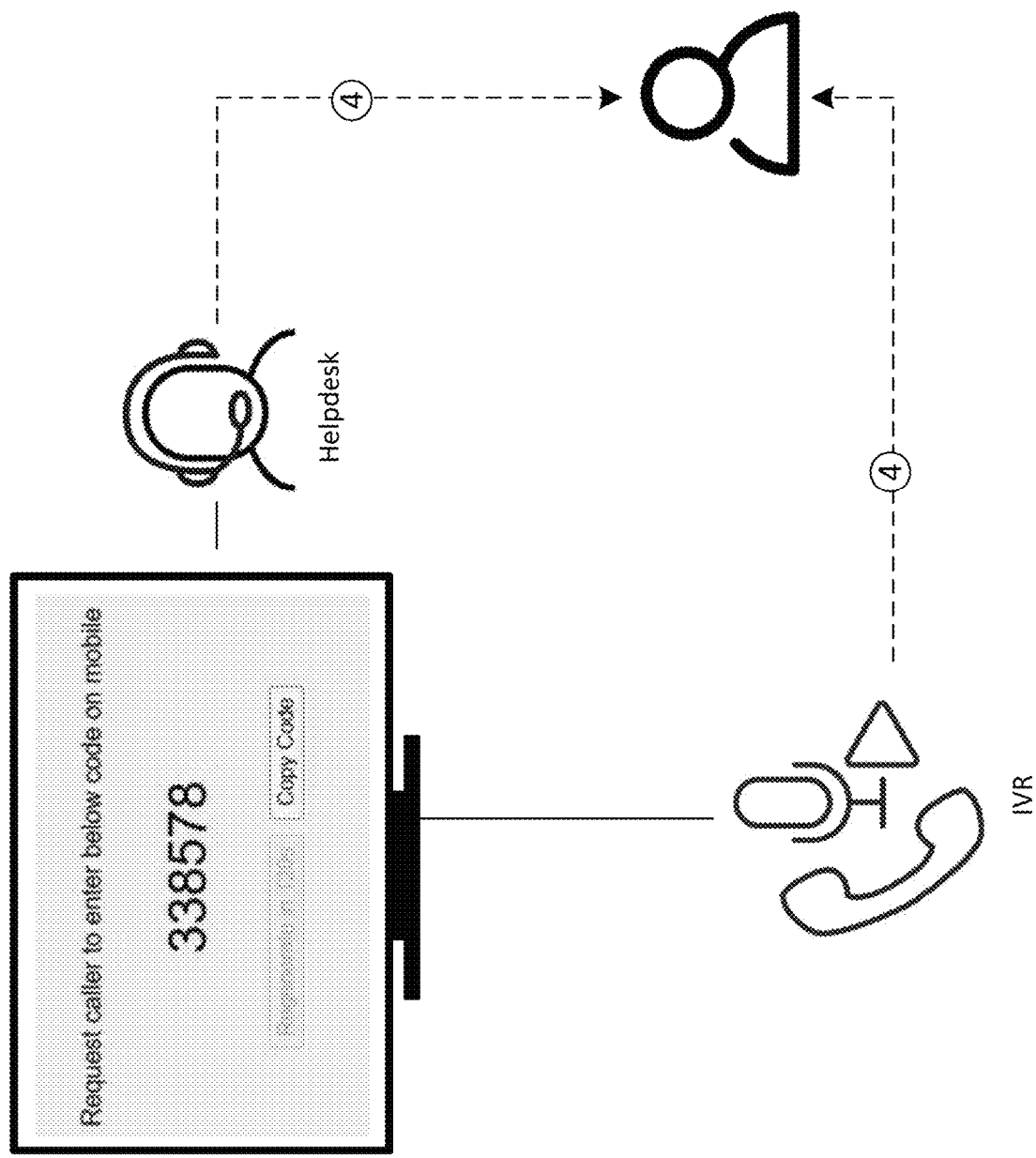

FIG. 23A is a hybrid system diagram illustrating an authentication workflow associated with verbal authentication, in accordance with embodiments of the present application. FIG. 23B illustrates how information may be saved and transmitted at various points in the workflow illustrated in FIG. 23A. FIGS. 23A & 23B are described in conjunction below.

In addition to authentication workflows in more traditional contexts (e.g., a user trying to log into a website on their browser or mobile device), the concepts disclosed herein can be applied to many other use cases. One such use case involves verbal authentication, which may be an approach that can be used to identify and authenticate a user that is seeking assistance, such as by calling a helpdesk (e.g., technical support).

For example, at circle 1, the user 1902 may contact a helpdesk 1916 or interactive voice response (IVR) system associated with their organization. In some embodiments, this contact can be through an application or website, such as by the user 1902 initiating a support ticket or messaging a helpdesk agent in a popup chat window. In some embodiments, contact may involve the user 1902 calling up a phone number for the helpdesk 1916 in order to speak with a helpdesk agent or an interactive voice response (IVR) system.

At circle 2, an agent of the helpdesk 1916 may be able to access an application or a webpage (such as the authentication portal 1924), login with the authentication server 1922, and then have the authentication server 1922 generate an authentication ID. Alternatively, the helpdesk 1916 may be able to directly request that the authentication server 1922 generate an authentication ID (e.g., via an API call). The authentication ID may be a temporary unique identifier that is generated for this particular authentication session and intended to be provided to the user 1902, who may associate themselves with it. In some embodiments, there may be an indication, label, distinction, etc., that this authentication ID is generated for verbal authentication and is different from the authentication IDs used in other workflows.

At circle 3, the authentication server 1922 may provide the generated authentication ID to the helpdesk 1916. For example, the helpdesk agent may have pressed a button in the authentication portal 1924 to generate an authentication ID (or selected an option to generate a verbal auth code), which is then displayed on screen to the helpdesk agent. Alternatively, the authentication server 1922 may be able to directly send the generated authentication ID to the helpdesk 1916 in an electronic communication.

At circle 4, an agent of the helpdesk 1916 (or an interactive voice response (IVR) system, chatbot, etc.) may read out the authentication ID to the user 1902 (e.g., over the phone, in a chat message, etc.) and request that the user 1902 key in the authentication ID into their authentication application 1906 on their mobile device 1904.

At circle 5, the user 1902 may enter the authentication ID on their authentication application 1906. In some embodiments, the user 1902 may have to enter the authentication ID before an expiration or timeout duration.

At circle 6, the authentication application 1906 may transmit the entered authentication ID to the authentication server 1922. In some embodiments, the transmission may include a payload that contains the authentication ID, as well as other information such as the end user ID (e.g., SUID) 1952 and/or the device ID (e.g., ZID) 1954 found on the mobile device 1904. There may also be a digital signature that may be generated by signing some or all of this information with the private key 1934 of the mobile device 1904 (e.g., signing the authentication ID, the SID 1952 and/or the ZID 1954). The authentication server 1922 will authenticate the digital signature and validate all this information, including validating that the entered authentication ID code exists and/or has not expired. If successful, the user 1902 will be authenticated and the authentication server 1922 can retrieve any stored information it has about the user 1902.

In some embodiments, the authentication server 1922 may reply back to the mobile device 1904 with an organization name, and mobile device 1904 will prompt the user 1902 for additional confirmation ("Are you trying to authenticate with helpdesk of ABC company?") before proceeding.

In some embodiments, the authentication server 1922 may be able to provide any information about the user 1902 to the helpdesk 1916, such as by directly sending the information to the helpdesk 1916 and/or updating details in the authentication portal 1924 for display to an agent of the helpdesk 1916. For instance, a page on the authentication portal 1924 may be updated to show the identity of the user 1902 (e.g., email, first and last names, etc.). Thus, an agent of the helpdesk 1916 would be able to see details associated with the user 1902 (e.g., employer, name, etc.) and verify the user 1902 in a call without having to ask the user 1902.

Figure 24:
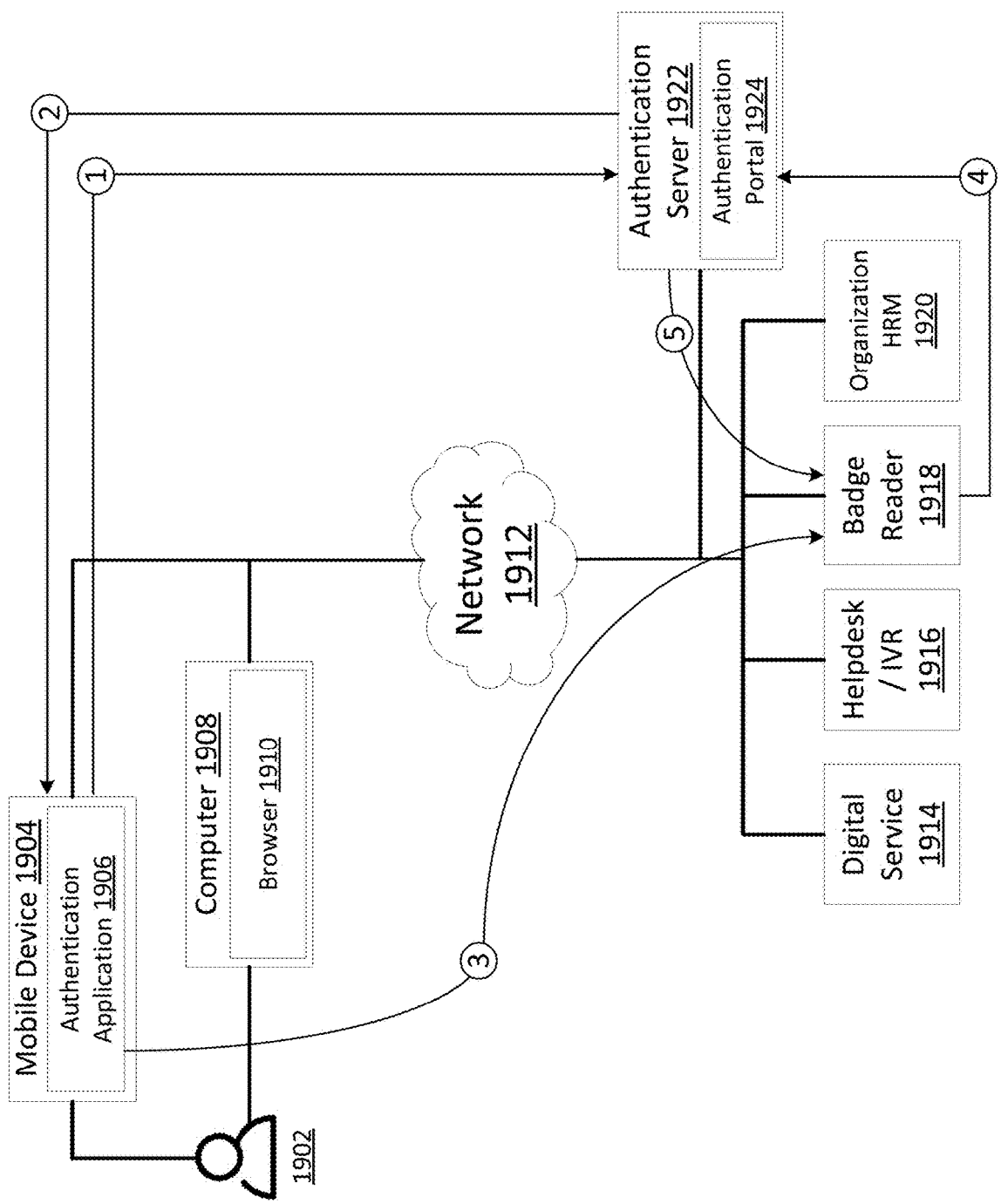
FIG. 24 is a hybrid system diagram illustrating an authentication workflow associated with badging authentication, in accordance with embodiments of the present application.

FIG. 24 is a hybrid system diagram illustrating an authentication workflow associated with badging authentication, in accordance with embodiments of the present application.

Another use case involves badging to obtain access to an area or room, such that the mobile device and authentication application would replace a traditional security badge. There may be many advantages to this approach. Currently, badging is not phone based and it is a very expensive operation. It requires specific hardware (e.g., devices/cards with NFC) and additional programming. In addition to the expense, it also adds a second point of failure. While implementing the concepts and inventions disclosed herein, the authentication workflows and components can be suitably adapted for badging as well. That way, the same onboarding process for a new user (e.g., an employee) can also be used to add badging as a feature, and existing administrators (e.g., HR) could easily have access and management. This provides convenience and also improves security.

For instance, at circle 1, a user 1902 may be near a physical badge reader 1918. The user 1902 may direct the authentication application 1906 to obtain an authentication ID from the authentication server 1922. The authentication application 1906 may send a request which contains information found on the mobile device 1904, such as the end user ID (e.g., SUID) 1952 and/or the device ID (e.g., ZID) 1954. There may also be a digital signature that may be generated by signing some or all of this information with the private key 1934 of the mobile device 1904 (e.g., the SID 1952 and/or the ZID 1954). The authentication server 1922 will authenticate the digital signature and validate all this information.

At circle 2, the authentication server 1922 may generate an authentication ID and send it to the mobile device 1904. The authentication ID may be a temporary unique identifier that is generated for this particular authentication session and intended to be provided to the user 1902. The authentication server 1922 may save and associate this authentication ID with the end user ID (e.g., SUID) 1952 and/or the device ID (e.g., ZID) 1954.

At circle 3, the authentication application 1906 on the mobile device 1904 may transmit the authentication ID to the badge reader 1918 via any form of wireless communication, including via NFC/Bluetooth low energy. Also in the transmission can be the end user ID (e.g., SUID) 1952, device ID (e.g., ZID) 1954, and/or a digital signature.

At circle 4, the badge reader 1918 may call the authentication server 1922 and forward some or all of these details in the transmission to determine whether this user should have access to this particular area or room. The authentication server 1922 may authenticate the digital signature and validate the other information such as the authentication ID, the end user ID (e.g., SUID) 1952, and/or device ID (e.g., ZID) 1954. In some embodiments, the authentication server 1922 may receive just the authentication ID, which it may have to use to look up the end user ID 1952. The authentication server 1922 may also check against one or more policies to determine if the user 1902 should have access to the particular area or room.

At circle 5, the authentication server 1922 may respond with the badge reader 1918 with a determination (e.g., the user has or does not have access to the particular area or room) that the badge reader 1918 can use to either grant or deny access to the user 1902. Alternatively, the authentication server 1922 may respond with the badge reader 1918 with a user identifier (such as the end user ID 1952), which the badge reader 1918 can use to check against one or more internal policies to determine if the user 1902 should have access to the particular area or room.

Figure 25:
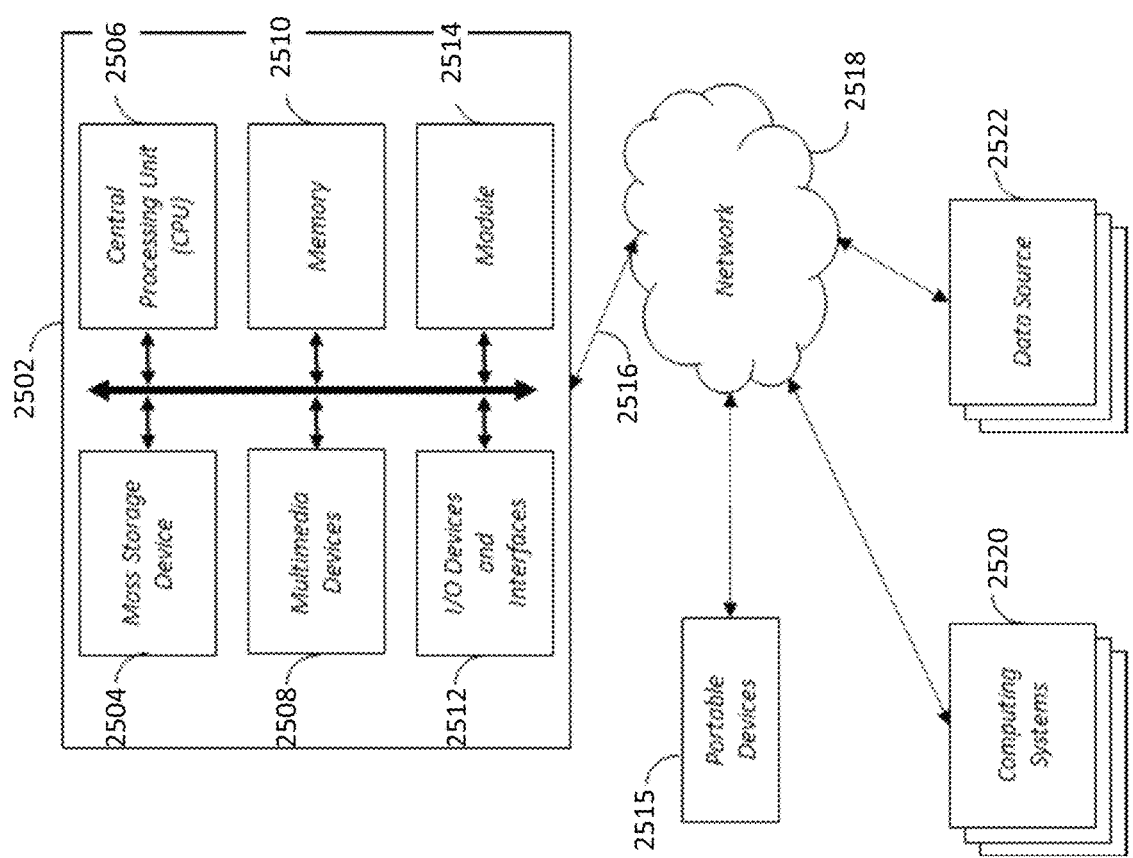
FIG. 25 is a block diagram computer system of an embodiment of the present application.

FIG. 25—Computer Systems

FIG. 25 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 25. The example computer system 2502 is in communication with one or more computing systems 2520 and/or one or more data sources 2522 via one or more networks 2518. While FIG. 25 illustrates an embodiment of a computing system 2502, it is recognized that the functionality provided for in the components and modules of computer system 2502 may be combined into fewer components and modules, or further separated into additional components and modules.

The computer system 2502 can comprise a module 2514 that carries out the functions, methods, acts, and/or processes described herein. The module 2514 is executed on the computer system 2502 by a central processing unit 2506 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 2502 includes one or more processing units (CPU) 2506, which may comprise a microprocessor. The computer system 2502 further includes a physical memory 2510, such as random-access memory (RAM) for temporary storage of information, a read only memory (ROM) for permanent storage of information, and a mass storage device 3104, such as a backing store, hard drive, rotating magnetic disks, solid state disks (SSD), flash memory, phase-change memory (PCM), 3D xPoint memory, diskette, or optical media storage device. Alternatively, the mass storage device may be implemented in an array of servers. Typically, the components of the computer system 3102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 2502 includes one or more input/output (I/O) devices and interfaces 2512, such as a keyboard, mouse, touch pad, and printer. The I/O devices and interfaces 2512 can include one or more display devices, such as a monitor, that allows the visual presentation of data to a user. More particularly, a display device provides for the presentation of GUIs as application software data, and multi-media presentations, for example. The I/O devices and interfaces 2512 can also provide a communications interface to various external devices. The computer system 2502 may comprise one or more multi-media devices 2508, such as speakers, video cards, graphics accelerators, and microphones, for example.

The computer system 2502 may run on a variety of computing devices, such as a server, a Windows server, a Structure Query Language server, a Unix Server, a personal computer, a laptop computer, and so forth. In other embodiments, the computer system 2502 may run on a cluster computer system, a mainframe computer system and/or other computing system suitable for controlling and/or communicating with large databases, performing high volume transaction processing, and generating reports from large databases. The computing system 2502 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 2502 illustrated in FIG. 25 is coupled to a network 2518, such as a LAN, WAN, or the Internet via a communication link 2516 (wired, wireless, or a combination thereof). Network 2518 communicates with various computing devices and/or other electronic devices. Network 2518 is communicating with one or more computing systems 2520 and one or more data sources 2522. The module 2514 may access or may be accessed by computing systems 2520 and/or data sources 2522 through a web-enabled user access point. Connections may be a direct physical connection, a virtual connection, and other connection type. The web-enabled user access point may comprise a browser module that uses text, graphics, audio, video, and other media to present data and to allow interaction with data via the network 2518.

Access to the module 2514 of the computer system 2502 by computing systems 2520 and/or by data sources 2522 may be through a web-enabled user access point such as the computing systems' 2520 or data source's 2522 personal computer, cellular phone, smartphone, laptop, tablet computer, e-reader device, audio player, or another device capable of connecting to the network 2518. Such a device may have a browser module that is implemented as a module that uses text, graphics, audio, video, and other media to present data and to allow interaction with data via the network 2518.

The output module may be implemented as a combination of an all-points addressable display such as a cathode ray tube (CRT), a liquid crystal display (LCD), a plasma display, or other types and/or combinations of displays. The output module may be implemented to communicate with input devices 2512 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 2502 may comprise a physical or logical connection established between a remote microprocessor and a mainframe host computer for the express purpose of uploading, downloading, or viewing interactive data and databases on-line in real time. The remote microprocessor may be operated by an entity operating the computer system 2502, including the client server systems or the main server system, an/or may be operated by one or more of the data sources 2522 and/or one or more of the computing systems 2520. In some embodiments, terminal emulation software may be used on the microprocessor for participating in the micro-mainframe link.

In some embodiments, computing systems 2520 who are internal to an entity operating the computer system 2502 may access the module 2514 internally as an application or process run by the CPU 2506.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 2502 may include one or more internal and/or external data sources (for example, data sources 2522). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 2502 may also access one or more databases 2522. The databases 2522 may be stored in a database or data repository. The computer system 2502 may access the one or more databases 2522 through a network 2518 or may directly access the database or data repository through I/O devices and interfaces 2512. The data repository storing the one or more databases 2522 may reside within the computer system 2502.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example+5%, +10%, +15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein. Accordingly, the claims are not intended to be limited to the embodiments shown herein but are to be accorded the widest scope consistent with this disclosure, the principles and the novel features disclosed herein.

We claim:

1. A computer-implemented method for authenticating a user without static usernames or passwords, the method comprising:
   receiving, from a computing device, an authentication request for a user to access a protected resource;
   generating an authentication identifier associated with the authentication request;
   storing the authentication identifier;
   generating an authentication code based on the authentication identifier;
   sending, to the computing device, the authentication code to be provided to the user;
   receiving, from a mobile device, a payload comprising:
      the authentication identifier, wherein the authentication identifier in the payload is obtained from the user providing the authentication code to the mobile device;
      a user identifier;
      a device identifier, wherein the user identifier and the device identifier are stored on the mobile device from a prior registration step; and
      a first digital signature, wherein the first digital signature is generated using a private key stored on the mobile device from the prior registration step;
   authenticating the first digital signature in the payload with a public key corresponding to the private key used to generate the first digital signature, wherein the public key is retrieved based on at least one of the user identifier or the device identifier;
   validating the authentication identifier in the payload by comparing the authentication identifier in the payload to the stored authentication identifier; and
   providing the user access to the protected resource.

2. The computer-implemented method of claim 1, wherein the method further comprises:
   sending, to the mobile device, a confirmation request;
   receiving, from the mobile device, a confirmation response comprising:
      the authentication identifier;
      the user identifier;
      the device identifier; and
      a second digital signature, wherein the second digital signature is generated using the private key stored on the mobile device from the prior registration step;
   authenticating the second digital signature in the response with the public key corresponding to the private key, wherein the public key is retrieved based on at least one of the user identifier or the device identifier; and
   logging in the user on the computing device to provide the user access to the protected resource.

3. The computer-implemented method of claim 1, wherein the method further comprises:
   generating a validation code;
   storing the validation code;
   sending, to the computing device, the validation code for display to the user;
   receiving, from the mobile device, a validation response comprising:
      the validation code, wherein the validation code in the validation response is obtained from the user providing the validation response to the mobile device;
      the user identifier;
      the device identifier; and
      a second digital signature, wherein the second digital signature is generated using the private key stored on the mobile device from the prior registration step;
   authenticating the second digital signature in the validation response with the public key corresponding to the private key, wherein the public key is retrieved based on at least one of the user identifier or the device identifier;
   validating the validation code in the validation response by comparing the validation code in the validation response to the stored validation code; and
   logging in the user on the computing device to provide the user access to the protected resource.

4. The computer-implemented method of claim 1, wherein the private key and the public key are generated as a key pair via an asymmetric, public-key cryptography algorithm.

5. The computer-implemented method of claim 1, wherein the authentication identifier is an alphanumeric string.

6. The computer-implemented method of claim 1, wherein the method is performed by an authentication server, wherein the protected resource is a website or application, and wherein the protected resource delegates authentication of the user to the authentication server.

7. The computer-implemented method of claim 1, wherein the method is performed by an authentication server, wherein the authentication code is provided to the user verbally, and wherein the computing system is a telephonic system.

8. The computer-implemented method of claim 1, wherein the method is performed by an authentication server, wherein the protected resource is an area protected by a badging system, wherein the computing device is a badge reader or associated software.

9. The computer-implemented method of claim 1, wherein the method is performed by an authentication server, wherein an objective of the method is to identify a second user, wherein the user is the second user, wherein the computing device is associated with a first user, and wherein the first user is shown confirmation of an identity of the second user.

10. The computer-implemented method of claim 1, wherein the authentication code is a QR code, and wherein the user provides the authentication code to the mobile device by scanning the authentication code with a camera of the mobile device.

11. A non-transient computer readable medium containing program instructions for causing a computer to perform a method for authenticating a user without static usernames or passwords, the method comprising:

receiving, from a computing device, an authentication request for a user to access a protected resource;

generating an authentication identifier associated with the authentication request;

storing the authentication identifier;

generating an authentication code based on the authentication identifier;

sending, to the computing device, the authentication code to be provided to the user;

receiving, from a mobile device, a payload comprising:
  the authentication identifier, wherein the authentication identifier in the payload is obtained from the user providing the authentication code to the mobile device;
  a user identifier;
  a device identifier, wherein the user identifier and the device identifier are stored on the mobile device from a prior registration step; and
  a first digital signature, wherein the first digital signature is generated using a private key stored on the mobile device from the prior registration step;

authenticating the first digital signature in the payload with a public key corresponding to the private key used to generate the first digital signature, wherein the public key is retrieved based on at least one of the user identifier or the device identifier;

validating the authentication identifier in the payload by comparing the authentication identifier in the payload to the stored authentication identifier; and providing the user access to the protected resource.

12. The non-transient computer readable medium of claim 11, wherein the method further comprises:
  sending, to the mobile device, a confirmation request;
  receiving, from the mobile device, a confirmation response comprising:
    the authentication identifier;
    the user identifier;
    the device identifier; and
    a second digital signature, wherein the second digital signature is generated using the private key stored on the mobile device from the prior registration step;
  authenticating the second digital signature in the response with the public key corresponding to the private key, wherein the public key is retrieved based on at least one of the user identifier or the device identifier; and
  logging in the user on the computing device to provide the user access to the protected resource.

13. The non-transient computer readable medium of claim 11, wherein the method further comprises:
  generating a validation code;
  storing the validation code;
  sending, to the computing device, the validation code for display to the user;
  receiving, from the mobile device, a validation response comprising:
    the validation code, wherein the validation code in the validation response is obtained from the user providing the validation response to the mobile device;
    the user identifier;
    the device identifier; and
    a second digital signature, wherein the second digital signature is generated using the private key stored on the mobile device from the prior registration step;
  authenticating the second digital signature in the validation response with the public key corresponding to the private key, wherein the public key is retrieved based on at least one of the user identifier or the device identifier;
  validating the validation code in the validation response by comparing the validation code in the validation response to the stored validation code; and
  logging in the user on the computing device to provide the user access to the protected resource.

14. The non-transient computer readable medium of claim 11, wherein the private key and the public key are generated as a key pair via an asymmetric, public-key cryptography algorithm.

15. The non-transient computer readable medium of claim 11, wherein the authentication identifier is an alphanumeric string.

16. The non-transient computer readable medium of claim 11, wherein the method is performed by an authentication server, wherein the protected resource is a website or application, and wherein the protected resource delegates authentication of the user to the authentication server.

17. The non-transient computer readable medium of claim 11, wherein the method is performed by an authentication server, wherein the authentication code is provided to the user verbally, and wherein the computing system is a telephonic system.

18. The non-transient computer readable medium of claim 11, wherein the method is performed by an authentication server, wherein the protected resource is an area protected by a badging system, wherein the computing device is a badge reader or associated software.

19. The non-transient computer readable medium of claim 11, wherein the method is performed by an authentication server, wherein an objective of the method is to identify a second user, wherein the user is the second user, wherein the computing device is associated with a first user, and wherein the first user is shown confirmation of an identity of the second user.

20. The non-transient computer readable medium of claim 11, wherein the authentication code is a QR code, and wherein the user provides the authentication code to the mobile device by scanning the authentication code with a camera of the mobile device.

* * * * *